(12) United States Patent
Kloke et al.

(10) Patent No.: US 10,318,584 B2
(45) Date of Patent: Jun. 11, 2019

(54) OUTCOME ANALYSIS FOR GRAPH GENERATION

(71) Applicant: Ayasdi, Inc., Menlo Park, CA (US)

(72) Inventors: Jennifer Kloke, Mountain View, CA (US); Harlan Sexton, Palo Alto, CA (US)

(73) Assignee: Ayasdi, Inc., Menlo Park, CA (US)

( * ) Notice: Subject to any disclaimer, the term of this patent is extended or adjusted under 35 U.S.C. 154(b) by 175 days.

(21) Appl. No.: 15/166,207

(22) Filed: May 26, 2016

(65) Prior Publication Data

US 2016/0350389 A1 Dec. 1, 2016

Related U.S. Application Data

(60) Provisional application No. 62/166,439, filed on May 26, 2015.

(51) Int. Cl.
*G06F 17/30* (2006.01)
*G06F 16/901* (2019.01)

(52) U.S. Cl.
CPC .... *G06F 16/9024* (2019.01); *G06F 17/30958* (2013.01)

(58) Field of Classification Search
CPC .................................................. G06F 17/30
USPC ......................................................... 707/722
See application file for complete search history.

(56) References Cited

U.S. PATENT DOCUMENTS

| | | | |
|---|---|---|---|
| 2006/0036368 A1* | 2/2006 | Chen | G06F 19/12 702/19 |
| 2007/0178473 A1* | 8/2007 | Chen | G06F 19/12 435/6.11 |
| 2010/0313157 A1 | 12/2010 | Carlsson et al. | |
| 2012/0313947 A1 | 12/2012 | Rope et al. | |
| 2013/0144916 A1 | 6/2013 | Lum et al. | |

(Continued)

OTHER PUBLICATIONS

International Application No. PCT/US2016/034496, International Search Report and Written Opinion dated Sep. 9, 2016.

(Continued)

*Primary Examiner* — Kim T Nguyen
(74) *Attorney, Agent, or Firm* — Sheppard, Mullin, Richter & Hampton LLP

(57) ABSTRACT

An example method includes determining a point from a data set closest to a particular data point using a particular metric and scoring a particular data point based on whether the closest point shares a similar characteristic, selecting a subset of metrics based on the metric score to generate a subset of metrics, evaluating a metric-lens combination by calculating a metric-lens score based on entropy of shared characteristics across subspaces of a reference map generated by the metric-lens combination, selecting a metric-lens combination based on the metric-lens score, generating topological representations using the received data set, associating each node with at least one shared characteristic based on member data points of that particular node sharing the shared characteristic, scoring groups within each topological representation based on entropy, scoring topological representation based on the group scores, and providing a visualization of at least one topological representation based on the graph scores.

23 Claims, 44 Drawing Sheets
(10 of 44 Drawing Sheet(s) Filed in Color)

(56) References Cited

U.S. PATENT DOCUMENTS

| | | | |
|---|---|---|---|
| 2013/0187922 A1 | 7/2013 | Sexton | |
| 2013/0187941 A1 | 7/2013 | Noon | |
| 2013/0293844 A1* | 11/2013 | Gross | A61B 3/0025 |
| | | | 351/209 |
| 2014/0244335 A1* | 8/2014 | Baldwin | G06Q 10/06311 |
| | | | 705/7.17 |
| 2014/0344013 A1 | 11/2014 | Karty et al. | |
| 2014/0359422 A1* | 12/2014 | Bassett, Jr. | G06F 19/18 |
| | | | 715/230 |
| 2015/0039705 A1* | 2/2015 | Kursun | H04L 51/26 |
| | | | 709/206 |
| 2015/0057073 A1* | 2/2015 | Kopans | A63F 13/46 |
| | | | 463/25 |
| 2015/0100377 A1* | 4/2015 | Penumaka | G06Q 30/0201 |
| | | | 705/7.29 |
| 2015/0106324 A1* | 4/2015 | Puri | G06N 5/04 |
| | | | 706/52 |
| 2015/0127650 A1 | 5/2015 | Carlsson et al. | |
| 2015/0254370 A1 | 9/2015 | Sexton et al. | |
| 2016/0026706 A1 | 1/2016 | Lum et al. | |

OTHER PUBLICATIONS

Byelas, Heorhiy, "Visualization of Metrics and Areas of Interest on Software Architecture Diagrams," doctoral thesis, Rijksuniversiteit Groningen, pp. 79, 80, 83, 94, 99, Jan. 29, 2010.

\* cited by examiner

| Patient ID | Gene 1 Expression | Gene 2 Expression | ... | Gene y Expression | Clinical Outcome |
|---|---|---|---|---|---|
| P1 | G1a | G2a | | Gya | Outcome P1 |
| P2 | G1b | G2b | | Gyb | Outcome P2 |
| P3 | G1c | G2c | | Gyc | Outcome P3 |
| ● | ● | ● | | ● | ● |
| ● | ● | ● | | ● | ● |
| ● | ● | ● | | ● | ● |
| Pn | G1n | G2n | | Gyn | Outcome Pn |

OUTCOME ANALYSIS FOR GRAPH GENERATION

CROSS-REFERENCE TO RELATED APPLICATION

The present application claims the benefit of U.S. Provisional Patent Application Ser. No. 62/166,439 filed May 26, 2015 and entitled "Systems and Methods for Outcome Quick Analysis," the entirety of which is incorporated herein by reference.

BACKGROUND

1. Field of the Invention

Embodiments of the present invention(s) are directed to grouping of data points for data analysis and more particularly to generating a graph utilizing improved groupings of data points based on scores of the groupings.

2. Related Art

As the collection and storage data has increased, there is an increased need to analyze and make sense of large amounts of data. Examples of large datasets may be found in financial services companies, oil expiration, biotech, and academia. Unfortunately, previous methods of analysis of large multidimensional datasets tend to be insufficient (if possible at all) to identify important relationships and may be computationally inefficient.

In one example, previous methods of analysis often use clustering. Clustering is often too blunt an instrument to identify important relationships in the data. Similarly, previous methods of linear regression, projection pursuit, principal component analysis, and multidimensional scaling often do not reveal important relationships. Existing linear algebraic and analytic methods are too sensitive to large scale distances and, as a result, lose detail.

Further, even if the data is analyzed, sophisticated experts are often necessary to interpret and understand the output of previous methods. Although some previous methods allow graphs depicting some relationships in the data, the graphs are not interactive and require considerable time for a team of such experts to understand the relationships. Further, the output of previous methods does not allow for exploratory data analysis where the analysis can be quickly modified to discover new relationships. Rather, previous methods require the formulation of a hypothesis before testing.

SUMMARY OF THE INVENTION(S)

Exemplary systems and methods for outcome automatic analysis are described. In various embodiments, a non-transitory computer readable medium including executable instructions, the instructions being executable by a processor to perform a method. The method may comprise receiving a data set, for each metric of a set of metrics: for each point in the data set, determining a point in the data set closest to that particular data point using that particular metric and change a metric score if that particular data point and the point in the data set closest to that particular data point share a same or similar shared characteristic, comparing metric scores associated with different metrics of the set of metrics, selecting one or more metrics from the set of metrics based at least in part on the metric score to generate a subset of metrics, for each metric of the subset of metrics, evaluating at least one metric-lens combination by calculating a metric-lens score based on entropy of shared characteristics across subspaces of a reference map generated by the metric-lens combination, selecting one or more metric-lens combinations based at least in part on the metric-lens score to generate a subset of metric-lens combinations, generating topological representations using the received data set, each topological representation being generated using at least one metric-lens combination of the subset of metric-lens combinations, each topological representation including a plurality of nodes, each of the nodes having one or more data points from the data set as members, at least two nodes of the plurality of nodes being connected by an edge if the at least two nodes share at least one data point from the data set as members, associating each node with at least one shared characteristic based, at least in part, on at least some of member data points of that particular node sharing the shared characteristic, identifying groups within each topological representation that include a subset of nodes of the plurality of nodes that share the same or similar shared characteristics, scoring each group within each topological representation based, at least in part, on entropy, to generate a group score for each group, scoring each topological representation based on the group scores of each group of that particular topological representation to generate a graph score for each topological representation, and providing a visualization of at least one topological representation based on the graph scores.

The metric-lens combination may include at least one metric from the subset of metrics and two or more lenses. The shared characteristic may be a category of outcome from the received data set. The method may further comprise calculating the entropy of shared characteristics across subspaces of a reference map generated by the metric-lens combination by calculating the entropy of categories of outcomes of data points from the data set associated with at least one subspace of the reference map.

In some embodiments, the method may further comprise determining a resolution for generation of one or more topological representation of the topological representations, the resolution being determined as follows:

$$res = \left(\left[\max\left(\frac{gain*N}{L_n*100}, 10\right)\right]^{L_n} + \left(\frac{\sqrt{N}}{4}*j\right)^{L_n}\right)^{\frac{1}{L_n}}$$

the resolution being determined for each j in [0, number of resolutions to be considered −1], Ln is a number of metric-lens combinations, and N is the number of points in the resolution mapping.

The visualization may be interactive. Providing the visualization may include providing at least one of metric information, metric-lens information, or graph score. Providing the visualization may include providing a plurality of visualizations in order of the graph score for each of the provided visualizations.

Generating the topological representations using the receive data set may comprise generating a plurality of reference spaces using each metric-lens combination, mapping the data points of the data set into each reference space using a different metric-lens combination, and for each reference space: clustering data in a cover of the reference space based the data points of the data set, identifying nodes of the plurality of nodes based on the clustered data, and identifying edges between nodes.

In some embodiments, the topological representation may not be a visualization. In various embodiments, the score for each topological representation is calculated as follows:

$$\left(\sum_{groups\, g} entropy(g) * \#pts(g) + \frac{N}{50 * \#pts(g)}\right) *$$

$$\left\{ if\ \#groups < \#cat,\ then\ \frac{\#cats}{\#groups},\ else\ 1 \right.$$

wherein groups g is each g of a topological representation, entropy (g) is the entropy of that particular group, #pts(g) is the number of data points in that particular group, N is the number of nodes in the group, # groups is the number of groups in the particular topological representation and # cats is the number of categories of shared characteristics of the data set.

An example method may comprise receiving a data set, for each metric of a set of metrics: for each point in the data set, determining a point in the data set closest to that particular data point using that particular metric and change a metric score if that particular data point and the point in the data set closest to that particular data point share a same or similar shared characteristic, comparing metric scores associated with different metrics of the set of metrics, selecting one or more metrics from the set of metrics based at least in part on the metric score to generate a subset of metrics, for each metric of the subset of metrics, evaluating at least one metric-lens combination by calculating a metric-lens score based on entropy of shared characteristics across subspaces of a reference map generated by the metric-lens combination, selecting one or more metric-lens combinations based at least in part on the metric-lens score to generate a subset of metric-lens combinations, generating topological representations using the received data set, each topological representation being generated using at least one metric-lens combination of the subset of metric-lens combinations, each topological representation including a plurality of nodes, each of the nodes having one or more data points from the data set as members, at least two nodes of the plurality of nodes being connected by an edge if the at least two nodes share at least one data point from the data set as members, associating each node with at least one shared characteristic based, at least in part, on at least some of member data points of that particular node sharing the shared characteristic, identifying groups within each topological representation that include a subset of nodes of the plurality of nodes that share the same or similar shared characteristics, scoring each group within each topological representation based, at least in part, on entropy, to generate a group score for each group, scoring each topological representation based on the group scores of each group of that particular topological representation to generate a graph score for each topological representation, and providing a visualization of at least one topological representation based on the graph scores.

An example system may comprise a processor and a memory with instructions to configure the processor to receive a data set, for each metric of a set of metrics: for each point in the data set, determine a point in the data set closest to that particular data point using that particular metric and change a metric score if that particular data point and the point in the data set closest to that particular data point share a same or similar shared characteristic, compare metric scores associated with different metrics of the set of metrics, select one or more metrics from the set of metrics based at least in part on the metric score to generate a subset of metrics, for each metric of the subset of metrics, evaluate at least one metric-lens combination by calculating a metric-lens score based on entropy of shared characteristics across subspaces of a reference map generated by the metric-lens combination, select one or more metric-lens combinations based at least in part on the metric-lens score to generate a subset of metric-lens combinations, generate topological representations using the received data set, each topological representation being generated using at least one metric-lens combination of the subset of metric-lens combinations, each topological representation including a plurality of nodes, each of the nodes having one or more data points from the data set as members, at least two nodes of the plurality of nodes being connected by an edge if the at least two nodes share at least one data point from the data set as members, associate each node with at least one shared characteristic based, at least in part, on at least some of member data points of that particular node sharing the shared characteristic, identify groups within each topological representation that include a subset of nodes of the plurality of nodes that share the same or similar shared characteristics, score each group within each topological representation based, at least in part, on entropy, to generate a group score for each group, score each topological representation based on the group scores of each group of that particular topological representation to generate a graph score for each topological representation, and provide a visualization of at least one topological representation based on the graph scores.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13 is an exemplary data structure including biological data for a number of patients that may be used to generate the cancer map visualization in some embodiments.

FIG. 24 is an example report of an autogrouped graph of data points that depicts the grouped data in some embodiments.

FIG. 33B depicts groupings of data points with fairly consistent outcomes.

FIG. 33C depicts one large group with different outcomes that are intermixed.

DETAILED DESCRIPTION OF THE DRAWINGS

Some embodiments described herein may be a part of the subject of Topological Data Analysis (TDA). TDA is an area of research which has produced methods for studying point cloud data sets from a geometric point of view. Other data analysis techniques use "approximation by models" of various types. For example, regression methods model the data as the graph of a function in one or more variables. Unfortunately, certain qualitative properties (which one can readily observe when the data is two-dimensional) may be of a great deal of importance for understanding, and these features may not be readily represented within such models.

Figure 1A:
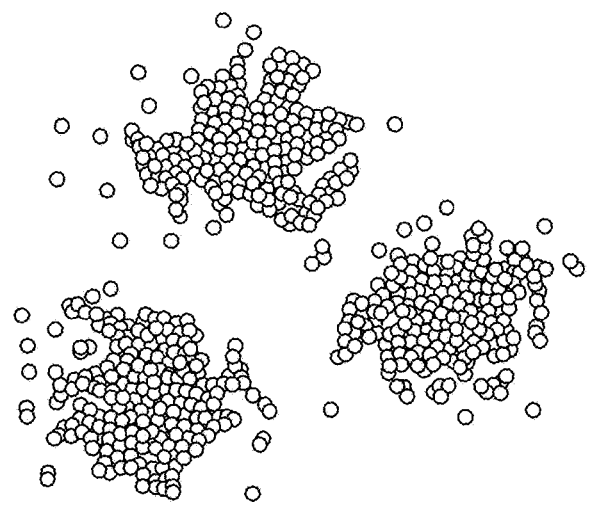
FIG. 1A is an example graph representing data that appears to be divided into three disconnected groups.

FIG. 1A is an example graph representing data that appears to be divided into three disconnected groups. In this example, the data for this graph may be associated with various physical characteristics related to different population groups or biomedical data related to different forms of a disease. Seeing that the data breaks into groups in this fashion can give insight into the data, once one understands what characterizes the groups.

Figure 1B:
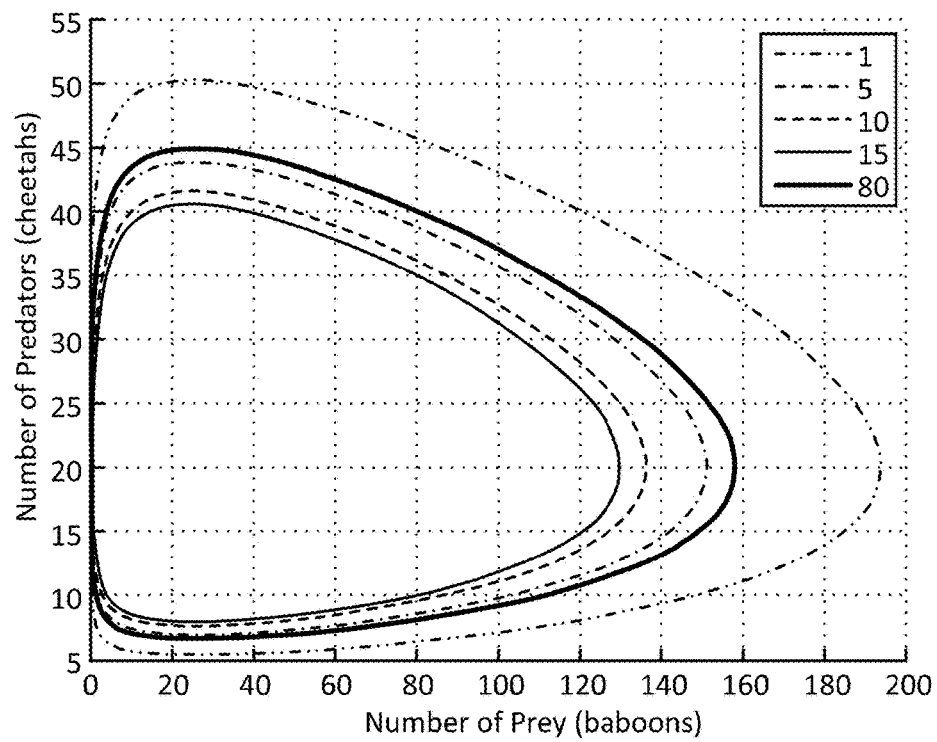
FIG. 1B is an example graph representing data set obtained from a Lotka-Volterra equation modeling the populations of predators and prey over time.

FIG. 1B is an example graph representing data set obtained from a Lotka-Volterra equation modeling the populations of predators and prey over time. From FIG. 1B, one observation about this data is that it is arranged in a loop. The loop is not exactly circular, but it is topologically a circle. The exact form of the equations, while interesting, may not be of as much importance as this qualitative observation which reflects the fact that the underlying phenomenon is recurrent or periodic. When looking for periodic or recurrent phenomena, methods may be developed which can detect the presence of loops without defining explicit models. For example, periodicity may be detectable without having to first develop a fully accurate model of the dynamics.

Figure 1C:
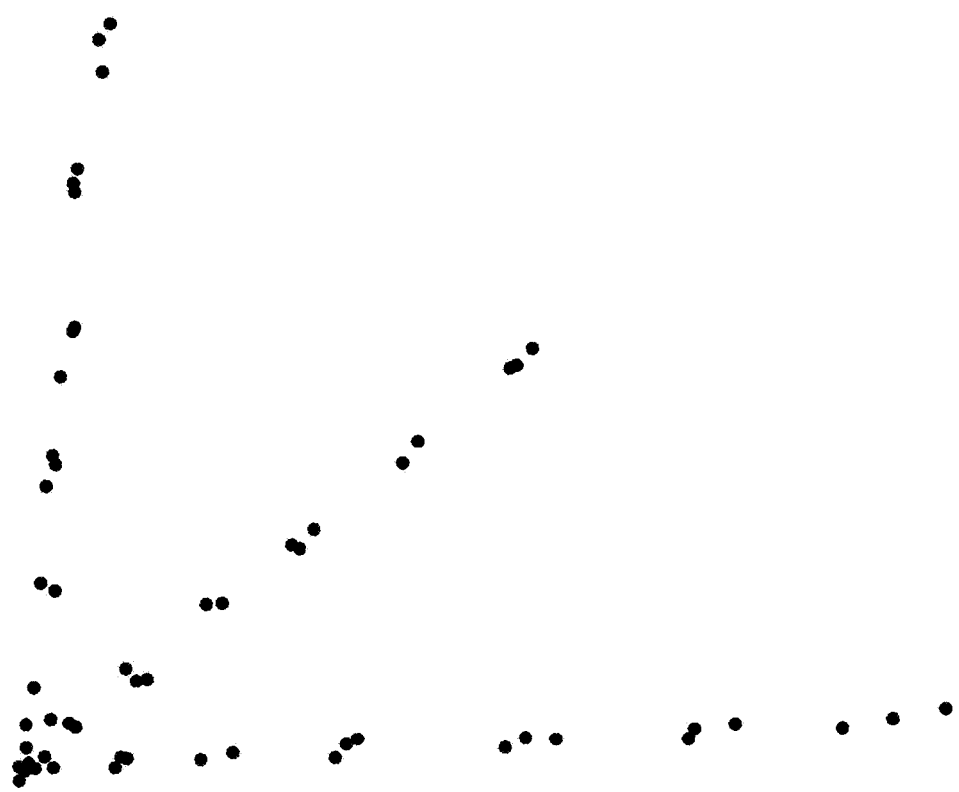
FIG. 1C is an example graph of data sets whereby the data does not break up into disconnected groups, but instead has a structure in which there are lines (or flares) emanating from a central group.

FIG. 1C is an example graph of data sets whereby the data does not break up into disconnected groups, but instead has a structure in which there are lines (or flares) emanating from a central group. In this case, the data also suggests the presence of three distinct groups, but the connectedness of the data does not reflect this. This particular data that is the basis for the example graph in FIG. 1C arises from a study of single nucleotide polymorphisms (SNPs).

In each of the examples above, aspects of the shape of the data are relevant in reflecting information about the data. Connectedness (the simplest property of shape) reflects the presence of a discrete classification of the data into disparate groups. The presence of loops, another simple aspect of shape, often reflect periodic or recurrent behavior. Finally, in the third example, the shape containing flares suggests a classification of the data descriptive of ways in which phenomena can deviate from the norm, which would typically be represented by the central core. These examples support the idea that the shape of data (suitably defined) is an important aspect of its structure, and that it is therefore important to develop methods for analyzing and understanding its shape. The part of mathematics which concerns itself with the study of shape is called topology, and topological data analysis attempts to adapt methods for studying shape which have been developed in pure mathematics to the study of the shape of data, suitably defined.

One question is how notions of geometry or shape are translated into information about point clouds, which are, after all, finite sets? What we mean by shape or geometry can come from a dissimilarity function or metric (e.g., a non-negative, symmetric, real-valued function d on the set of pairs of points in the data set which may also satisfy the triangle inequality, and $d(x; y)=0$ if and only if $x=y$). Such functions exist in profusion for many data sets. For example, when the data comes in the form of a numerical matrix, where the rows correspond to the data points and the columns are the fields describing the data, the n-dimensional Euclidean distance function is natural when there are n fields. Similarly, in this example, there are Pearson correlation distances, cosine distances, and other choices.

When the data is not Euclidean, for example if one is considering genomic sequences, various notions of distance may be defined using measures of similarity based on Basic Local Alignment Search Tool (BLAST) type similarity scores. Further, a measure of similarity can come in non-numeric forms, such as social networks of friends or similarities of hobbies, buying patterns, tweeting, and/or professional interests. In any of these ways the notion of shape may be formulated via the establishment of a useful notion of similarity of data points.

One of the advantages of TDA is that it may depend on nothing more than such a notion, which is a very primitive or low-level model. It may rely on many fewer assumptions than standard linear or algebraic models, for example. Further, the methodology may provide new ways of visualizing and compressing data sets, which facilitate understanding and monitoring data. The methodology may enable study of interrelationships among disparate data sets and/or multiscale/multiresolution study of data sets. Moreover, the methodology may enable interactivity in the analysis of data, using point and click methods.

TDA may be a very useful complement to more traditional methods, such as Principal Component Analysis (PCA), multidimensional scaling, and hierarchical clustering. These existing methods are often quite useful, but suffer from significant limitations. PCA, for example, is an essentially linear procedure and there are therefore limits to its utility in highly non-linear situations. Multidimensional scaling is a method which is not intrinsically linear, but can in many situations wash out detail, since it may overweight large distances. In addition, when metrics do not satisfy an intrinsic flatness condition, it may have difficulty in faithfully representing the data. Hierarchical clustering does exhibit multiscale behavior, but represents data only as disjoint clusters, rather than retaining any of the geometry of the data set. In all four cases, these limitations matter for many varied kinds of data.

We now summarize example properties of an example construction, in some embodiments, which may be used for representing the shape of data sets in a useful, understandable fashion as a finite graph:

The input may be a collection of data points equipped in some way with a distance or dissimilarity function, or other description. This can be given implicitly when the data is in the form of a matrix, or explicitly as a matrix of distances or even the generating edges of a mathematical network.

One construction may also use one or more lens functions (i.e. real valued functions on the data). Lens function(s) may depend directly on the metric. For example, lens function(s) might be the result of a density estimator or a measure of centrality or data depth. Lens function(s) may, in some embodiments, depend on a particular representation of the data, as when one uses the first one or two coordinates of a principal component or multidimensional scaling analysis. In some embodiments, the lens function(s) may be columns which expert knowledge identifies as being intrinsically interesting, as in cholesterol levels and BMI in a study of heart disease.

In some embodiments, the construction may depend on a choice of two or more processing parameters, resolution, and gain. Increase in resolution typically results in more nodes and an increase in the gain increases the number of edges in a visualization and/or graph in a reference space as further described herein.

The output may be, for example, a visualization (e.g., a display of connected nodes or "network") or simplicial complex. One specific combinatorial formulation in one embodiment may be that the vertices form a finite set, and then the additional structure may be a collection of edges (unordered pairs of vertices) which are pictured as connections in this network.

In various embodiments, a system for handling, analyzing, and visualizing data using drag and drop methods as opposed to text based methods is described herein. Philosophically, data analytic tools are not necessarily regarded as "solvers," but rather as tools for interacting with data. For example, data analysis may consist of several iterations of a process in which computational tools point to regions of interest in a data set. The data set may then be examined by people with domain expertise concerning the data, and the data set may then be subjected to further computational analysis. In some embodiments, methods described herein provide for going back and forth between mathematical constructs, including interactive visualizations (e.g., graphs), on the one hand and data on the other.

In one example of data analysis in some embodiments described herein, an exemplary clustering tool is discussed which may be more powerful than existing technology, in that one can find structure within clusters and study how clusters change over a period of time or over a change of scale or resolution.

An exemplary interactive visualization tool (e.g., a visualization module which is further described herein) may produce combinatorial output in the form of a graph which can be readily visualized. In some embodiments, the exemplary interactive visualization tool may be less sensitive to changes in notions of distance than current methods, such as multidimensional scaling.

Some embodiments described herein permit manipulation of the data from a isualization. For example, portions of the data which are deemed to be interesting from the visualization can be selected and converted into database objects, which can then be further analyzed. Some embodiments described herein permit the location of data points of interest within the visualization, so that the connection between a given visualization and the information the visualization represents may be readily understood.

Figure 2:
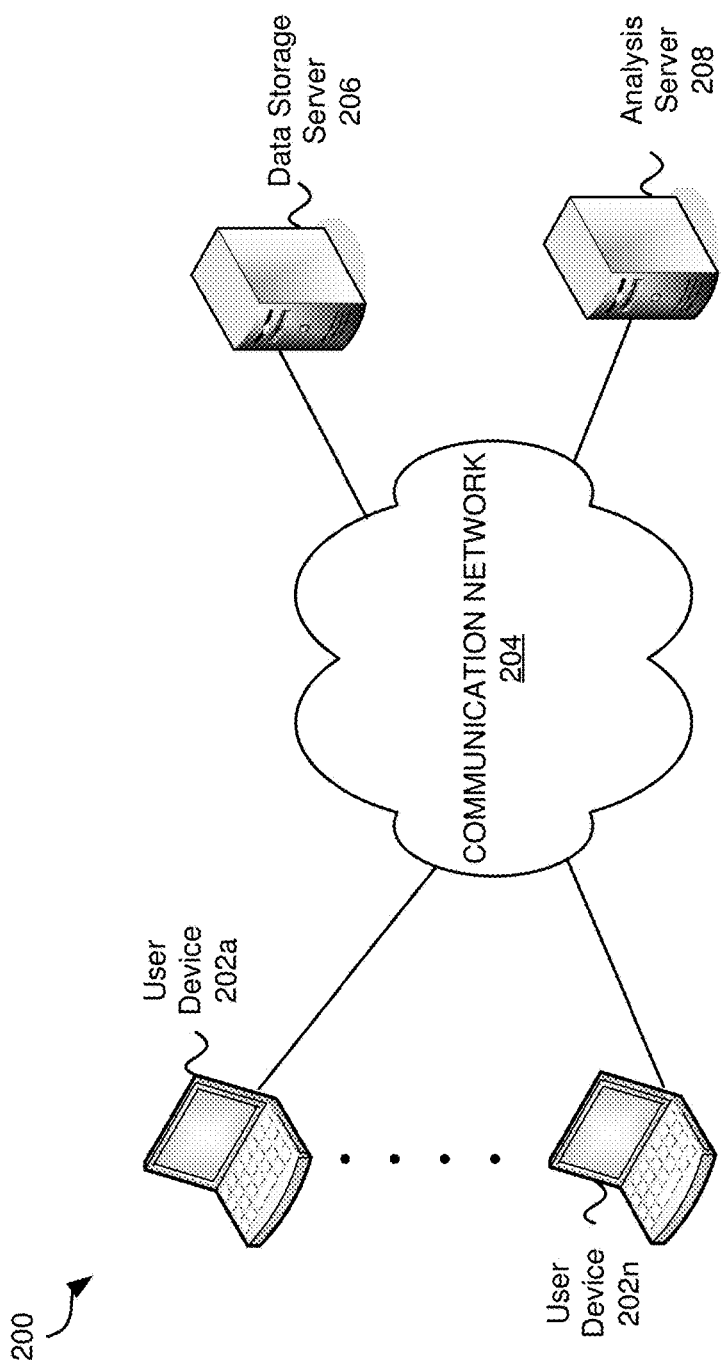
FIG. 2 is an exemplary environment in which embodiments may be practiced.

FIG. 2 is an exemplary environment 200 in which embodiments may be practiced.

In various embodiments, data analysis and interactive visualization may be performed locally (e.g., with software and/or hardware on a local digital device), across a network (e.g., via cloud computing), or a combination of both. In many of these embodiments, a data structure is accessed to obtain the data for the analysis, the analysis is performed based on properties and parameters selected by a user, and an interactive visualization is generated and displayed. There are many advantages between performing all or some activities locally and many advantages of performing all or some activities over a network.

Environment 200 comprises user devices 202a-202n, a communication network 204, data storage server 206, and analysis server 208. Environment 200 depicts an embodiment wherein functions are performed across a network. In this example, the user(s) may take advantage of cloud computing by storing data in a data storage server 206 over a communication network 204. The analysis server 208 may perform analysis and generation of an interactive visualization.

User devices 202a-202n may be any digital devices. A digital device is any device that comprises memory and a processor. Digital devices are further described in FIG. 2. The user devices 202a-202n may be any kind of digital device that may be used to access, analyze and/or view data including, but not limited to a desktop computer, laptop, notebook, or other computing device.

In various embodiments, a user, such as a data analyst, may generate a database or other data structure with the user device 202a to be saved to the data storage server 206. The user device 202a may communicate with the analysis server 208 via the communication network 204 to perform analysis, examination, and visualization of data within the database.

The user device 202a may comprise a client program for interacting with one or more applications on the analysis server 208. In other embodiments, the user device 202a may communicate with the analysis server 208 using a browser or other standard program. In various embodiments, the user device 202a communicates with the analysis server 208 via a virtual private network. It will be appreciated that that communication between the user device 202a, the data storage server 206, and/or the analysis server 208 may be encrypted or otherwise secured.

The communication network 204 may be any network that allows digital devices to communicate. The communication network 204 may be the Internet and/or include LAN and WANs. The communication network 204 may support wireless and/or wired communication.

The data storage server 206 is a digital device that is configured to store data. In various embodiments, the data storage server 206 stores databases and/or other data structures. The data storage server 206 may be a single server or a combination of servers. In one example the data storage server 206 may be a secure server wherein a user may store data over a secured connection (e.g., via https). The data may be encrypted and backed-up. In some embodiments, the data storage server 206 is operated by a third-party such as Amazon's S3 service.

The database or other data structure may comprise large high-dimensional datasets. These datasets are traditionally very difficult to analyze and, as a result, relationships within the data may not be identifiable using previous methods. Further, previous methods may be computationally inefficient.

The analysis server 208 is a digital device that may be configured to analyze data. In various embodiments, the analysis server may perform many functions to interpret, examine, analyze, and display data and/or relationships within data. In some embodiments, the analysis server 208 performs, at least in part, topological analysis of large datasets applying metrics, filters, and resolution parameters chosen by the user. The analysis is further discussed in FIG. 8 herein.

The analysis server 208 may generate an interactive visualization of the output of the analysis. The interactive visualization allows the user to observe and explore relationships in the data. In various embodiments, the interactive visualization allows the user to select nodes comprising data that has been clustered. The user may then access the underlying data, perform further analysis (e.g., statistical analysis) on the underlying data, and manually reorient the graph(s) (e.g., structures of nodes and edges described herein) within the interactive visualization. The analysis server 208 may also allow for the user to interact with the data, see the graphic result. The interactive visualization is further discussed in FIGS. 9-11.

In some embodiments, the analysis server 208 interacts with the user device(s) 202a-202n over a private and/or secure communication network. The user device 202a may comprise a client program that allows the user to interact with the data storage server 206, the analysis server 208, another user device (e.g., user device 202n), a database, and/or an analysis application executed on the analysis server 208.

Those skilled in the art will appreciate that all or part of the data analysis may occur at the user device 202a. Further, all or part of the interaction with the visualization (e.g., graphic) may be performed on the user device 202a.

Although two user devices 202a and 202n are depicted, those skilled in the art will appreciate that there may be any number of user devices in any location (e.g., remote from each other). Similarly, there may be any number of communication networks, data storage servers, and analysis servers.

Cloud computing may allow for greater access to large datasets (e.g., via a commercial storage service) over a faster connection. Further, it will be appreciated that services and computing resources offered to the user(s) may be scalable.

Figure 3:
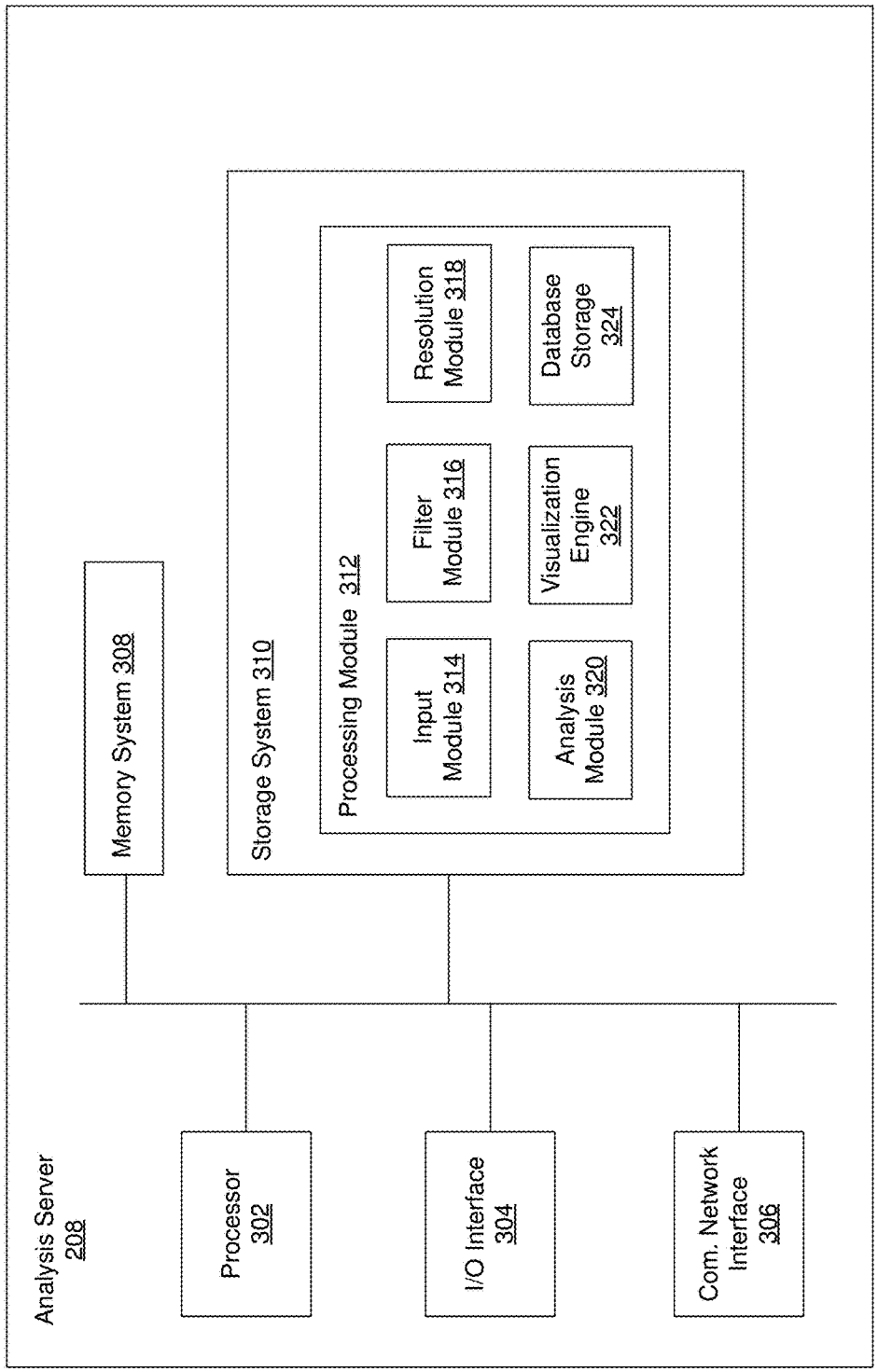
FIG. 3 is a block diagram of an exemplary analysis server.

FIG. 3 is a block diagram of an exemplary analysis server 208. In exemplary embodiments, the analysis server 208 comprises a processor 302, input/output (I/O) interface 304, a communication network interface 306, a memory system 308, a storage system 310, and a processing module 312. The processor 302 may comprise any processor or combination of processors with one or more cores.

The input/output (I/O) interface 304 may comprise interfaces for various I/O devices such as, for example, a keyboard, mouse, and display device. The exemplary communication network interface 306 is configured to allow the analysis server 208 to communication with the communication network 204 (see FIG. 2). The communication network interface 306 may support communication over an Ethernet connection, a serial connection, a parallel connection, and/or an ATA connection. The communication network interface 306 may also support wireless communication (e.g., 802.11 a/b/g/n, WiMax, LTE, WiFi). It will be apparent to those skilled in the art that the communication network interface 306 can support many wired and wireless standards.

The memory system 308 may be any kind of memory including RAM, ROM, or flash, cache, virtual memory, etc. In various embodiments, working data is stored within the memory system 308. The data within the memory system 308 may be cleared or ultimately transferred to the storage system 310.

The storage system 310 includes any storage configured to retrieve and store data. Some examples of the storage system 310 include flash drives, hard drives, optical drives, and/or magnetic tape. Each of the memory system 308 and the storage system 310 comprises a computer-readable medium, which stores instructions (e.g., software programs) executable by processor 302.

The storage system 310 comprises a plurality of modules utilized by embodiments of discussed herein. A module may be hardware, software (e.g., including instructions executable by a processor), or a combination of both. In one embodiment, the storage system 310 comprises a processing module 312 which comprises an input module 314, a filter module 316, a resolution module 318, an analysis module 320, a visualization engine 322, and database storage 324. Alternative embodiments of the analysis server 208 and/or the storage system 310 may comprise more, less, or functionally equivalent components and modules.

The input module 314 may be configured to receive commands and preferences from the user device 202a. In various examples, the input module 314 receives selections from the user which will be used to perform the analysis. The output of the analysis may be an interactive visualization.

The input module 314 may provide the user a variety of interface windows allowing the user to select and access a database, choose fields associated with the database, choose a metric, choose one or more filters, and identify resolution parameters for the analysis. In one example, the input module 314 receives a database identifier and accesses a large multidimensional database. The input module 314 may scan the database and provide the user with an interface window allowing the user to identify an ID field. An ID field is an identifier for each data point. In one example, the identifier is unique. The same column name may be present in the table from which filters are selected. After the ID field is selected, the input module 314 may then provide the user with another interface window to allow the user to choose one or more data fields from a table of the database.

Although interactive windows may be described herein, it will be appreciated that any window, graphical user interface, and/or command line may be used to receive or prompt a user or user device 202a for information.

The filter module 316 may subsequently provide the user with an interface window to allow the user to select a metric to be used in analysis of the data within the chosen data fields. The filter module 316 may also allow the user to select and/or define one or more filters.

The resolution module 218 may allow the user to select a resolution, including filter parameters. In one example, the user enters a number of intervals and a percentage overlap for a filter.

The analysis module 320 may perform data analysis based on the database and the information provided by the user. In various embodiments, the analysis module 320 performs an algebraic topological analysis to identify structures and relationships within data and clusters of data. It will be appreciated that the analysis module 320 may use parallel algorithms or use generalizations of various statistical techniques (e.g., generalizing the bootstrap to zig-zag methods) to increase the size of data sets that can be processed. The analysis is further discussed in FIG. 8. It will be appreciated that the analysis module 320 is not limited to algebraic topological analysis but may perform any analysis.

The visualization engine 322 generates an interactive visualization including the output from the analysis module 320. The interactive visualization allows the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described in FIGS. 9-11.

The database storage 324 is configured to store all or part of the database that is being accessed. In some embodiments, the database storage 324 may store saved portions of the database. Further, the database storage 324 may be used to store user preferences, parameters, and analysis output thereby allowing the user to perform many different functions on the database without losing previous work.

It will be appreciated that that all or part of the processing module 312 may be at the user device 202a or the database storage server 206. In some embodiments, all or some of the functionality of the processing module 312 may be performed by the user device 202a.

In various embodiments, systems and methods discussed herein may be implemented with one or more digital devices. In some examples, some embodiments discussed herein may be implemented by a computer program (instructions) executed by a processor. The computer program may provide a graphical user interface. Although such a computer program is discussed, it will be appreciated that embodiments may be performed using any of the following, either alone or in combination, including, but not limited to, a computer program, multiple computer programs, firmware, and/or hardware.

A module and/or engine may include any processor or combination of processors. In some examples, a module and/or engine may include or be a part of a processor, digital signal processor (DSP), application specific integrated circuit (ASIC), an integrated circuit, and/or the like. In various embodiments, the module and/or engine may be software or firmware.

Figure 4:
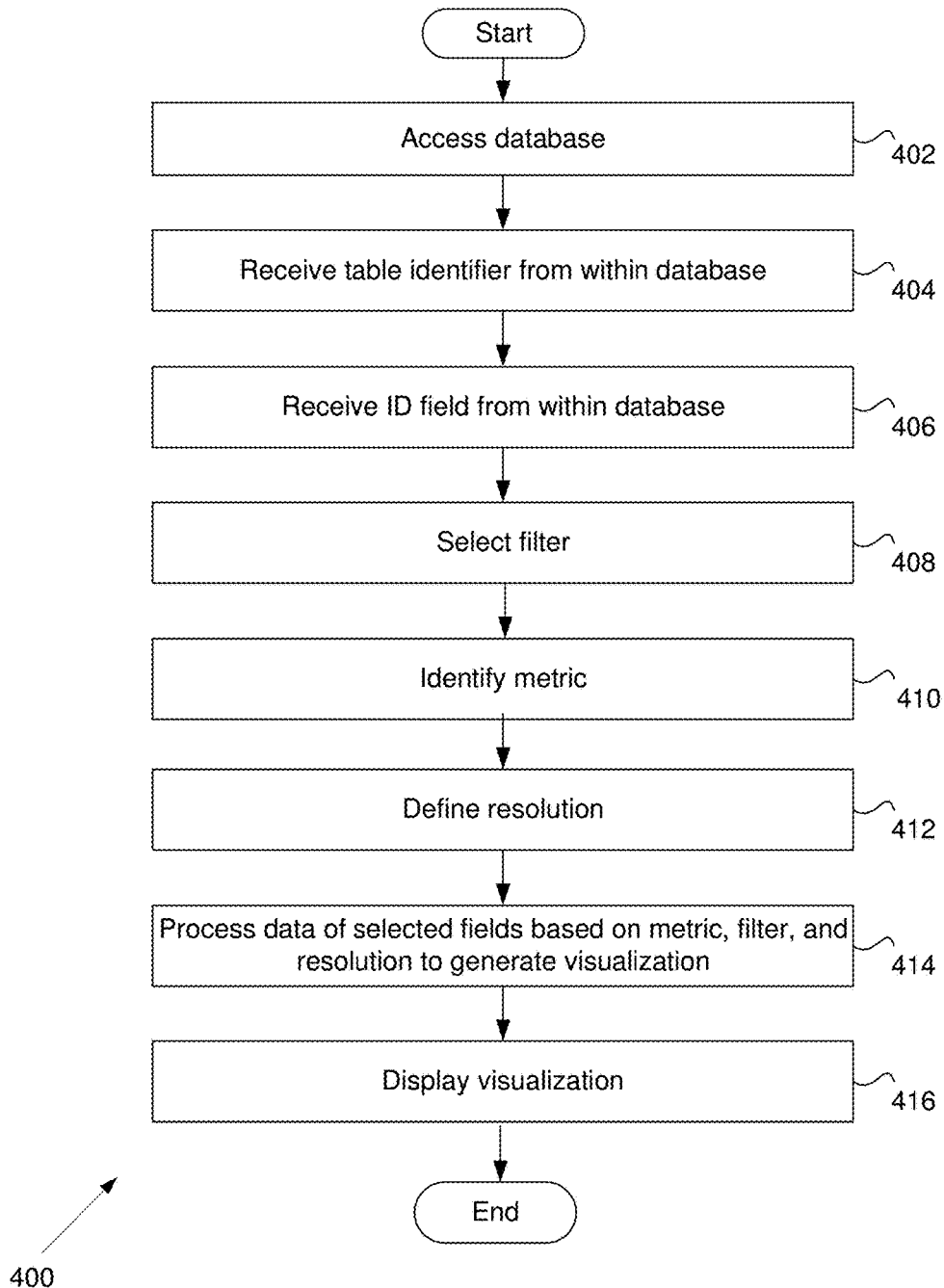
FIG. 4 is a flow chart depicting an exemplary method of dataset analysis and visualization in some embodiments.

FIG. 4 is a flow chart 400 depicting an exemplary method of dataset analysis and visualization in some embodiments. In step 402, the input module 314 accesses a database. The database may be any data structure containing data (e.g., a very large dataset of multidimensional data). In some embodiments, the database may be a relational database. In some examples, the relational database may be used with MySQL, Oracle, Micosoft SQL Server, Aster nCluster, Teradata, and/or Vertica. It will be appreciated that the database may not be a relational database.

In some embodiments, the input module 314 receives a database identifier and a location of the database (e.g., the data storage server 206) from the user device 202a (see FIG. 2). The input module 314 may then access the identified database. In various embodiments, the input module 314 may read data from many different sources, including, but not limited to MS Excel files, text files (e.g., delimited or CSV), Matlab .mat format, or any other file.

In some embodiments, the input module 314 receives an IP address or hostname of a server hosting the database, a username, password, and the database identifier. This information (herein referred to as "connection information") may be cached for later use. It will be appreciated that the database may be locally accessed and that all, some, or none of the connection information may be required. In one example, the user device 202a may have full access to the database stored locally on the user device 202a so the IP address is unnecessary. In another example, the user device 202a may already have loaded the database and the input module 314 merely begins by accessing the loaded database.

In various embodiments, the identified database stores data within tables. A table may have a "column specification" which stores the names of the columns and their data types. A "row" in a table, may be a tuple with one entry for each column of the correct type. In one example, a table to store employee records might have a column specification such as:
  employee_id primary key int (this may store the employee's ID as an integer, and uniquely identifies a row)
  age int
  gender char(1) (gender of the employee may be a single character either M or F)
  salary double (salary of an employee may be a floating point number)
  name varchar (name of the employee may be a variable-length string)

In this example, each employee corresponds to a row in this table. Further, the tables in this exemplary relational database are organized into logical units called databases. An analogy to file systems is that databases can be thought of as folders and files as tables. Access to databases may be controlled by the database administrator by assigning a username/password pair to authenticate users.

Once the database is accessed, the input module 314 may allow the user to access a previously stored analysis or to begin a new analysis. If the user begins a new analysis, the input module 314 may provide the user device 202a with an interface window allowing the user to identify a table from within the database. In one example, the input module 314 provides a list of available tables from the identified database.

In step 404, the input module 314 receives a table identifier identifying a table from within the database. The input module 314 may then provide the user with a list of available ID fields from the table identifier. In step 406, the input module 314 receives the ID field identifier from the user and/or user device 202a. The ID field is, in some embodiments, the primary key.

Having selected the primary key, the input module 314 may generate a new interface window to allow the user to select data fields for analysis. In step 408, the input module 314 receives data field identifiers from the user device 202a. The data within the data fields may be later analyzed by the analysis module 320.

In step 410, the filter module 316 identifies a metric. In some embodiments, the filter module 316 and/or the input module 314 generates an interface window allowing the user of the user device 202a options for a variety of different metrics and filter preferences. The interface window may be a drop down menu identifying a variety of distance metrics to be used in the analysis. Metric options may include, but are not limited to, Euclidean, DB Metric, variance normalized Euclidean, and total normalized Euclidean. The metric and the analysis are further described herein.

In step 412, the filter module 316 selects one or more filters. In some embodiments, the user selects and provides filter identifier(s) to the filter module 316. The role of the filters in the analysis is also further described herein. The filters, for example, may be user defined, geometric, or based on data which has been pre-processed. In some embodiments, the data based filters are numerical arrays which can assign a set of real numbers to each row in the table or each point in the data generally.

A variety of geometric filters may be available for the user to choose. Geometric filters may include, but are not limited to:
  Density
  L1 Eccentricity
  L-infinity Eccentricity
  Witness based Density
  Witness based Eccentricity
  Eccentricity as distance from a fixed point
  Approximate Kurtosis of the Eccentricity In step 414, the resolution module 218 defines the resolution to be used with a filter in the analysis. The resolution may comprise a number of intervals and an overlap parameter. In various embodiments, the resolution module 218 allows the user to adjust the number of intervals and overlap parameter (e.g., percentage overlap) for one or more filters.

In step 416, the analysis module 320 processes data of selected fields based on the metric, filter(s), and resolution(s) to generate the visualization. This process is discussed in FIG. 8.

In step 418, the visualization module 322 displays the interactive visualization. In various embodiments, the visualization may be rendered in two or three dimensional space. The visualization module 322 may use an optimization algorithm for an objective function which is correlated with good visualization (e.g., the energy of the embedding). The visualization may show a collection of nodes corresponding to each of the partial clusters in the analysis output and edges connecting them as specified by the output. The interactive visualization is further discussed in FIGS. 9-11.

Although many examples discuss the input module 314 as providing interface windows, it will be appreciated that all or some of the interface may be provided by a client on the user device 202a. Further, in some embodiments, the user device 202a may be running all or some of the processing module 212.

Figure 5:
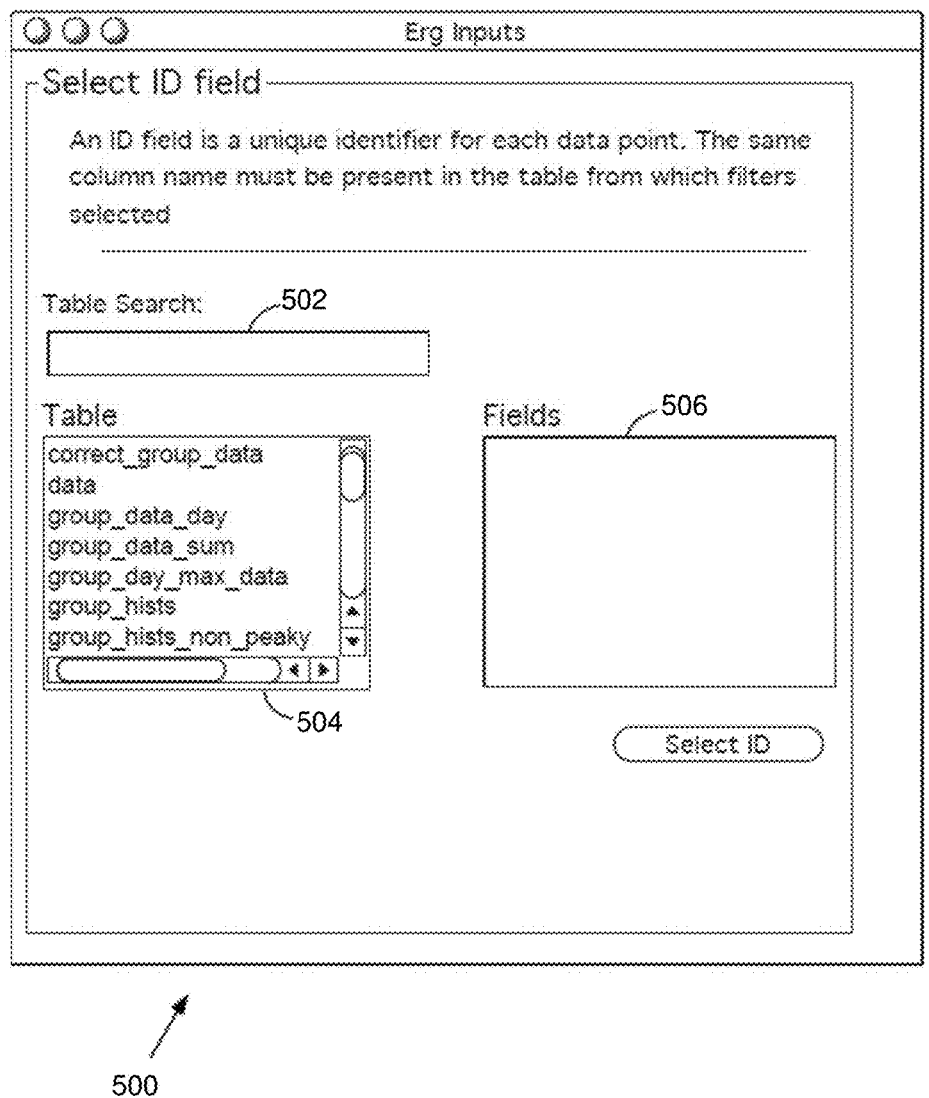
FIG. 5 is an exemplary ID field selection interface window in some embodiments.
Figure 6A:
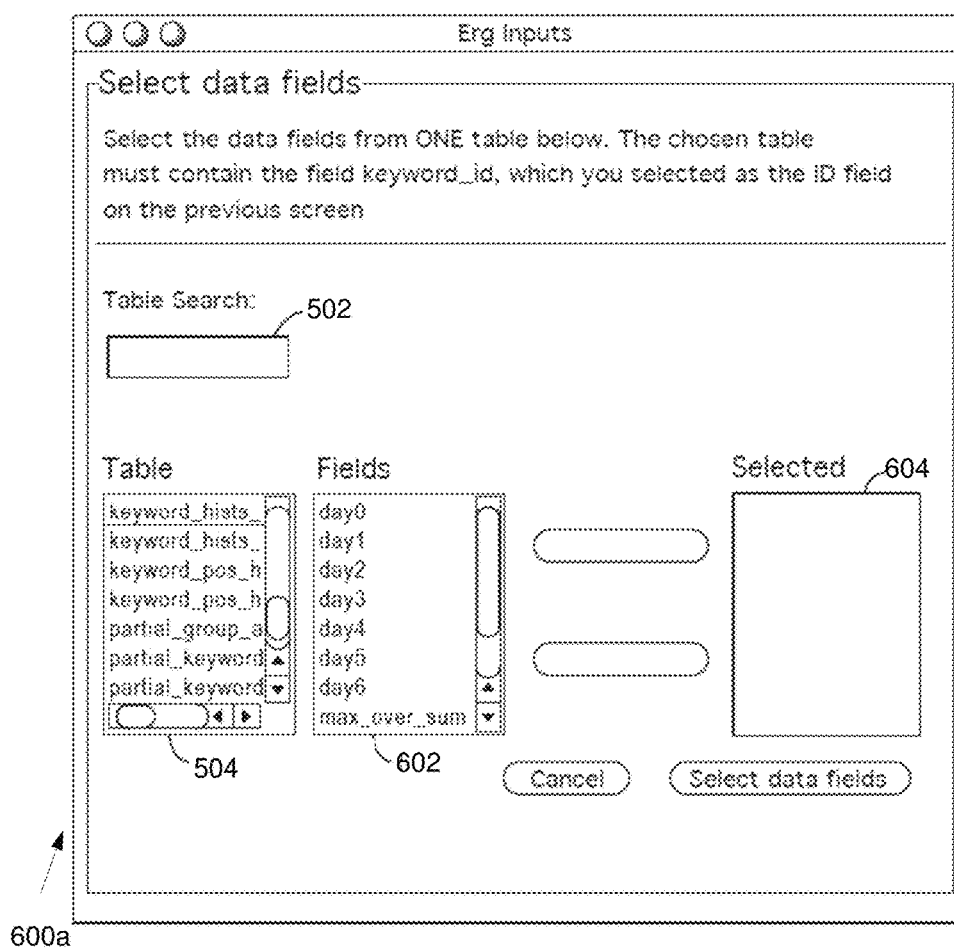
FIG. 6A is an exemplary data field selection interface window in some embodiments.
Figure 6B:
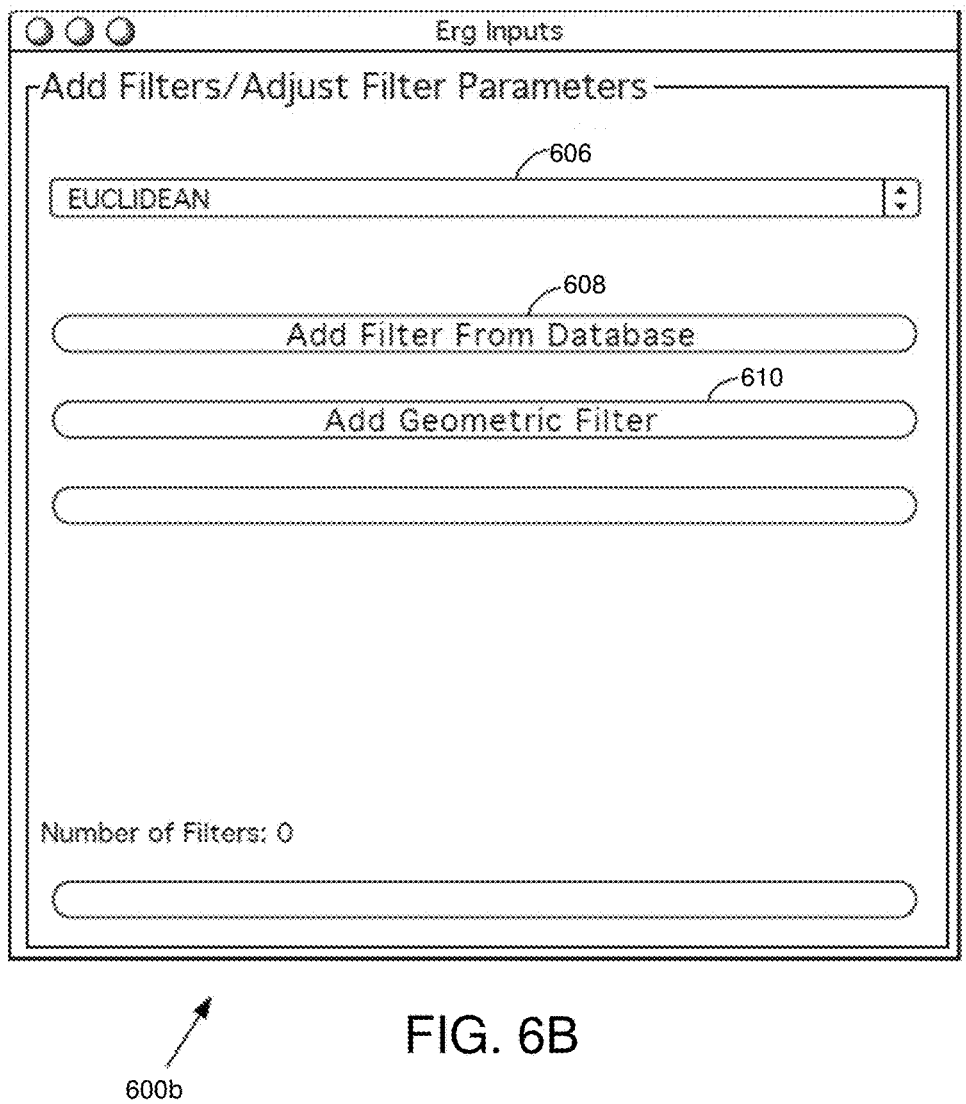
FIG. 6B is an exemplary metric and filter selection interface window in some embodiments.
Figure 7:
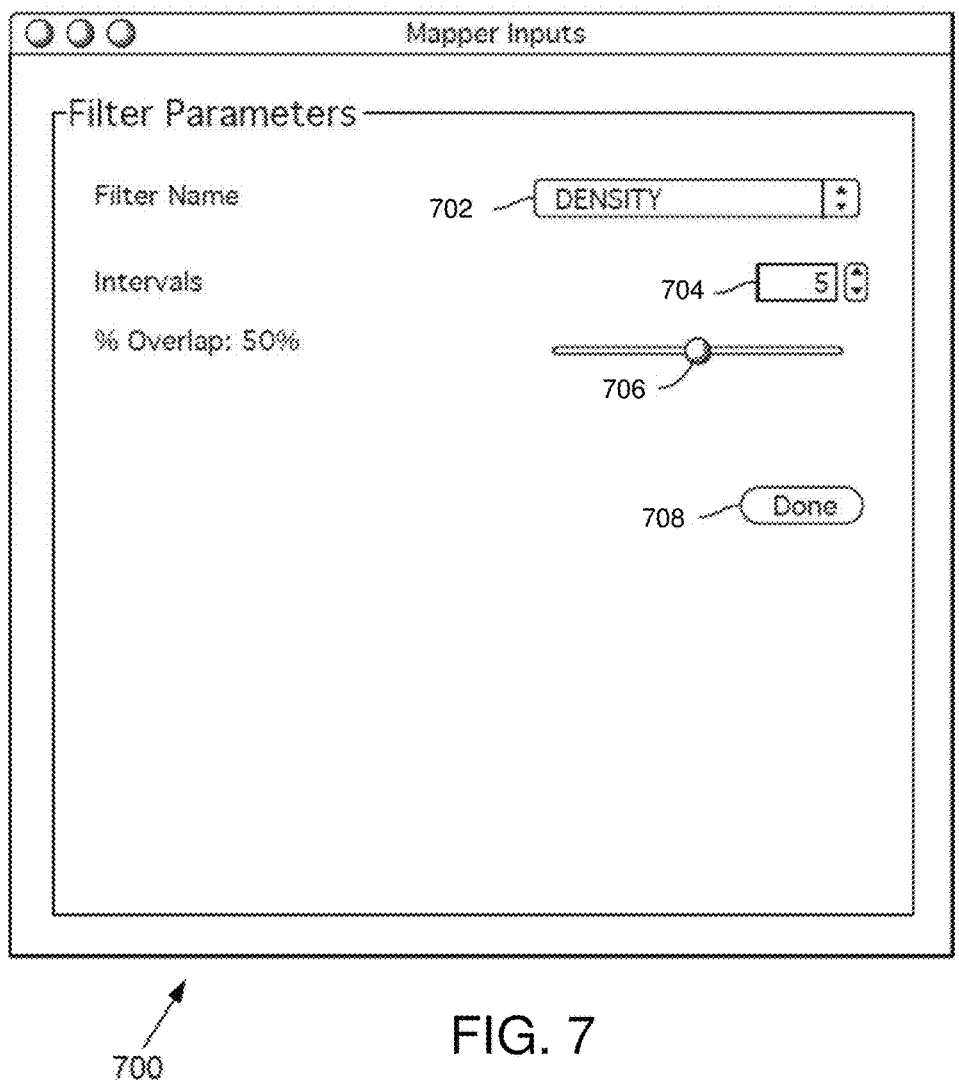
FIG. 7 is an exemplary filter parameter interface window in some embodiments.

FIGS. 5-7 depict various interface windows to allow the user to make selections, enter information (e.g., fields, metrics, and filters), provide parameters (e.g., resolution), and provide data (e.g., identify the database) to be used with analysis. It will be appreciated that any graphical user interface or command line may be used to make selections, enter information, provide parameters, and provide data.

FIG. 5 is an exemplary ID field selection interface window 500 in some embodiments. The ID field selection interface window 500 allows the user to identify an ID field. The ID field selection interface window 500 comprises a table search field 502, a table list 504, and a fields selection window 506.

In various embodiments, the input module 314 identifies and accesses a database from the database storage 324, user device 202a, or the data storage server 206. The input module 314 may then generate the ID field selection interface window 500 and provide a list of available tables of the selected database in the table list 504. The user may click on a table or search for a table by entering a search query (e.g., a keyword) in the table search field 502. Once a table is identified (e.g., clicked on by the user), the fields selection window 506 may provide a list of available fields in the selected table. The user may then choose a field from the fields selection window 506 to be the ID field. In some embodiments, any number of fields may be chosen to be the ID field(s).

FIG. 6A is an exemplary data field selection interface window 600a in some embodiments. The data field selection interface window 600a allows the user to identify data fields. The data field selection interface window 600a comprises a table search field 502, a table list 504, a fields selection window 602, and a selected window 604.

In various embodiments, after selection of the ID field, the input module 314 provides a list of available tables of the selected database in the table list 504. The user may click on a table or search for a table by entering a search query (e.g., a keyword) in the table search field 502. Once a table is identified (e.g., clicked on by the user), the fields selection window 506 may provide a list of available fields in the selected table. The user may then choose any number of fields from the fields selection window 602 to be data fields. The selected data fields may appear in the selected window 604. The user may also deselect fields that appear in the selected window 604.

It will be appreciated that the table selected by the user in the table list 504 may be the same table selected with regard to FIG. 5. In some embodiments, however, the user may select a different table. Further, the user may, in various embodiments, select fields from a variety of different tables.

FIG. 6B is an exemplary metric and filter selection interface window 600b in some embodiments. The metric and filter selection interface window 600b allows the user to identify a metric, add filter(s), and adjust filter parameters. The metric and filter selection interface window 600b comprises a metric pull down menu 606, an add filter from database button 608, and an add geometric filter button 610.

In various embodiments, the user may click on the metric pull down menu 606 to view a variety of metric options. Various metric options are described herein. In some embodiments, the user may define a metric. The user defined metric may then be used with the analysis.

In one example, finite metric space data may be constructed from a data repository (i.e., database, spreadsheet, or Matlab file). This may mean selecting a collection of fields whose entries will specify the metric using the standard Euclidean metric for these fields, when they are floating point or integer variables. Other notions of distance, such as graph distance between collections of points, may be supported.

The analysis module 320 may perform analysis using the metric as a part of a distance function. The distance function can be expressed by a formula, a distance matrix, or other routine which computes it. The user may add a filter from a database by clicking on the add filter from database button 608. The metric space may arise from a relational database, a Matlab file, an Excel spreadsheet, or other methods for storing and manipulating data. The metric and filter selection interface window 600b may allow the user to browse for other filters to use in the analysis. The analysis and metric function are further described in FIG. 8.

The user may also add a geometric filter 610 by clicking on the add geometric filter button 610. In various embodiments, the metric and filter selection interface window 600b may provide a list of geometric filters from which the user may choose.

FIG. 7 is an exemplary filter parameter interface window 700 in some embodiments. The filter parameter interface window 700 allows the user to determine a resolution for one or more selected filters (e.g., filters selected in the metric and filter selection interface window 600). The filter parameter interface window 700 comprises a filter name menu 702, an interval field 704, an overlap bar 706, and a done button 708.

The filter parameter interface window 700 allows the user to select a filter from the filter name menu 702. In some embodiments, the filter name menu 702 is a drop down box indicating all filters selected by the user in the metric and filter selection interface window 600. Once a filter is chosen, the name of the filter may appear in the filter name menu 702. The user may then change the intervals and overlap for one, some, or all selected filters.

The interval field 704 allows the user to define a number of intervals for the filter identified in the filter name menu 702. The user may enter a number of intervals or scroll up or down to get to a desired number of intervals. Any number of intervals may be selected by the user. The function of the intervals is further discussed in FIG. 8.

The overlap bar 706 allows the user to define the degree of overlap of the intervals for the filter identified in the filter name menu 702. In one example, the overlap bar 706 includes a slider that allows the user to define the percentage overlap for the interval to be used with the identified filter. Any percentage overlap may be set by the user.

Once the intervals and overlap are defined for the desired filters, the user may click the done button. The user may then go back to the metric and filter selection interface window 600 and see a new option to run the analysis. In some embodiments, the option to run the analysis may be available in the filter parameter interface window 700. Once the analysis is complete, the result may appear in an interactive visualization which is further described in FIGS. 9-11.

It will be appreciated that that interface windows in FIGS. 4-7 are exemplary. The exemplary interface windows are not limited to the functional objects (e.g., buttons, pull down menus, scroll fields, and search fields) shown. Any number of different functional objects may be used. Further, as described herein, any other interface, command line, or graphical user interface may be used.

Figure 8:
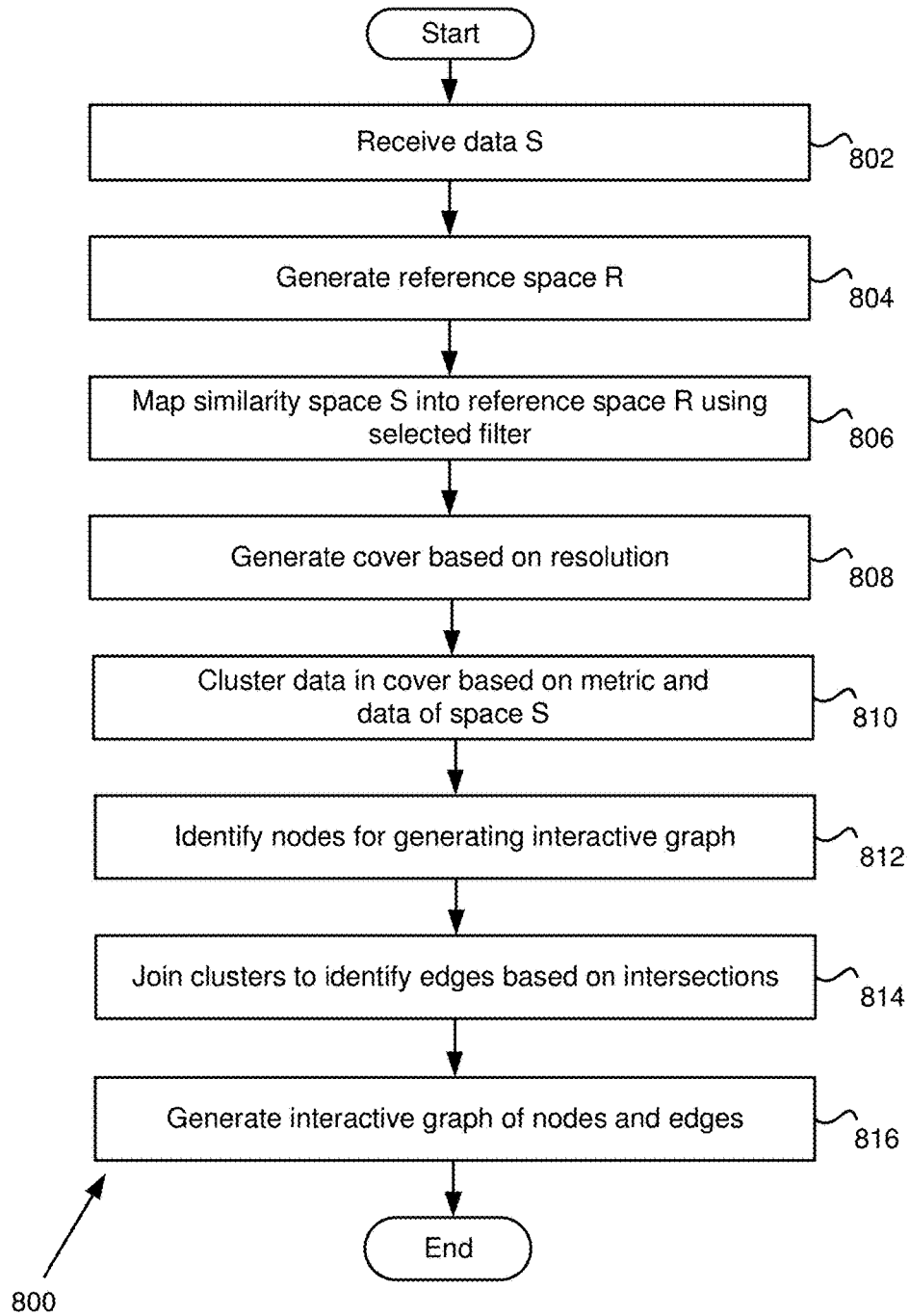
FIG. 8 is a flowchart for data analysis and generating a visualization in some embodiments.

FIG. 8 is a flowchart 800 for data analysis and generating an interactive visualization in some embodiments. In various embodiments, the processing on data and user-specified options is motivated by techniques from topology and, in some embodiments, algebraic topology. These techniques may be robust and general. In one example, these techniques apply to almost any kind of data for which some qualitative idea of "closeness" or "similarity" exists. The techniques discussed herein may be robust because the results may be relatively insensitive to noise in the data, user options, and even to errors in the specific details of the qualitative measure of similarity, which, in some embodiments, may be generally refer to as "the distance function" or "metric." It will be appreciated that while the description of the algorithms below may seem general, the implementation of techniques described herein may apply to any level of generality.

In step 802, the input module 314 receives data S. In one example, a user identifies a data structure and then identifies ID and data fields. Data S may be based on the information within the ID and data fields. In various embodiments, data S is treated as being processed as a finite "similarity space," where data S has a real-valued function d defined on pairs of points s and t in S, such that:

$$d(s,s)=0$$

$$d(s,t)=d(t,s)$$

$$d(s,t)>=0$$

These conditions may be similar to requirements for a finite metric space, but the conditions may be weaker. In various examples, the function is a metric.

It will be appreciated that data S may be a finite metric space, or a generalization thereof, such as a graph or weighted graph. In some embodiments, data S be specified by a formula, an algorithm, or by a distance matrix which specifies explicitly every pairwise distance.

In step 804, the input module 314 generates reference space R. In one example, reference space R may be a well-known metric space (e.g., such as the real line). The reference space R may be defined by the user. In step 806, the analysis module 320 generates a map ref( ) from S into R. The map ref( ) from S into R may be called the "reference map."

In one example, a reference of map from S is to a reference metric space R. R may be Euclidean space of some dimension, but it may also be the circle, torus, a tree, or other metric space. The map can be described by one or more filters (i.e., real valued functions on S). These filters can be defined by geometric invariants, such as the output of a density estimator, a notion of data depth, or functions specified by the origin of S as arising from a data set.

In step 808, the resolution module 218 generates a cover of R based on the resolution received from the user (e.g., filter(s), intervals, and overlap—see FIG. 7). The cover of R may be a finite collection of open sets (in the metric of R) such that every point in R lies in at least one of these sets. In various examples, R is k-dimensional Euclidean space, where k is the number of filter functions. More precisely in this example, R is a box in k-dimensional Euclidean space given by the product of the intervals [min_k, max_k], where min_k is the minimum value of the k-th filter function on S, and max_k is the maximum value.

For example, suppose there are 2 filter functions, F1 and F2, and that F1's values range from −1 to +1, and F2's values range from 0 to 5. Then the reference space is the rectangle in the x/y plane with corners (−1,0), (1,0), (−1, 5), (1, 5), as every point s of S will give rise to a pair (F1(s), F2(s)) that lies within that rectangle.

In various embodiments, the cover of R is given by taking products of intervals of the covers of [min_k,max_k] for each of the k filters. In one example, if the user requests 2 intervals and a 50% overlap for F1, the cover of the interval [−1,+1] will be the two intervals (−1.5, 0.5), (−0.5, 1.5). If the user requests 5 intervals and a 30% overlap for F2, then that cover of [0, 5] will be (−0.3, 1.3), (0.7, 2.3), (1.7, 3.3), (2.7, 4.3), (3.7, 5.3). These intervals may give rise to a cover of the 2-dimensional box by taking all possible pairs of intervals where the first of the pair is chosen from the cover for F1 and the second from the cover for F2. This may give rise to 2*5, or 10, open boxes that covered the 2-dimensional reference space. However, it will be appreciated that the intervals may not be uniform, or that the covers of a k-dimensional box may not be constructed by products of intervals. In some embodiments, there are many other choices of intervals. Further, in various embodiments, a wide range of covers and/or more general reference spaces may be used.

In one example, given a cover, C1, . . . , Cm, of R, the reference map is used to assign a set of indices to each point in S, which are the indices of the Cj such that ref(s) belongs to Cj. This function may be called ref_tags(s). In a language such as Java, ref_tags would be a method that returned an int[ ]. Since the C's cover R in this example, ref(s) must lie in at least one of them, but the elements of the cover usually overlap one another, which means that points that "land near the edges" may well reside in multiple cover sets. In considering the two filter example, if F1(s) is −0.99, and F2(s) is 0.001, then ref(s) is (−0.99, 0.001), and this lies in the cover element (−1.5, 0.5)×(−0.3,1.3). Supposing that was labeled C1, the reference map may assign s to the set {1}. On the other hand, if t is mapped by F1, F2 to (0.1, 2.1), then ref(t) will be in (−1.5,0.5)×(0.7, 2.3), (−0.5, 1.5)×(0.7, 2.3), (−1.5,0.5)×(1.7,3.3), and (−0.5, 1.5)×(1.7,3.3), so the set of indices would have four elements for t.

Having computed, for each point, which "cover tags" it is assigned to, for each cover element, Cd, the points may be constructed, whose tags include d, as set S(d). This may mean that every point s is in S(d) for some d, but some points may belong to more than one such set. In some embodiments, there is, however, no requirement that each S(d) is non-empty, and it is frequently the case that some of these sets are empty. In the non-parallelized version of some embodiments, each point x is processed in turn, and x is inserted into a hash-bucket for each j in ref_tags(t) (that is, this may be how S(d) sets are computed).

It will be appreciated that the cover of the reference space R may be controlled by the number of intervals and the overlap identified in the resolution (e.g., see FIG. 7). For example, the more intervals, the finer the resolution in S—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 810, the analysis module 320 clusters each S(d) based on the metric, filter, and the space S. In some embodiments, a dynamic single-linkage clustering algorithm may be used to partition S(d). It will be appreciated that any number of clustering algorithms may be used with embodiments discussed herein. For example, the clustering scheme may be k-means clustering for some k, single linkage clustering, average linkage clustering, or any method specified by the user.

The significance of the user-specified inputs may now be seen. In some embodiments, a filter may amount to a "forced stretching" in a certain direction. In some embodiments, the analysis module 320 may not cluster two points unless ALL of the filter values are sufficiently "related" (recall that while normally related may mean "close," the cover may impose a much more general relationship on the filter values, such as relating two points s and t if ref(s) and ref(t) are sufficiently close to the same circle in the plane). In various embodiments, the ability of a user to impose one or more "critical measures" makes this technique more powerful than regular clustering, and the fact that these filters can be anything, is what makes it so general.

The output may be a simplicial complex, from which one can extract its 1-skeleton. The nodes of the complex may be partial clusters, (i.e., clusters constructed from subsets of S specified as the preimages of sets in the given covering of the reference space R).

In step 812, the visualization engine 322 identifies nodes which are associated with a subset of the partition elements of all of the S(d) for generating an interactive visualization. For example, suppose that S={1, 2, 3, 4}, and the cover is C1, C2, C3. Then if ref_tags(1)={1, 2, 3} and ref_tags(2)={2, 3}, and ref_tags(3)={3}, and finally ref_tags(4)={1, 3}, then S(1) in this example is {1, 4}, S(2)={1,2}, and S(3)={1, 2, 3, 4}. If 1 and 2 are close enough to be clustered, and 3 and 4 are, but nothing else, then the clustering for S(1) may be {1} {3}, and for S(2) it may be {1,2}, and for S(3) it may be {1,2}, {3,4}. So the generated graph has, in this example, at most four nodes, given by the sets {1}, {4}, {1,2}, and {3,4} (note that {1,2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it. For example, if the points are consumers, for instance, clusters with too few people in area codes served by a company could be eliminated. If a cluster was found with "enough" customers, however, this might indicate that expansion into area codes of the other consumers in the cluster could be warranted.

In step 814, the visualization engine 322 joins clusters to identify edges (e.g., connecting lines between nodes). Once the nodes are constructed, the intersections (e.g., edges) may be computed "all at once," by computing, for each point, the set of node sets (not ref_tags, this time). That is, for each s in S, node_id_set(s) may be computed, which is an int[ ]. In some embodiments, if the cover is well behaved, then this operation is linear in the size of the set S, and we then iterate over each pair in node_id_set(s). There may be an edge between two node_id's if they both belong to the same node_id_set( ) value, and the number of points in the intersection is precisely the number of different node_id_sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently.

Figure 10:
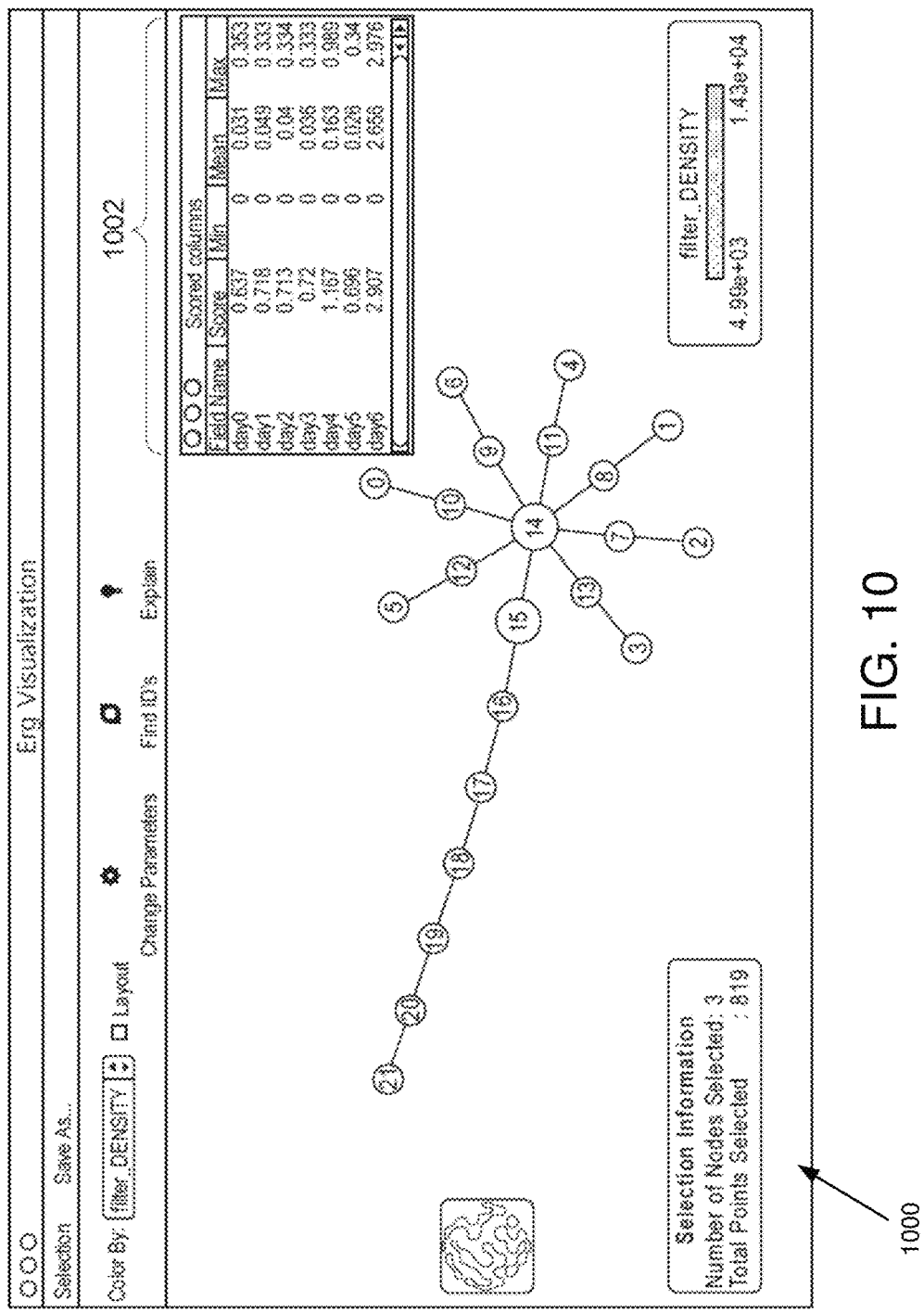
FIG. 10 is an exemplary interactive visualization displaying an explain information window in some embodiments.
Figure 11:
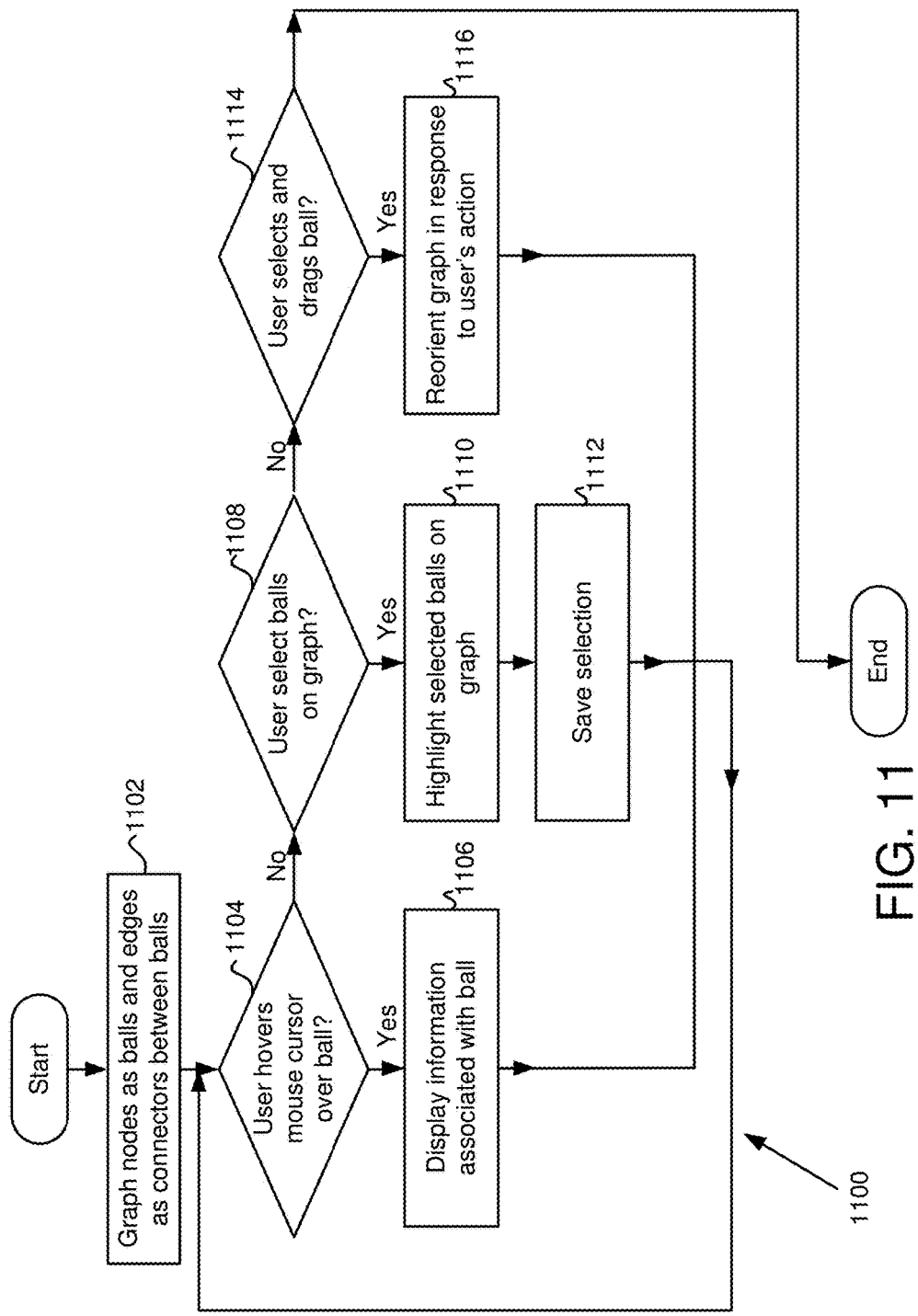
FIG. 11 is a flowchart of functionality of the interactive visualization in some embodiments.

In step 816, the visualization engine 322 generates the interactive visualization of interconnected nodes (e.g., nodes and edges displayed in FIGS. 10 and 11).

It will be appreciated that it is possible, in some embodiments, to make sense in a fairly deep way of connections between various ref( ) maps and/or choices of clustering. Further, in addition to computing edges (pairs of nodes), the embodiments described herein may be extended to compute triples of nodes, etc. For example, the analysis module 320 may compute simplicial complexes of any dimension (by a variety of rules) on nodes, and apply techniques from homology theory to the graphs to help users understand a structure in an automatic (or semi-automatic) way.

Further, it will be appreciated that uniform intervals in the covering may not always be a good choice. For example, if the points are exponentially distributed with respect to a given filter, uniform intervals can fail—in such case adaptive interval sizing may yield uniformly-sized S(d) sets, for instance.

Further, in various embodiments, an interface may be used to encode techniques for incorporating third-party extensions to data access and display techniques. Further, an interface may be used to for third-party extensions to underlying infrastructure to allow for new methods for generating coverings, and defining new reference spaces.

Figure 9:
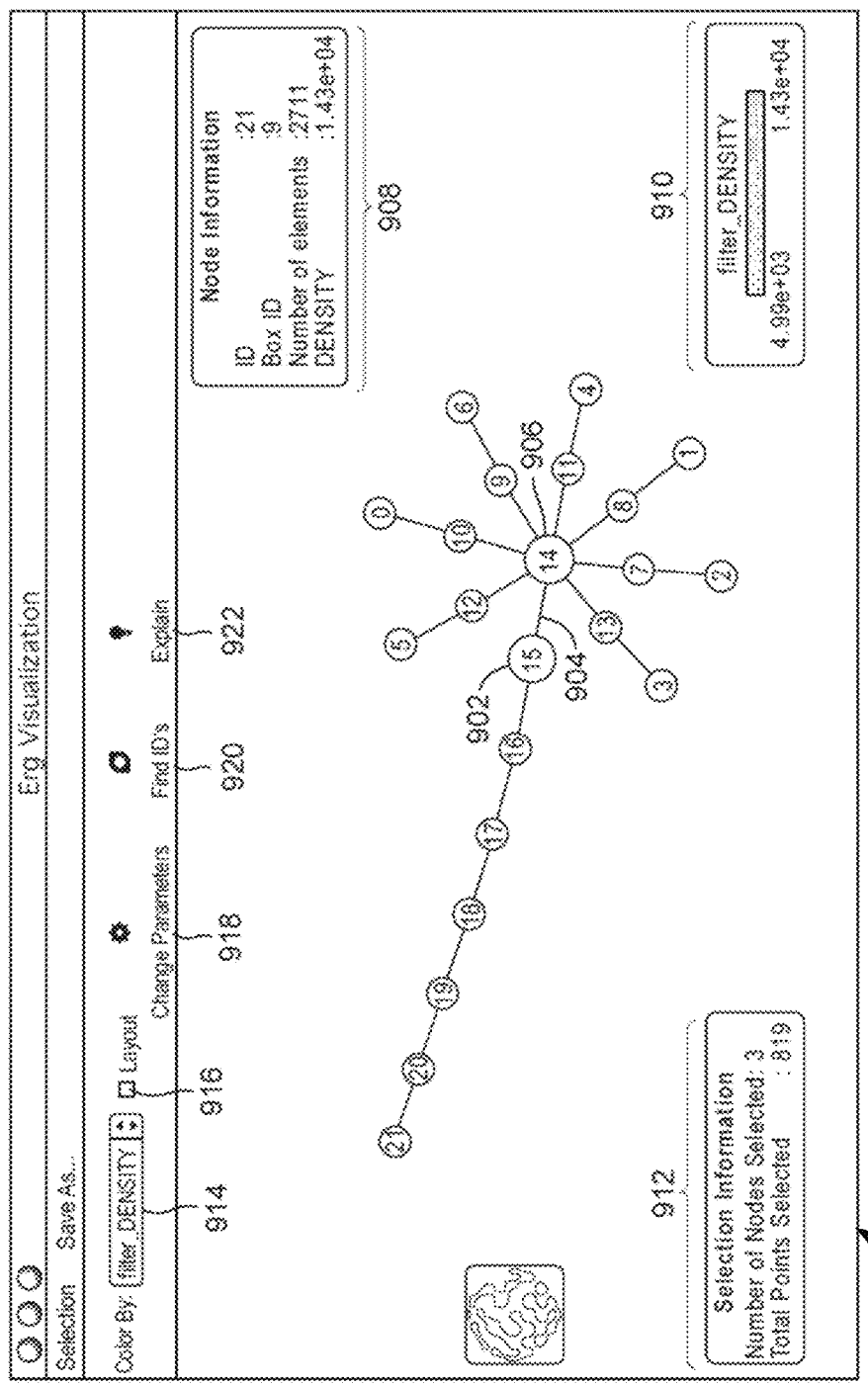
FIG. 9 is an exemplary interactive visualization in some embodiments.

FIG. 9 is an exemplary interactive visualization 900 in some embodiments. The display of the interactive visualization may be considered a "graph" in the mathematical sense. The interactive visualization comprises of two types of objects: nodes (e.g., nodes 902 and 906) (the colored balls) and the edges (e.g., edge 904) (the black lines). The edges connect pairs of nodes (e.g., edge 904 connects node 902 with node 906). As discussed herein, each node may represent a collection of data points (rows in the database identified by the user). In one example, connected nodes tend to include data points which are "similar to" (e.g., clustered with) each other. The collection of data points may be referred to as being "in the node." The interactive visualization may be two-dimensional, three-dimensional, or a combination of both.

In various embodiments, connected nodes and edges may form a graph or structure. There may be multiple graphs in the interactive visualization. In one example, the interactive visualization may display two or more unconnected structures of nodes and edges.

The visual properties of the nodes and edges (such as, but not limited to, color, stroke color, text, texture, shape, coordinates of the nodes on the screen) can encode any data based property of the data points within each node. For example, coloring of the nodes and/or the edges may indicate (but is not limited to) the following:

Values of fields or filters

Any general functions of the data in the nodes (e.g., if the data were unemployment rates by state, then GDP of the states may be identifiable by color the nodes)

Number of data points in the node

The interactive visualization 900 may contain a "color bar" 910 which may comprise a legend indicating the coloring of the nodes (e.g., balls) and may also identify what the colors indicate. For example, in FIG. 9, color bar 910 indicates that color is based on the density filter with blue (on the far left of the color bar 910) indicating "4.99e+03" and red (on the far right of the color bar 910) indicating "1.43e+04." In general this might be expanded to show any other legend by which nodes and/or edges are colored. It will be appreciated that the, In some embodiments, the user may control the color as well as what the color (and/or stroke color, text, texture, shape, coordinates of the nodes on the screen) indicates.

The user may also drag and drop objects of the interactive visualization 900. In various embodiments, the user may reorient structures of nodes and edges by dragging one or more nodes to another portion of the interactive visualization (e.g., a window). In one example, the user may select node 902, hold node 902, and drag the node across the window. The node 902 will follow the user's cursor, dragging the structure of edges and/or nodes either directly or indirectly connected to the node 902. In some embodiments, the interactive visualization 900 may depict multiple unconnected structures. Each structure may include nodes, however, none of the nodes of either structure are connected to each other. If the user selects and drags a node of the first structure, only the first structure will be reoriented with respect to the user action. The other structure will remain unchanged. The user may wish to reorient the structure in order to view nodes, select nodes, and/or better understand the relationships of the underlying data.

In one example, a user may drag a node to reorient the interactive visualization (e.g., reorient the structure of nodes and edges). While the user selects and/or drags the node, the nodes of the structure associated with the selected node may move apart from each other in order to provide greater visibility. Once the user lets go (e.g., deselects or drops the node that was dragged), the nodes of the structure may continue to move apart from each other.

In various embodiments, once the visualization module 322 generates the interactive display, the depicted structures may move by spreading out the nodes from each other. In one example, the nodes spread from each other slowly allowing the user to view nodes distinguish from each other as well as the edges. In some embodiments, the visualization module 322 optimizes the spread of the nodes for the user's view. In one example, the structure(s) stop moving once an optimal view has been reached.

It will be appreciated that the interactive visualization 900 may respond to gestures (e.g., multitouch), stylus, or other interactions allowing the user to reorient nodes and edges and/or interacting with the underlying data.

The interactive visualization 900 may also respond to user actions such as when the user drags, clicks, or hovers a mouse cursor over a node. In some embodiments, when the user selects a node or edge, node information or edge information may be displayed. In one example, when a node is selected (e.g., clicked on by a user with a mouse or a mouse cursor hovers over the node), a node information box 908 may appear that indicates information regarding the selected node. In this example, the node information box 908 indicates an ID, box ID, number of elements (e.g., data points associated with the node), and density of the data associated with the node.

The user may also select multiple nodes and/or edges by clicking separate on each object, or drawing a shape (such as a box) around the desired objects. Once the objects are selected, a selection information box 912 may display some information regarding the selection. For example, selection information box 912 indicates the number of nodes selected and the total points (e.g., data points or elements) of the selected nodes.

The interactive visualization 900 may also allow a user to further interact with the display. Color option 914 allows the user to display different information based on color of the objects. Color option 914 in FIG. 9 is set to filter_Density, however, other filters may be chosen and the objects re-colored based on the selection. It will be appreciated that the objects may be colored based on any filter, property of data, or characterization. When a new option is chosen in the color option 914, the information and/or colors depicted in the color bar 910 may be updated to reflect the change.

Layout checkbox 914 may allow the user to anchor the interactive visualization 900. In one example, the layout checkbox 914 is checked indicating that the interactive visualization 900 is anchored. As a result, the user will not be able to select and drag the node and/or related structure. Although other functions may still be available, the layout checkbox 914 may help the user keep from accidentally moving and/or reorienting nodes, edges, and/or related structures. It will be appreciated that the layout checkbox 914 may indicate that the interactive visualization 900 is anchored when the layout checkbox 914 is unchecked and that when the layout checkbox 914 is checked the interactive visualization 900 is no longer anchored.

The change parameters button 918 may allow a user to change the parameters (e.g., add/remove filters and/or change the resolution of one or more filters). In one example, when the change parameters button 918 is activated, the user may be directed back to the metric and filter selection interface window 600 (see FIG. 6) which allows the user to add or remove filters (or change the metric). The user may then view the filter parameter interface 700 (see FIG. 7) and change parameters (e.g., intervals and overlap) for one or more filters. The analysis module 320 may then re-analyze the data based on the changes and display a new interactive visualization 900 without again having to specify the data sets, filters, etc.

The find ID's button 920 may allow a user to search for data within the interactive visualization 900. In one example, the user may click the find ID's button 920 and receive a window allowing the user to identify data or identify a range of data. Data may be identified by ID or searching for the data based on properties of data and/or metadata. If data is found and selected, the interactive visualization 900 may highlight the nodes associated with the selected data. For example, selecting a single row or collection of rows of a database or spreadsheet may produce a highlighting of nodes whose corresponding partial cluster contains any element of that selection.

In various embodiments, the user may select one or more objects and click on the explain button 922 to receive in-depth information regarding the selection. In some embodiments, when the user selects the explain button 922, the information about the data from which the selection is based may be displayed. The function of the explain button 922 is further discussed with regard to FIG. 10.

In various embodiments, the interactive visualization 900 may allow the user to specify and identify subsets of interest, such as output filtering, to remove clusters or connections which are too small or otherwise uninteresting. Further, the interactive visualization 900 may provide more general coloring and display techniques, including, for example, allowing a user to highlight nodes based on a user-specified predicate, and coloring the nodes based on the intensity of user-specified weighting functions.

The interactive visualization 900 may comprise any number of menu items. The "Selection" menu may allow the following functions:

Select singletons (select nodes which are not connected to other nodes)
    Select all (selects all the nodes and edges)
    Select all nodes (selects all nodes)

Select all edges

Clear selection (no selection)

Invert Selection (selects the complementary set of nodes or edges)

Select "small" nodes (allows the user to threshold nodes based on how many points they have)

Select leaves (selects all nodes which are connected to long "chains" in the graph)

Remove selected nodes

Show in a table (shows the selected nodes and their associated data in a table)

Save selected nodes (saves the selected data to whatever format the user chooses. This may allow the user to subset the data and create new datasources which may be used for further analysis.)

In one example of the "show in a table" option, information from a selection of nodes may be displayed. The information may be specific to the origin of the data. In various embodiments, elements of a database table may be listed, however, other methods specified by the user may also be included. For example, in the case of microarray data from gene expression data, heat maps may be used to view the results of the selections.

The interactive visualization 900 may comprise any number of menu items. The "Save" menu may allow may allow the user to save the whole output in a variety of different formats such as (but not limited to):

Image files (PNG/JPG/PDF/SVG etc.)

Binary output (The interactive output is saved in the binary format. The user may reopen this file at any time to get this interactive window again)

In some embodiments, graphs may be saved in a format such that the graphs may be used for presentations. This may include simply saving the image as a pdf or png file, but it may also mean saving an executable .xml file, which may permit other users to use the search and save capability to the database on the file without having to recreate the analysis.

In various embodiments, a relationship between a first and a second analysis output/interactive visualization for differing values of the interval length and overlap percentage may be displayed. The formal relationship between the first and second analysis output/interactive visualization may be that when one cover refines the next, there is a map of simplicial complexes from the output of the first to the output of the second. This can be displayed by applying a restricted form of a three-dimensional graph embedding algorithm, in which a graph is the union of the graphs for the various parameter values and in which the connections are the connections in the individual graphs as well as connections from one node to its image in the following graph. The constituent graphs may be placed in its own plane in 3D space. In some embodiments, there is a restriction that each constituent graph remain within its associated plane. Each constituent graph may be displayed individually, but a small change of parameter value may result in the visualization of the adjacent constituent graph. In some embodiments, nodes in the initial graph will move to nodes in the next graph, in a readily visualizable way.

FIG. 10 is an exemplary interactive visualization 1000 displaying an explain information window 1002 in some embodiments. In various embodiments, the user may select a plurality of nodes and click on the explain button. When the explain button is clicked, the explain information window 1002 may be generated. The explain information window 1002 may identify the data associated with the selected object(s) as well as information (e.g., statistical information) associated with the data.

In some embodiments, the explain button allows the user to get a sense for which fields within the selected data fields are responsible for "similarity" of data in the selected nodes and the differentiating characteristics. There can be many ways of scoring the data fields. The explain information window 1002 (i.e., the scoring window in FIG. 10) is shown along with the selected nodes. The highest scoring fields may distinguish variables with respect to the rest of the data.

In one example, the explain information window 1002 indicates that data from fields day0-day6 has been selected. The minimum value of the data in all of the fields is 0. The explain information window 1002 also indicates the maximum values. For example, the maximum value of all of the data associated with the day0 field across all of the points of the selected nodes is 0.353. The average (i.e., mean) of all of the data associated with the day0 field across all of the points of the selected nodes is 0.031. The score may be a relative (e.g., normalized) value indicating the relative function of the filter; here, the score may indicate the relative density of the data associated with the day0 field across all of the points of the selected nodes. It will be appreciated that any information regarding the data and/or selected nodes may appear in the explain information window 1002.

It will be appreciated that the data and the interactive visualization 1000 may be interacted with in any number of ways. The user may interact with the data directly to see where the graph corresponds to the data, make changes to the analysis and view the changes in the graph, modify the graph and view changes to the data, or perform any kind of interaction.

FIG. 11 is a flowchart 1200 of functionality of the interactive visualization in some embodiments. In step 1202, the visualization engine 322 receives the analysis from the analysis module 320 and graphs nodes as balls and edges as connectors between balls 1202 to create interactive visualization 900 (see FIG. 9).

In step 1204, the visualization engine 322 determines if the user is hovering a mouse cursor (or has selected) a ball (i.e., a node). If the user is hovering a mouse cursor over a ball or selecting a ball, then information is displayed regarding the data associated with the ball. In one example, the visualization engine 322 displays a node information window 908.

If the visualization engine 322 does not determine that the user is hovering a mouse cursor (or has selected) a ball, then the visualization engine 322 determines if the user has selected balls on the graph (e.g., by clicking on a plurality of balls or drawing a box around a plurality of balls). If the user has selected balls on the graph, the visualization engine 322 may highlight the selected balls on the graph in step 1110. The visualization engine 322 may also display information regarding the selection (e.g., by displaying a selection information window 912). The user may also click on the explain button 922 to receive more information associated with the selection (e.g., the visualization engine 322 may display the explain information window 1002).

In step 1112, the user may save the selection. For example, the visualization engine 322 may save the underlying data, selected metric, filters, and/or resolution. The user may then access the saved information and create a new structure in another interactive visualization 900 thereby allowing the user to focus attention on a subset of the data.

If the visualization engine 322 does not determine that the user has selected balls on the graph, the visualization engine 322 may determine if the user selects and drags a ball on the graph in step 1114. If the user selects and drags a ball on the graph, the visualization engine 322 may reorient the selected balls and any connected edges and balls based on the user's action in step 1116. The user may reorient all or part of the structure at any level of granularity.

It will be appreciated that although FIG. 11 discussed the user hovering over, selecting, and/or dragging a ball, the user may interact with any object in the interactive visualization 900 (e.g., the user may hover over, select, and/or drag an edge). The user may also zoom in or zoom out using the interactive visualization 900 to focus on all or a part of the structure (e.g., one or more balls and/or edges).

Further, although balls are discussed and depicted in FIGS. 9-11, it will be appreciated that the nodes may be any shape and appear as any kind of object. Further, although some embodiments described herein discuss an interactive visualization being generated based on the output of algebraic topology, the interactive visualization may be generated based on any kind of analysis and is not limited.

For years, researchers have been collecting huge amounts of data on breast cancer, yet we are still battling the disease. Complexity, rather than quantity, is one of the fundamental issues in extracting knowledge from data. A topological data exploration and visualization platform may assist the analysis and assessment of complex data. In various embodiments, a predictive and visual cancer map generated by the topological data exploration and visualization platform may assist physicians to determine treatment options.

In one example, a breast cancer map visualization may be generated based on the large amount of available information already generated by many researchers. Physicians may send biopsy data directly to a cloud-based server which may localize a new patient's data within the breast cancer map visualization. The breast cancer map visualization may be annotated (e.g., labeled) such that the physician may view outcomes of patients with similar profiles as well as different kinds of statistical information such as survival probabilities. Each new data point from a patient may be incorporated into the breast cancer map visualization to improve accuracy of the breast cancer map visualization over time.

Although the following examples are largely focused on cancer map visualizations, it will be appreciated that at least some of the embodiments described herein may apply to any biological condition and not be limited to cancer and/or disease. For example, some embodiments, may apply to different industries.

Figure 12:
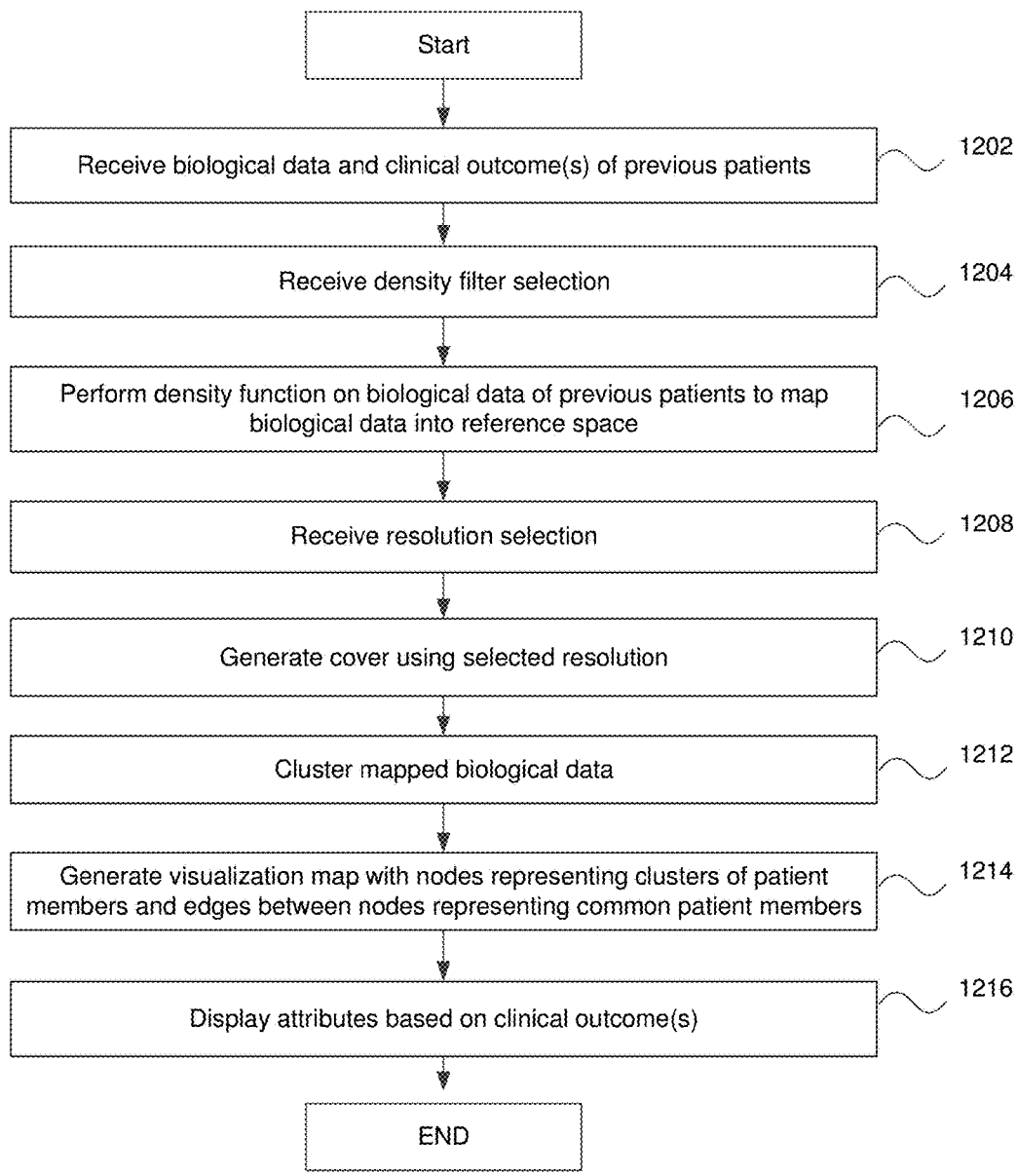
FIG. 12 is a flowchart of for generating a cancer map visualization utilizing biological data of a plurality of patients in some embodiments.

FIG. 12 is a flowchart for generating a cancer map visualization utilizing biological data of a plurality of patients in some embodiments. In various embodiments, the processing of data and user-specified options is motivated by techniques from topology and, in some embodiments, algebraic topology. As discussed herein, these techniques may be robust and general. In one example, these techniques apply to almost any kind of data for which some qualitative idea of "closeness" or "similarity" exists. It will be appreciated that the implementation of techniques described herein may apply to any level of generality.

In various embodiments, a cancer map visualization is generated using genomic data linked to clinical outcomes (i.e., medical characteristics) which may be used by physicians during diagnosis and/or treatment. Initially, publicly available data sets may be integrated to construct the topological map visualizations of patients (e.g., breast cancer patients). It will be appreciated that any private, public, or combination of private and public data sets may be integrated to construct the topological map visualizations. A map visualization may be based on biological data such as, but not limited to, gene expression, sequencing, and copy number variation. As such, the map visualization may comprise many patients with many different types of collected data. Unlike traditional methods of analysis where distinct studies of breast cancer appear as separate entities, the map visualization may fuse disparate data sets while utilizing many datasets and data types.

In various embodiments, a new patient may be localized on the map visualization. With the map visualization for subtypes of a particular disease and a new patient diagnosed with the disease, point(s) may be located among the data points used in computing the map visualization (e.g., nearest neighbor) which is closest to the new patient point. The new patient may be labeled with nodes in the map visualization containing the closest neighbor. These nodes may be highlighted to give a physician the location of the new patient among the patients in the reference data set. The highlighted nodes may also give the physician the location of the new patient relative to annotated disease subtypes. Nearest neighbor is further described in U.S. Non-Provisional patent application Ser. No. 13/648,237 filed Oct. 9, 2012 and entitled "Systems and Methods for Mapping New Patient Information to Historic Outcomes for Treatment Assistance," the entirety of which is incorporated herein by reference.

The visualization map may be interactive and/or searchable in real-time thereby potentially enabling extended analysis and providing speedy insight into treatment.

In step 1202, biological data and clinical outcomes of previous patients may be received. The clinical outcomes may be medical characteristics. Biological data is any data that may represent a condition (e.g., a medical condition) of a person. Biological data may include any health related, medical, physical, physiological, pharmaceutical data associated with one or more patients. In one example, biological data may include measurements of gene expressions for any number of genes. In another example, biological data may include sequencing information (e.g., RNA sequencing).

In various embodiments, biological data for a plurality of patients may be publicly available. For example, various medical health facilities and/or public entities may provide gene expression data for a variety of patients. In addition to the biological data, information regarding any number of clinical outcomes, treatments, therapies, diagnoses and/or prognoses may also be provided. It will be appreciated that any kind of information may be provided in addition to the biological data.

The biological data, in one example, may be similar to data S as discussed with regard to step 802 of FIG. 8. The biological data may include ID fields that identify patients and data fields that are related to the biological information (e.g., gene expression measurements).

FIG. 13 is an exemplary data structure 1302 including biological data 1304*a*-1304*y* for a number of patients 1308*a*-1308*n* that may be used to generate the cancer map visualization in some embodiments. Column 1302 represents different patient identifiers for different patients. The patient identifiers may be any identifier.

At least some biological data may be contained within gene expression measurements 1304*a*-1304*y*. In FIG. 13, "y" represents any number. For example, there may be 50,000 or more separate columns for different gene expressions related to a single patient or related to one or more samples from a patient. It will be appreciated that column 1304*a* may represent a gene expression measurement for each patient (if any for some patients) associated with the patient identifiers in column 1302. The column 1304*b* may represent a gene expression measurement of one or more genes that are different than that of column 1304*a*. As discussed, there may be any number of columns representing different gene expression measurements.

Column 1306 may include any number of clinical outcomes, prognoses, diagnoses, reactions, treatments, and/or any other information associated with each patient. All or some of the information contained in column 1306 may be displayed (e.g., by a label or an annotation that is displayed on the visualization or available to the user of the visualization via clicking) on or for the visualization.

Rows 1308a-1308n each contains biological data associated with the patient identifier of the row. For example, gene expressions in row 1308a are associated with patient identifier P1. As similarly discussed with regard to "y" herein, "n" represents any number. For example, there may be 100,000 or more separate rows for different patients.

It will be appreciated that there may be any number of data structures that contain any amount of biological data for any number of patients. The data structure(s) may be utilized to generate any number of map visualizations.

In step 1204, the analysis server may receive a filter selection. In some embodiments, the filter selection is a density estimation function. It will be appreciated that the filter selection may include a selection of one or more functions to generate a reference space.

In step 1206, the analysis server performs the selected filter(s) on the biological data of the previous patients to map the biological data into a reference space. In one example, a density estimation function, which is well known in the art, may be performed on the biological data (e.g., data associated with gene expression measurement data 1304a-1304y) to relate each patient identifier to one or more locations in the reference space (e.g., on a real line).

In step 1208, the analysis server may receive a resolution selection. The resolution may be utilized to identify overlapping portions of the reference space (e.g., a cover of the reference space R) in step 1210.

As discussed herein, the cover of R may be a finite collection of open sets (in the metric of R) such that every point in R lies in at least one of these sets. In various examples, R is k-dimensional Euclidean space, where k is the number of filter functions. It will be appreciated that the cover of the reference space R may be controlled by the number of intervals and the overlap identified in the resolution (e.g., see FIG. 7). For example, the more intervals, the finer the resolution in S (e.g., the similarity space of the received biological data)—that is, the fewer points in each S(d), but the more similar (with respect to the filters) these points may be. The greater the overlap, the more times that clusters in S(d) may intersect clusters in S(e)—this means that more "relationships" between points may appear, but, in some embodiments, the greater the overlap, the more likely that accidental relationships may appear.

In step 1212, the analysis server receives a metric to cluster the information of the cover in the reference space to partition S(d). In one example, the metric may be a Pearson Correlation. The clusters may form the groupings (e.g., nodes or balls). Various cluster means may be used including, but not limited to, a single linkage, average linkage, complete linkage, or k-means method.

As discussed herein, in some embodiments, the analysis module 320 may not cluster two points unless filter values are sufficiently "related" (recall that while normally related may mean "close," the cover may impose a much more general relationship on the filter values, such as relating two points s and t if ref(s) and ref(t) are sufficiently close to the same circle in the plane where ref( ) represents one or more filter functions). The output may be a simplicial complex, from which one can extract its 1-skeleton. The nodes of the complex may be partial clusters, (i.e., clusters constructed from subsets of S specified as the preimages of sets in the given covering of the reference space R).

In step 1214, the analysis server may generate the visualization map with nodes representing clusters of patient members and edges between nodes representing common patient members. In one example, the analysis server identifies nodes which are associated with a subset of the partition elements of all of the S(d) for generating an interactive visualization.

As discussed herein, for example, suppose that S={1, 2, 3, 4}, and the cover is C1, C2, C3. Suppose cover C1 contains {1, 4}, C2 contains {1,2}, and C3 contains {1, 2, 3, 4}. If 1 and 2 are close enough to be clustered, and 3 and 4 are, but nothing else, then the clustering for S(1) may be {1}, {4}, and for S(2) it may be {1,2}, and for S(3) it may be {1,2}, {3,4}. So the generated graph has, in this example, at most four nodes, given by the sets {1}, {4}, {1, 2}, and {3, 4} (note that {1, 2} appears in two different clusterings). Of the sets of points that are used, two nodes intersect provided that the associated node sets have a non-empty intersection (although this could easily be modified to allow users to require that the intersection is "large enough" either in absolute or relative terms).

As a result of clustering, member patients of a grouping may share biological similarities (e.g., similarities based on the biological data).

The analysis server may join clusters to identify edges (e.g., connecting lines between nodes). Clusters joined by edges (i.e., interconnections) share one or more member patients. In step 1216, a display may display a visualization map with attributes based on the clinical outcomes contained in the data structures (e.g., see FIG. 13 regarding clinical outcomes). Any labels or annotations may be utilized based on information contained in the data structures. For example, treatments, prognoses, therapies, diagnoses, and the like may be used to label the visualization. In some embodiments, the physician or other user of the map visualization accesses the annotations or labels by interacting with the map visualization.

The resulting cancer map visualization may reveal interactions and relationships that were obscured, untested, and/or previously not recognized.

Figure 14:
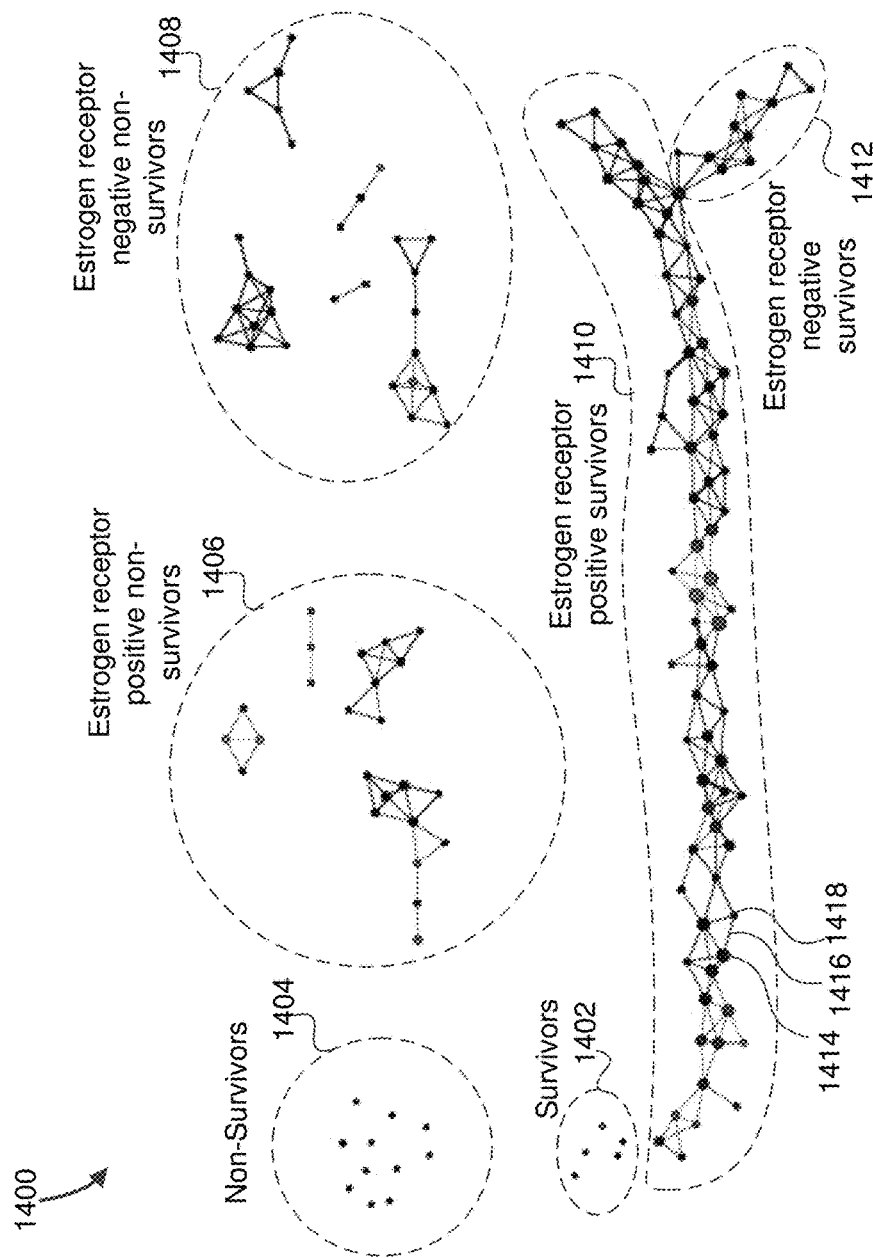
FIG. 14 is an exemplary visualization displaying the cancer map in some embodiments.

FIG. 14 is an exemplary visualization displaying the cancer map visualization 1400 in some embodiments. The cancer map visualization 1400 represents a topological network of cancer patients. The cancer map visualization 1400 may be based on publicly and/or privately available data.

In various embodiments, the cancer map visualization 1400 is created using gene expression profiles of excised tumors. Each node (i.e., ball or grouping displayed in the map visualization 1400) contains a subset of patients with similar genetic profiles.

As discussed herein, one or more patients (i.e., patient members of each node or grouping) may occur in multiple nodes. A patient may share a similar genetic profile with multiple nodes or multiple groupings. In one example, of 50,000 different gene expressions of the biological data, multiple patients may share a different genetic profiles (e.g., based on different gene expression combinations) with different groupings. When a patient shares a similar genetic profile with different groupings or nodes, the patient may be included within the groupings or nodes.

The cancer map visualization 1400 comprises groupings and interconnections that are associated with different clinical outcomes. All or some of the clinical outcomes may be associated with the biological data that generated the cancer map visualization 1400. The cancer map visualization 1400 includes groupings associated with survivors 1402 and groupings associated with non-survivors 1404. The cancer map visualization 1400 also includes different groupings associated with estrogen receptor positive non-survivors 1406, estrogen receptor negative non-survivors 1408, estrogen receptor positive survivors 1410, and estrogen receptor negative survivors 1412.

In various embodiments, when one or more patients are members of two or more different nodes, the nodes are interconnected by an edge (e.g., a line or interconnection). If there is not an edge between the two nodes, then there are no common member patients between the two nodes. For example, grouping 1414 shares at least one common member patient with grouping 1418. The intersection of the two groupings is represented by edge 1416. As discussed herein, the number of shared member patients of the two groupings may be represented in any number of ways including color of the interconnection, color of the groupings, size of the interconnection, size of the groupings, animations of the interconnection, animations of the groupings, brightness, or the like. In some embodiments, the number and/or identifiers of shared member patients of the two groupings may be available if the user interacts with the groupings 1414 and/or 1418 (e.g., draws a box around the two groupings and the interconnection utilizing an input device such as a mouse).

In various embodiments, a physician, on obtaining some data on a breast tumor, direct the data to an analysis server (e.g., analysis server 208 over a network such as the Internet) which may localize the patient relative to one or more groupings on the cancer map visualization 1400. The context of the cancer map visualization 1400 may enable the physician to assess various possible outcomes (e.g., proximity of representation of new patient to the different associations of clinical outcomes).

Figure 15:
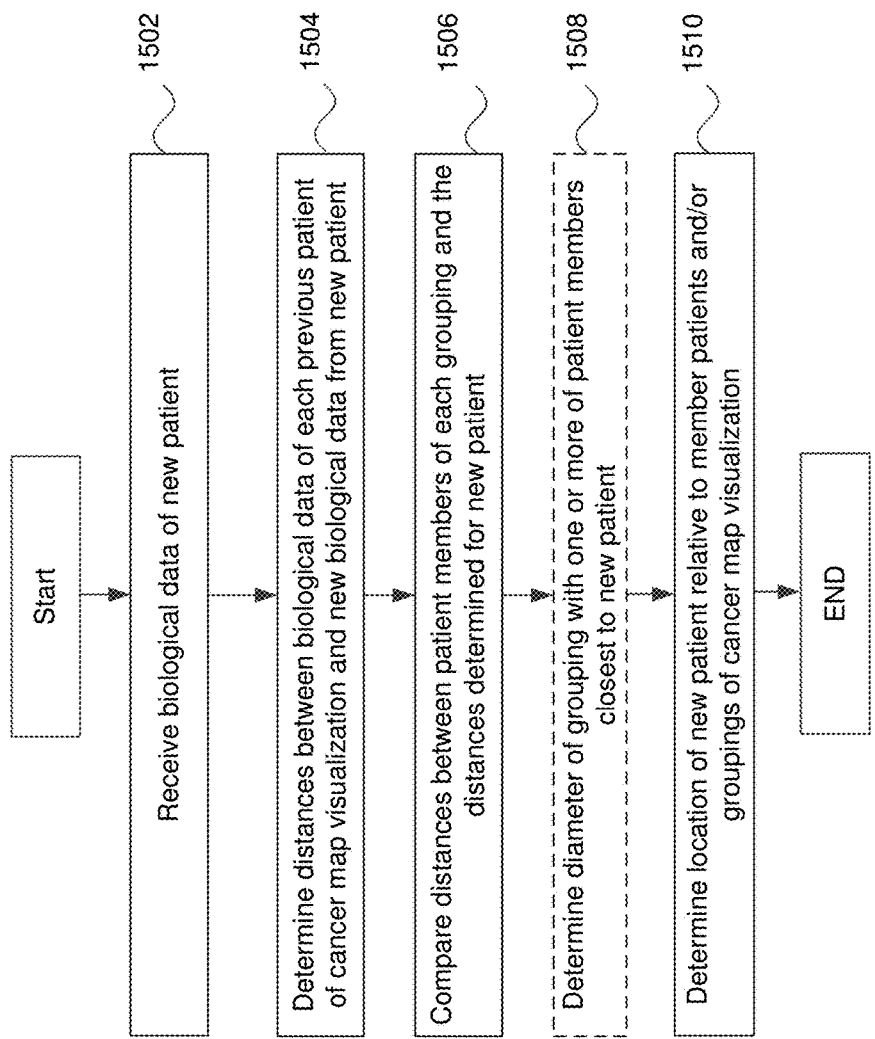
FIG. 15 is a flowchart of for positioning new patient data relative to the cancer map visualization in some embodiments.

FIG. 15 is a flowchart of for positioning new patient data relative to a cancer map visualization in some embodiments. In step 1502, new biological data of a new patient is received. In various embodiments, an input module 314 of an analysis server (e.g., analysis server 208 of FIGS. 1 and 2) may receive biological data of a new patient from a physician or medical facility that performed analysis of one or more samples to generate the biological data. The biological data may be any data that represents a biological data of the new patient including, for example, gene expressions, sequencing information, or the like.

In some embodiments, the analysis server 208 may comprise a new patient distance module and a location engine. In step 1504, the new patient distance module determines distances between the biological data of each patient of the cancer map visualization 1600 and the new biological data from the new patient. For example, the previous biological data that was utilized in the generation of the cancer map visualization 1600 may be stored in mapped data structures. Distances may be determined between the new biological data of the new patient and each of the previous patient's biological data in the mapped data structure.

It will be appreciated that distances may be determined in any number of ways using any number of different metrics or functions. Distances may be determined between the biological data of the previous patients and the new patients. For example, a distance may be determined between a first gene expression measurement of the new patient and each (or a subset) of the first gene expression measurements of the previous patients (e.g., the distance between G1 of the new patient and G1 of each previous patient may be calculated). Distances may be determined between all (or a subset of) other gene expression measurements of the new patient to the gene expression measurements of the previous patients.

In various embodiments, a location of the new patient on the cancer map visualization 1600 may be determined relative to the other member patients utilizing the determined distances.

In step 1506, the new patient distance module may compare distances between the patient members of each grouping to the distances determined for the new patient. The new patient may be located in the grouping of patient members that are closest in distance to the new patient. In some embodiments, the new patient location may be determined to be within a grouping that contains the one or more patient members that are closest to the new patient (even if other members of the grouping have longer distances with the new patient). In some embodiments, this step is optional.

In various embodiments, a representative patient member may be determined for each grouping. For example, some or all of the patient members of a grouping may be averaged or otherwise combined to generate a representative patient member of the grouping (e.g., the distances and/or biological data of the patient members may be averaged or aggregated). Distances may be determined between the new patient biological data and the averaged or combined biological data of one or more representative patient members of one or more groupings. The location engine may determine the location of the new patient based on the distances. In some embodiments, once the closest distance between the new patient and the representative patient member is found, distances may be determined between the new patient and the individual patient members of the grouping associated with the closest representative patient member.

In optional step 1508, a diameter of the grouping with the one or more of the patient members that are closest to the new patient (based on the determined distances) may be determined. In one example, the diameters of the groupings of patient members closest to the new patient are calculated. The diameter of the grouping may be a distance between two patient members who are the farthest from each other when compared to the distances between all patient members of the grouping. If the distance between the new patient and the closest patient member of the grouping is less than the diameter of the grouping, the new patient may be located within the grouping. If the distance between the new patient and the closest patient member of the grouping is greater than the diameter of the grouping, the new patient may be outside the grouping (e.g., a new grouping may be displayed on the cancer map visualization with the new patient as the single patient member of the grouping). If the distance between the new patient and the closest patient member of the grouping is equal to the diameter of the grouping, the new patient may be placed within or outside the grouping.

It will be appreciated that the determination of the diameter of the grouping is not required in determining whether the new patient location is within or outside of a grouping. In various embodiments, a distribution of distances between member patients and between member patients and the new patient is determined. The decision to locate the new patient within or outside of the grouping may be based on the distribution. For example, if there is a gap in the distribution of distances, the new patient may be separated from the grouping (e.g., as a new grouping). In some embodiments, if the gap is greater than a preexisting threshold (e.g., established by the physician, other user, or previously programmed), the new patient may be placed in a new grouping that is placed relative to the grouping of the closest member patients. The process of calculating the distribution of distances of candidate member patients to determine whether there may be two or more groupings may be utilized in generation of the cancer map visualization (e.g., in the process as described with regard to FIG. 12). It will be appreciated that there may be any number of ways to determine whether a new patient should be included within a grouping of other patient members.

In step 1510, the location engine determines the location of the new patient relative to the member patients and/or groupings of the cancer map visualization. The new location may be relative to the determined distances between the new patient and the previous patients. The location of the new patient may be part of a previously existing grouping or may form a new grouping.

In some embodiments, the location of the new patient with regard to the cancer map visualization may be performed locally to the physician. For example, the cancer map visualization 1400 may be provided to the physician (e.g., via digital device). The physician may load the new patient's biological data locally and the distances may be determined locally or via a cloud-based server. The location(s) associated with the new patient may be overlaid on the previously existing cancer map visualization either locally or remotely.

Those skilled in the art will appreciate that, in some embodiments, the previous state of the cancer map visualization (e.g., cancer map visualization 1400) may be retained or otherwise stored and a new cancer map visualization generated utilizing the new patient biological data (e.g., in a method similar to that discussed with regard to FIG. 12). The newly generated map may be compared to the previous state and the differences may be highlighted thereby, in some embodiments, highlighting the location(s) associated with the new patient. In this way, distances may be not be calculated as described with regard to FIG. 15, but rather, the process may be similar to that as previously discussed.

Figure 16:
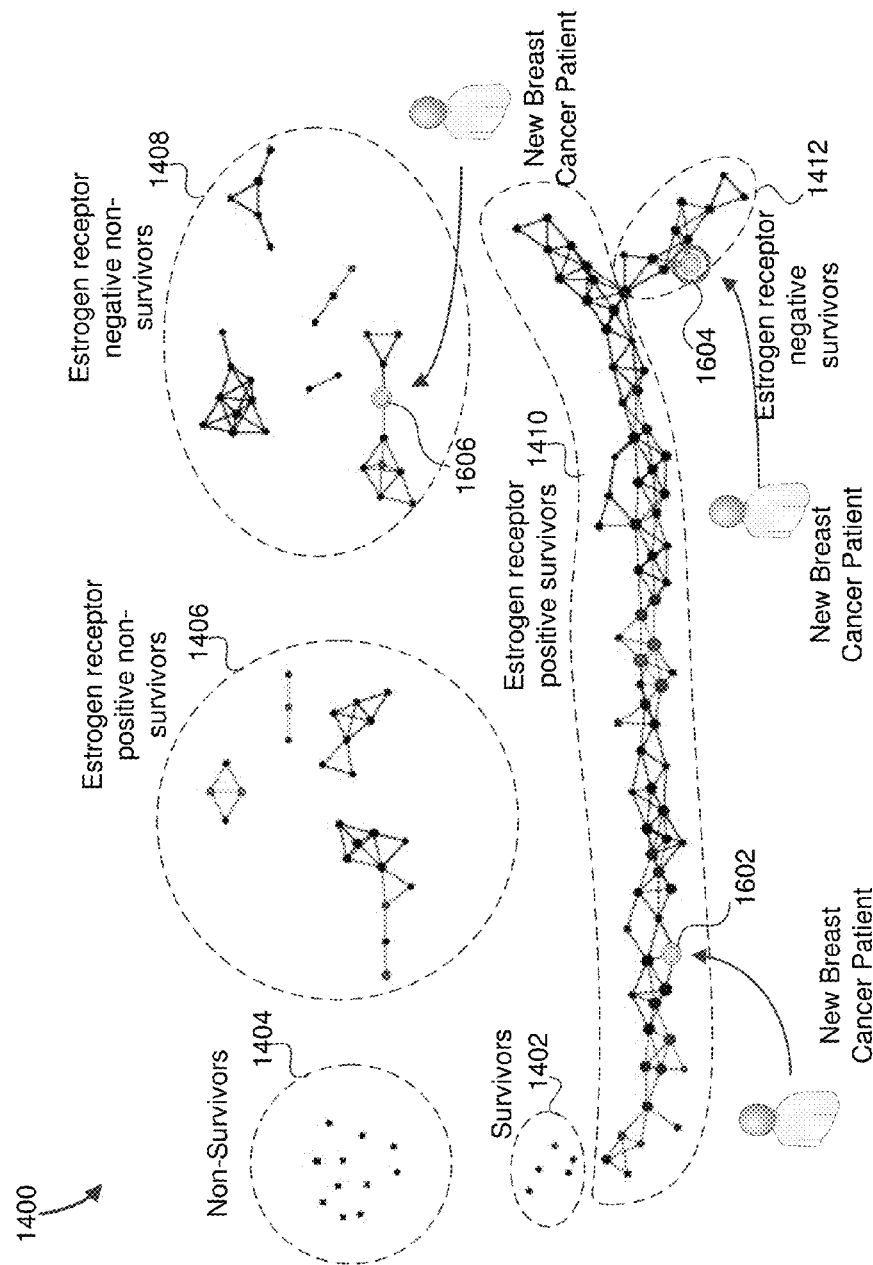
FIG. 16 is an exemplary visualization displaying the cancer map including positions for three new cancer patients in some embodiments.

FIG. 16 is an exemplary visualization displaying the cancer map including positions for three new cancer patients in some embodiments. The cancer map visualization 1400 comprises groupings and interconnections that are associated with different clinical outcomes as discussed with regard to FIG. 14. All or some of the clinical outcomes may be associated with the biological data that generated the cancer map visualization 1400. The cancer map visualization 1400 includes different groupings associated with survivors 1402, groupings associated with non-survivors 1404, estrogen receptor positive non-survivors 1406, estrogen receptor negative non-survivors 1408, estrogen receptor positive survivors 1410, and estrogen receptor negative survivors 1412.

The cancer map visualization 1400 includes three locations for three new breast cancer patients. The breast cancer patient location 1602 is associated with the clinical outcome of estrogen receptor positive survivors. The breast cancer patient location 1604 is associated with the clinical outcome of estrogen receptor negative survivors. Unfortunately, breast cancer patient location 1606 is associated with estrogen receptor negative non-survivors. Based on the locations, a physician may consider different diagnoses, prognoses, treatments, and therapies to maintain or attempt to move the breast cancer patient to a different location utilizing the cancer map visualization 1400.

In some embodiments, the physician may assess the underlying biological data associated with any number of member patients of any number of groupings to better understand the genetic similarities and/or dissimilarities. The physician may utilize the information to make better informed decisions.

The patient location 1604 is highlighted on the cancer map visualization 1400 as active (e.g., selected by the physician). It will be appreciated that the different locations may be of any color, size, brightness, and/or animated to highlight the desired location(s) for the physician. Further, although only one location is identified for three different breast cancer patients, any of the breast cancer patients may have multiple locations indicating different genetic similarities.

It will be appreciated that the cancer map visualization 1400 may be updated with new information at any time. As such, as new patients are added to the cancer map visualization 1400, the new data updates the visualization such that as future patients are placed in the map, the map may already include the updated information. As new information and/or new patient data is added to the cancer map visualization 1400, the cancer map visualization 1400 may improve as a tool to better inform physicians or other medical professionals.

In various embodiments, the cancer map visualization 1400 may track changes in patients over time. For example, updates to a new patient may be visually tracked as changes in are measured in the new patient's biological data. In some embodiments, previous patient data is similarly tracked which may be used to determine similarities of changes based on condition, treatment, and/or therapies, for example. In various embodiments, velocity of change and/or acceleration of change of any number of patients may be tracked over time using or as depicted on the cancer map visualization 1400. Such depictions may assist the treating physician or other personnel related to the treating physician to better understand changes in the patient and provide improved, current, and/or updated diagnoses, prognoses, treatments, and/or therapies.

Figure 17:
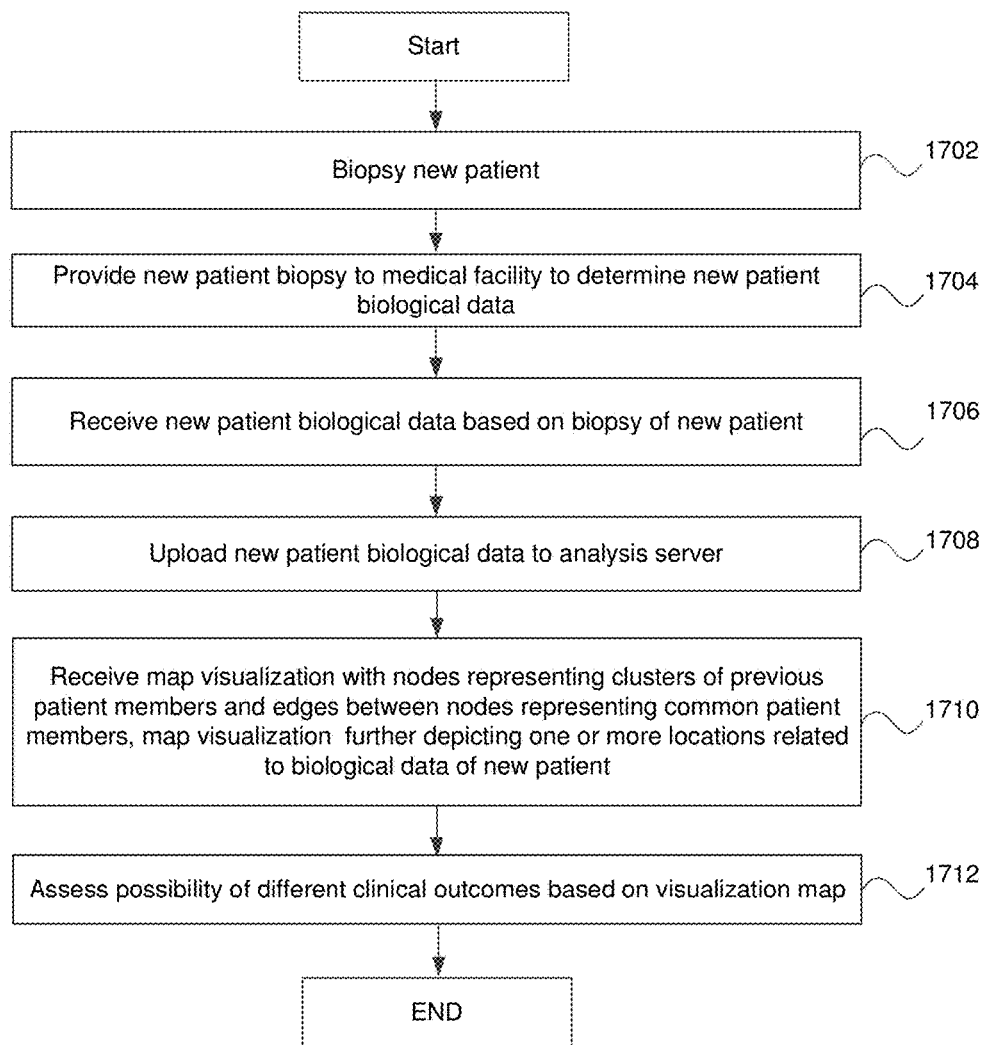
FIG. 17 is a flowchart of utilization the visualization and positioning of new patient data in some embodiments.

FIG. 17 is a flowchart of utilization the visualization and positioning of new patient data in some embodiments. In various embodiments, a physician may collect amounts of genomic information from tumors removed from a new patient, input the data (e.g., upload the data to an analysis server), and receive a map visualization with a location of the new patient. The new patient's location within the map may offer the physician new information about the similarities to other patients. In some embodiments, the map visualization may be annotated so that the physician may check the outcomes of previous patients in a given region of the map visualization are distributed and then use the information to assist in decision-making for diagnosis, treatment, prognosis, and/or therapy.

In step 1702, a medical professional or other personnel may remove a sample from a patient. The sample may be of a tumor, blood, or any other biological material. In one example, a medical professional performs a tumor excision. Any number of samples may be taken from a patient.

In step 1704, the sample(s) may be provided to a medical facility to determine new patient biological data. In one example, the medical facility measures genomic data such as gene expression of a number of genes or protein levels.

In step 1706, the medical professional or other entity associated with the medical professional may receive the new patient biological data based on the sample(s) from the new patient. In one example, a physician may receive the new patient biological data. The physician may provide all or some of the new patient biological data to an analysis server over the Internet (e.g., the analysis server may be a cloud-based server). In some embodiments, the analysis server is the analysis server 208 of FIG. 1. In some embodiments, the medical facility that determines the new patient biological data provides the biological data in an electronic format which may be uploaded to the analysis server. In some embodiments, the medical facility that determines the new patient biological data (e.g., the medical facility that measures the genomic data) provide the biological data to the analysis server at the request of the physician or others associated with the physician. It will be appreciated that the biological data may be provided to the analysis server in any number of ways.

The analysis server may be any digital device and may not be limited to a digital device on a network. In some embodiments, the physician may have access to the digital device. For example, the analysis server may be a table, personal computer, local server, or any other digital device.

Once the analysis server receives the biological data of the new patient, the new patient may be localized in the map visualization and the information may be sent back to the physician in step 1708. The visualization may be a map with nodes representing clusters of previous patient members and edges between nodes representing common patient members. The visualization may further depict one or more locations related to the biological data of the new patient.

The map visualization may be provided to the physician or other associated with the physician in real-time. For example, once the biological data associated with the new patient is provided to the analysis server, the analysis server may provide the map visualization back to the physician or other associated with the physician within a reasonably short time (e.g., within seconds or minutes). In some embodiments, the physician may receive the map visualization over any time.

The map visualization may be provided to the physician in any number of ways. For example, the physician may receive the map visualization over any digital device such as, but not limited to, an office computer, Ipad, tablet device, media device, smartphone, e-reader, or laptop.

In step 1710, the physician may assess possible different clinical outcomes based on the map visualization. In one example, the map-aided physician may make decisions on therapy and treatments depending on where the patient lands on the visualization (e.g., survivor or non-survivor). The map visualization may include annotations or labels that identify one or more sets of groupings and interconnections as being associated with one or more clinical outcomes. The physician may assess possible clinical outcomes based on the position(s) on the map associated with the new patient.

As described above, interesting continuous functions on a metric space (e.g., a similarity space) allow the application of systems and methods described herein. In various embodiments, functions may be performed on data within the metric space to project data into the reference space. Having the function(s) to project the data from the metric space to the similarity space (i.e., a lens function) dependent on a small number of coordinates (e.g., counting a number of uses of a small collection of words) is a fairly simple way to achieve continuity in most metrics, and the resulting lenses may be suitable for interpolation. However, such lenses may be of limited use on high-dimensional data, and if the interesting features of the space were captured in those few dimensions, there may be no point keeping the rest of the coordinates.

In practice, lenses which incorporate intrinsic properties of the metric (e.g., the function on the data to generate the metric space), such as density or centrality, are more likely to capture features of the space, absent special knowledge of the particular data set, than functions which depend on a few coordinates. One example method of dimensionality reduction (which is a way to think of a small collection of lenses applied jointly) are variants of "Stochastic Neighbor Embedding" (aka SNE). The underlying intuition in stochastic neighbor embedding is to map the high dimensional space to points in a low-dimensional Euclidean space, typically two or three dimensions, define a potential function on the points which penalizes them for being either closer or farther apart in the embedding than they are in the high-dimensional space, and move points around to minimize the potential. This may be effectively like a graph-layout problem, where a (potentially) high-dimensional space, an arbitrary combinatorial graph, is to be faithfully represented by a two-dimensional picture.

Some example methods amount to computing a global potential and then optimizing the placement by the same optimization techniques used in applications of artificial neural network. These methods produce very nice pictures and the lenses can be remarkably effective with TDA, but they may be computationally expensive. Some embodiments described herein allow for the use of less computationally expensive layout mechanisms and methods.

Figure 18:
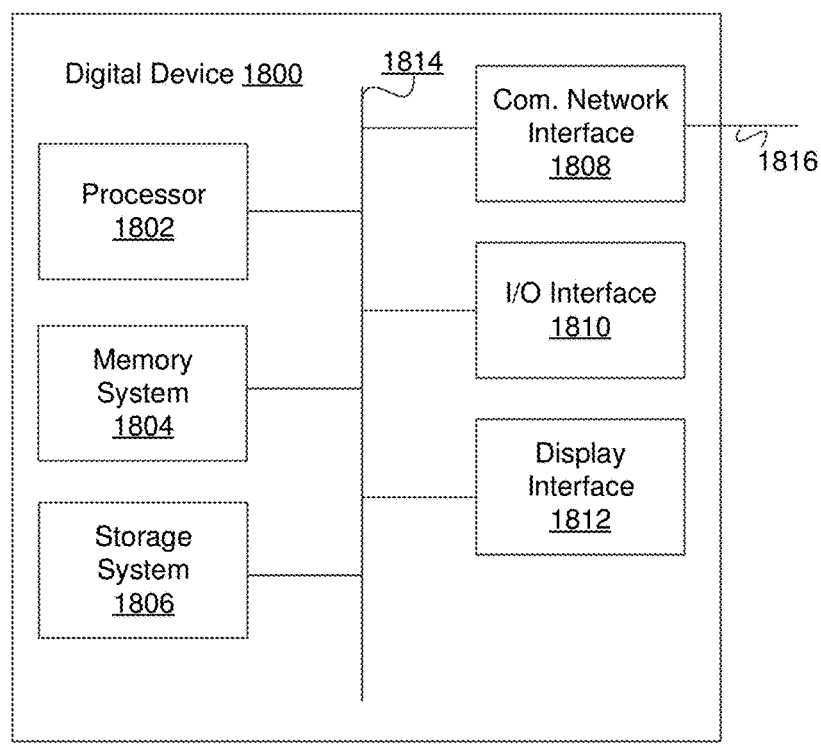
FIG. 18 is an exemplary digital device in some embodiments.

FIG. 18 is a block diagram of an exemplary digital device 1800. The digital device 1800 comprises a processor 1802, a memory system 1804, a storage system 1806, a communication network interface 1808, an I/O interface 1810, and a display interface 1812 communicatively coupled to a bus 1814. The processor 1802 may be configured to execute executable instructions (e.g., programs). In some embodiments, the processor 1802 comprises circuitry or any processor capable of processing the executable instructions.

The memory system 1804 is any memory configured to store data. Some examples of the memory system 1804 are storage devices, such as RAM or ROM. The memory system 1804 can comprise the ram cache. In various embodiments, data is stored within the memory system 1804. The data within the memory system 1804 may be cleared or ultimately transferred to the storage system 1806.

The storage system 1806 is any storage configured to retrieve and store data. Some examples of the storage system 1806 are flash drives, hard drives, optical drives, and/or magnetic tape. In some embodiments, the digital device 1800 includes a memory system 1804 in the form of RAM and a storage system 1806 in the form of flash data. Both the memory system 1804 and the storage system 1806 comprise computer readable media which may store instructions or programs that are executable by a computer processor including the processor 1802.

The communication network interface (com. network interface) 1808 can be coupled to a communication network (e.g., communication network 204) via the link 1816. The communication network interface 1808 may support communication over an Ethernet connection, a serial connection, a parallel connection, or an ATA connection, for example. The communication network interface 1808 may also support wireless communication (e.g., 1802.11 a/b/g/n, WiMax). It will be apparent to those skilled in the art that the communication network interface 1808 can support many wired and wireless standards.

The optional input/output (I/O) interface 1810 is any device that receives input from the user and output data. The optional display interface 1812 is any device that may be configured to output graphics and data to a display. In one example, the display interface 1812 is a graphics adapter.

It will be appreciated by those skilled in the art that the hardware elements of the digital device 1800 are not limited to those depicted in FIG. 18. A digital device 1800 may comprise more or less hardware elements than those depicted. Further, hardware elements may share functionality and still be within various embodiments described herein. In one example, encoding and/or decoding may be performed by the processor 1802 and/or a co-processor located on a GPU.

In various embodiments, data points of a data set or nodes in a graph are automatically grouped (i.e., "autogrouped"). The groupings may be approximations of a possible maxima (e.g., a best maxima) of a given scoring function that scores possible partitions of the original object (i.e., a collection of data points or a collection of nodes of a graph).

Autogrouping may be utilized to automatically find a collection of subsets of some set Y that share one or more given properties. In one example, autogrouping may be utilized to find a collection of subsets that is a partition of Y where Y is a subset of a finite metric space X or nodes in a graph. However, it will be appreciated, in some embodiments, that the methodology described herein has no such requirement.

In various embodiments, a selection of possible partitions of a data set (e.g., original data set or nodes in a visualization) may be identified and scored. A partition is a collection of disjoint subsets of a given set. The union of the subsets of each partition equal the entire original set. A hierarchical clustering method may be utilized on the original object Y to create a family of partitions of Y.

A first scoring function may score the subsets (i.e., to generate a Q_Subset score), a second scoring function may score the partitions (i.e., to generate a Q_Partition score), and a third scoring function may score the roots of trees coming from the hierarchical clustering method (i.e., to generate a Q_Max score). The highest scoring partition based on any one or a combination of these scoring functions may be found for the family. The first and/or second scoring functions may be any function or combination of functions that may be able to be scored. Example scoring functions are further discussed herein.

In some embodiments, autogrouping is the process in which a highest scoring partition is identified. The highest scoring partition may be the maximum of the given scoring function(s) of any number of subsets from any number of partitions.

In some embodiments, a limited number of partitions of all possible partitions may be generated. In fact, in some cases, the result may be better if the scorer is imperfect, as at least some hierarchical clustering algorithms generally avoid partitions with large numbers of miscellaneous singletons or other ugly sets which might actually be the global extreme for such a scoring function. It will be appreciated that the hierarchical clustering process may serve to condition data to only present 'good alternatives,' and so can improve the effectiveness of some scorers.

Since the number of partitions for a data set is high (e.g., $(N/\log(N))^N$), it may be impractical to generate every possible partition. Unfortunately, most local improvement methods can easily get stuck. Some techniques to generate a subset of partitions involve attempting to maximize a modularity score over graph partitions by making an initial partition and then making local changes (e.g., moving nodes from one partition to another). Modularity is the fraction of edges that fall within given groups minus the expected such fraction if edges were distributed at random. Unfortunately, the modularity measure Q score may exhibit extreme degeneracies because it admits an exponential number of distinct high-scoring solutions and typically lacks a clear global maximum. Another approach to maximizing functions on partitions by local methods is to use probabilistic techniques such as simulated annealing. At least some embodiments described herein offer a deterministic alternative that is applicable to a wide range of scoring functions.

Subsets in one or more different partitions of those generated may be selected based, at least in part, on Q scores, further described herein. A new partition including the selected subsets may be generated or, if all of the selected subsets are already part of a generated partition, then the preexisting partition may be selected.

FIGS. 19A-19D depict an example of determining a partition based on scoring for autogrouping in some embodiments. In an example, there is a fixed space, S, of finite size. The nature of the space may be relevant only in so far as there is a way of clustering the space and scoring subsets. Referring to a graph G on S indicates a graph whose nodes are a collection of subsets where a node is connected to another node if and only if the two nodes have points in common. A partition includes one or more subsets. Each of the one or more subsets include all of the element(s) of S. For example, partition 1902 is a partition that includes subsets of all elements of S. Subsets 1904a-e include all elements of S. A union of all of the subsets 1904a-e is the partition 1902.

Figure 19A:
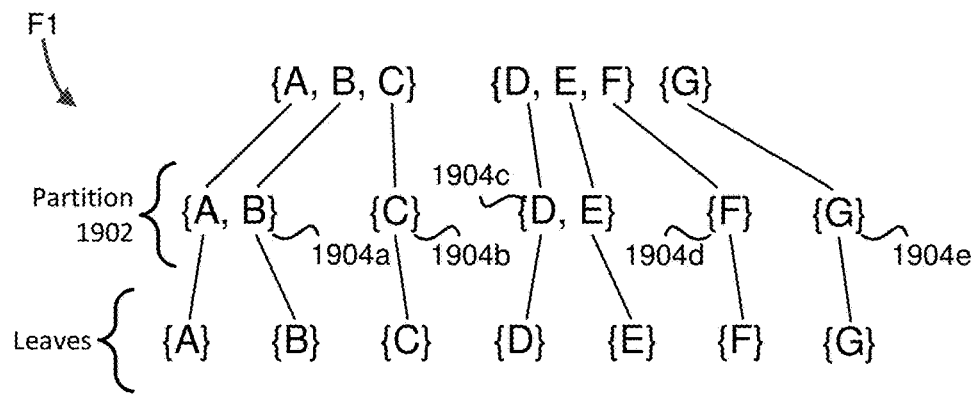
FIGS. 19A-19D depict an example of determining a partition based on scoring for autogrouping in some embodiments.
Figure 19B:
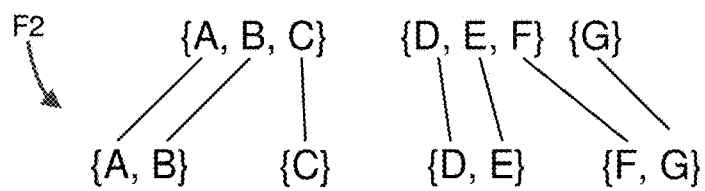
Figure 19C:
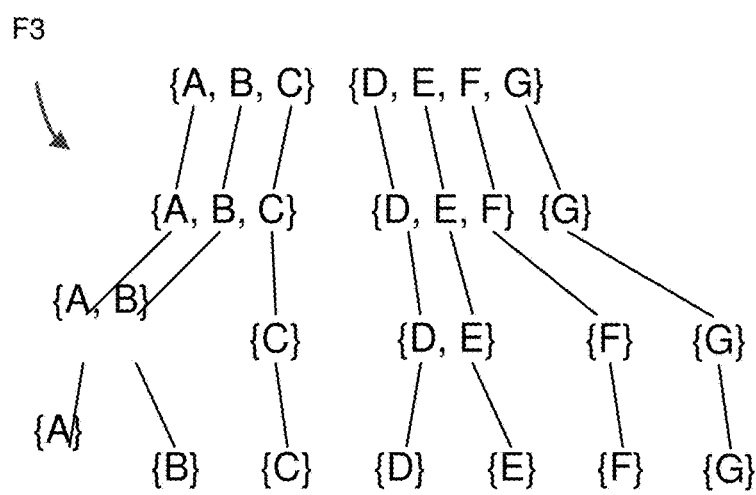

A forest F on S is a graph on S. A forest F is 'atomic' if every leaf in F is a singleton (e.g., a set with one member). FIG. 19A (i.e., F1) is an atomic forest because every leaf in F1 as depicted in FIG. 19A is a singleton. It will be appreciated that FIG. 19B (i.e., F2) is not an atomic forest since every leaf in F2 as depicted in FIG. 19B is not a singleton. For example, F2 includes leaves {A, B}, {D, E}, and {F, G}.

There is a partition R of S (in F1, {a, b, c}, {d, e, f}, {g}), called the roots, such that every set in F is reachable by a unique path from a root. N in F is either a leaf (e.g., a singleton in an atomic forest) or it is connected to nodes which form a partition (e.g., {a, b, c}→{a, b} and {c} in F1) of N. For a non-leaf node N we denote by C(N) the children of N. Notice the children of a leaf, namely C(leaf) is empty. We say that F' extends F if F and F' have the same leaves and every node in F is a node in F'. If the two forests are not equal, then F' contains a node which is the union of one or more roots in F. Example F3 (FIG. 19C) extends F1 (FIG. 19A).

Figure 19D:
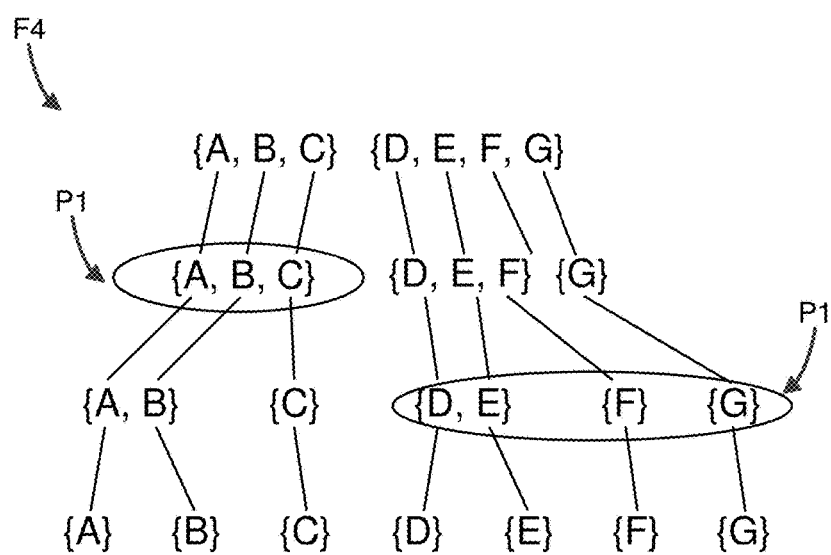

Partition P on S is subordinate to F1 if and only if every element of P is in F1. The circled partition P1 of F4 depicted in FIG. 19D, is an example of a subordinate partition {e.g., {a, b, c}, {d, e}, {f}, and {g}} to F1.

Singletons(S) are denoted as the partition formed by taking {{x}|x in S}. That is, in the example in FIG. 19D, Singletons({a, b, c, d, e, f, g})={{a}, {b}, {c}, {d}, {e}, {f}, {g}}. This is the same as the set of leaves of an atomic forest. Let U(P), where P is any collection of subsets of S, denote the union of all the elements of P. U(Singletons(S))=S.

Partition V on S is coarser than another partition P on S if and only if every element x' in V is the union of elements x in P. In various embodiments, every partition on S is coarser than Singletons(S), and {S} is coarser than every partition on S. For instance, {{a, b, c}, {d, e, f}, {g}} is a coarser partition than {{a, b}, {c}, {d, e}, {f}, {g}}.

Figure 20:
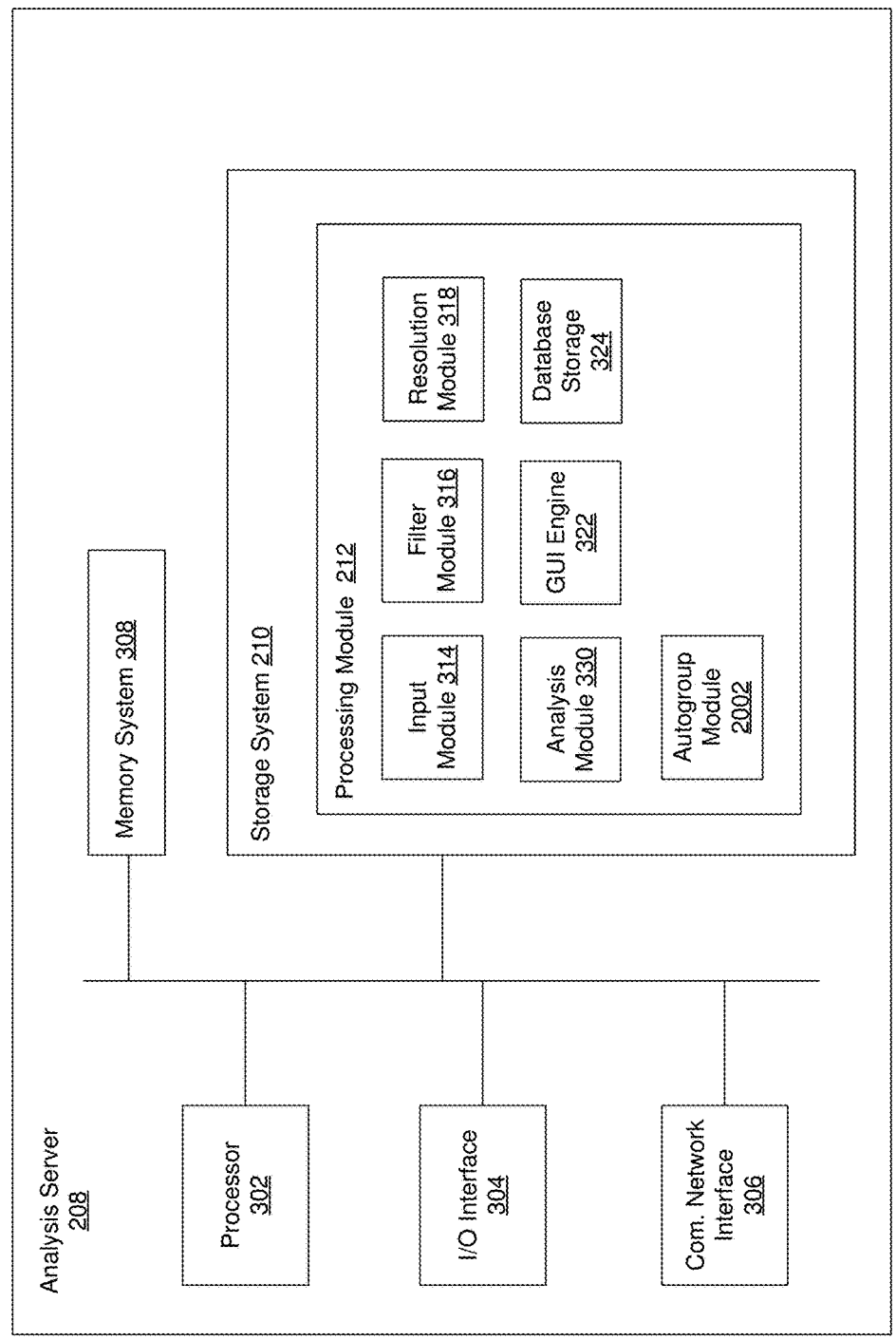
FIG. 20 is a block diagram of an exemplary analysis server.

FIG. 20 is a block diagram of an exemplary analysis server 208 including an autogroup module 2002. The exemplary analysis server 208 depicted in FIG. 20 may be similar to the exemplary analysis server 208 depicted in FIG. 2. In exemplary embodiments, the analysis server 208 comprises a processor 302, input/output (I/O) interface 304, a communication network interface 306, a memory system 308, and a storage system 310.

The storage system 310 comprises a plurality of modules utilized by embodiments of the present invention. A module may be hardware (e.g., an ASIC), software (e.g., including instructions executable by a processor), or a combination of both. In one embodiment, the storage system 310 comprises a processing module 312 which comprises an input module 314, a filter module 316, a resolution module 318, an analysis module 320, a visualization engine 322, a database storage 324, and an autogroup module 2002. Alternative embodiments of the analysis server 208 and/or the storage system 310 may comprise more, less, or functionally equivalent components and modules.

The input module 314 may be configured to receive commands and preferences from the user device 202a. In various examples, the input module 314 receives selections from the user which will be used to perform the analysis. The output of the analysis may be an interactive visualization.

The input module 314 may provide the user a variety of interface windows allowing the user to select and access a database, choose fields associated with the database, choose a metric, choose one or more filters, and identify resolution parameters for the analysis. In one example, the input module 314 receives a database identifier and accesses a large multidimensional database. The input module 314 may scan the database and provide the user with an interface window allowing the user to identify an ID field. An ID field is an identifier for each data point. In one example, the identifier is unique. The same column name may be present in the table from which filters are selected. After the ID field is selected, the input module 314 may then provide the user with another interface window to allow the user to choose one or more data fields from a table of the database.

Although interactive windows may be described herein, it will be appreciated that any window, graphical user interface, and/or command line may be used to receive or prompt a user or user device 202a for information.

The filter module 316 may subsequently provide the user with an interface window to allow the user to select a metric to be used in analysis of the data within the chosen data fields. The filter module 316 may also allow the user to select and/or define one or more filters.

The resolution module 318 may allow the user to select a resolution, including filter parameters. In one example, the user enters a number of intervals and a percentage overlap for a filter.

The analysis module 320 may perform data analysis based on the database and the information provided by the user. In various embodiments, the analysis module 320 performs an algebraic topological analysis to identify structures and relationships within data and clusters of data. It will be appreciated that the analysis module 320 may use parallel algorithms or use generalizations of various statistical techniques (e.g., generalizing the bootstrap to zig-zag methods) to increase the size of data sets that can be processed. The analysis is further discussed in FIG. 8. It will be appreciated that the analysis module 320 is not limited to algebraic topological analysis but may perform any analysis.

The visualization engine 322 generates an interactive visualization including the output from the analysis module 320. The interactive visualization allows the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described in FIGS. 9-11.

The database storage 324 is configured to store all or part of the database that is being accessed. In some embodiments, the database storage 324 may store saved portions of the database. Further, the database storage 324 may be used to store user preferences, parameters, and analysis output thereby allowing the user to perform many different functions on the database without losing previous work.

The autogroup module 2002 is configured to autogroup data points of a data set or nodes in a graph. As discussed herein, the groupings may be approximations of possible maxima of a given scoring function that scores possible partitions of the original data object (e.g., a collection of data points or a collection of nodes of a graph). The autogroup module 2002 may, in some embodiments, perform autogrouping of nodes of a graph (whether a visualization is generated or not). In various embodiments, the autogroup module 2002 may perform autogrouping for reference space open cover generation. The autogroup module 2002 may autogroup any number of data points, sets of data points, representations, and/or the like. The autogroup module 2002 is further discussed in FIG. 21.

It will be appreciated that that all or part of the processing module 212 may be at the user device 202a or the database storage server 206. In some embodiments, all or some of the functionality of the processing module 312 may be performed by the user device 202a.

Figure 21:
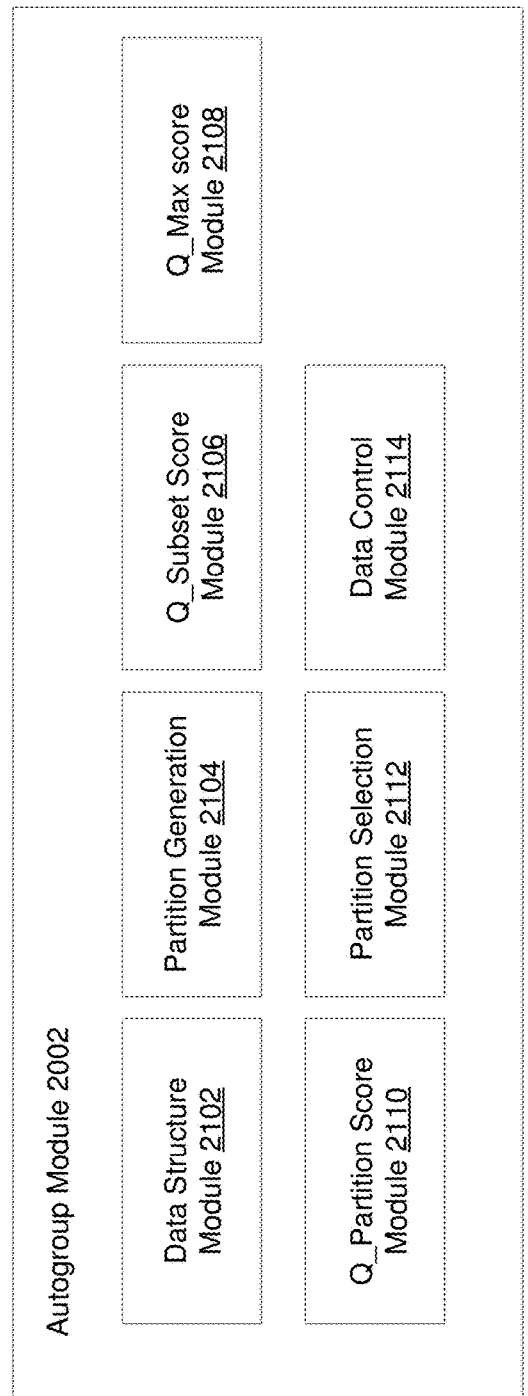
FIG. 21 depicts an example autogroup module in some embodiments.

FIG. 21 depicts an example autogroup module 2002 in some embodiments. An autogroup module 2002 may comprise a data structure module 2102, a partition generation module 2104, scoring function modules (e.g., a Q_subset score module 2106, a Q_max score module 2108, a Q_partition score module 2110), a partition selection module 2112, and a data control module 2114. Although the scoring function modules are discussed as including three modules, each performing a different scoring function, it will be appreciated that there may be any number of scoring function modules performing any number of scoring functions (e.g., one module performing a single scoring function capable of generating any number or type of scores). For example, the scoring functions may generate and/or maximize metric values of any number of metric functions.

In various embodiments, the data structure module 2102 receives data including a plurality of sets of data. The data may be received from any number of digital devices.

The partition generation module 2104 (e.g., a "clumper") forms a forest F utilizing the plurality of sets of data received by the data structure module 2102. For example, the partition generation module 2104 may generate a first partition of a forest F using the data received by the data structure module 2102. In some embodiments, the first partition may include leaves that are singletons of all elements from the data. In various embodiments, the first partition may include any number of sets of data. The first partition may include leaves for the forest, singletons, roots, sets of plurality of elements, and/or the like.

The partition generation module 2104 may generate the second partition of the forest F using the first partition. For example, the second partition may include at least one union of at least two sets of the first partition. Subsequent partitions may be generated in a similar fashion (e.g., based, at least in part, on including at least one union of at least two sets from the previous partition).

The partition generation module 2104 may generate an entire forest F before scoring partitions (or sets of partitions). For example, the partition generation module 2104 may generate the entire forest F before any or all of the scoring function modules score all or parts of partitions of the forest F.

In some embodiments, the partition generation module 2104 may generate the entire forest F while scoring is performed or in series with partition scoring (e.g., scoring of sets of partitions). For example, the partition generation module 2104 may generate the entire forest F while any or all of the scoring function modules score all or parts of partitions of the forest F. In another example, the partition generation module 2104 may generate one or more partitions of the forest F and then any number of the scoring function modules may score the generated partitions before the partition generation module 2104 generates one or more additional partitions of the forest F.

In various embodiments, the partition generation module 2104 may generate a partition of a forest F based on, at least in part, scores by any number of scoring function modules of previously generated partition(s) (or sets of partition(s)) of the forest F.

It will be appreciated that the partition generation module 2104 may not generate the entire forest F but may rather terminate generating partitions of the forest F before the forest F is completed. The partition generation module 2104 may determine whether to build a new partition of the forest F based on any number of the previously generated partition(s) of the forest F and/or scoring associated with all or parts of previously generated partition(s).

As discussed herein, the partition generation module 2104 may not generate all possible sets of data and/or all possible partitions of the forest F.

It will be appreciated that the partition generation module 2104 may utilize any number of hierarchical clustering techniques with techniques described herein. In one example, data and/or nodes are joined by epsilon (if 2 data subsets or nodes are within distance epsilon of each other then they are joined together). While this example standard technique has traditional limitations ("fixed epsilon") whereby a single epsilon may be unable to break up a space in a preferable manner, by scoring each subset of a partition, we can select subsets across a forest to identify and/or generate a selected partition (e.g., by autogrouping subsets of a plurality of partitions).

One example of a hierarchical clustering technique, KNN on a finite metric space X is to compute the K nearest neighbors for each point of a network graph (e.g., a visualized or non-visualized graph that includes nodes that may be coupled to one or more other nodes of the graph) with, for example, K=50. The partition generation module 2104 may start with INITIAL( ) being Singletons(X). Then at each step for $1<=k<=50$, the partition generation module 2104 may connect x to y provided x and y are in the symmetric k nearest neighbors of one another. Note that if KNN(P,k) returns P for k<50, the partition generation module 2104 may bump k and try again instead of concluding that P is stable.

Another hierarchical clustering technique embodiment is defined on a weighted graph G (with positive weights) on a point set S. This hierarchical clustering technique is parameterized by a pre-determined real number delta where $1>delta>0$. The partition generation module 2104 starts with delta=0 so INITIAL( ) being Singletons(S). For each partition P, we define wt(p,q), for p!=q in P, to be the sum of edge weights between the nodes in the graph which are a part of the subset p and those in the subset q in G, divided by $|p|*|q|$. The partition generation module 2104 is configured to take a partition P and make a new partition P' by joining all pairs of subsets (a,b) (where a, b are subsets in the partition P) when wt(a,b)>=delta*max(wt(p,q)) where the max is over all pairs of subsets p and q in the partition P.

There are any number of techniques for hierarchical clustering and any of them can be combined with a scoring function that satisfies example constraints on the scoring functions discussed herein.

The autogroup module 2002 includes the Q_Subset score module 2106, the Q_Max score module 2108, and the Q_Partition score module 2110 which may utilize three scoring functions, respectively. The Q_Subset score module 2106 calculates a Q_Subset score for subsets of one or more partitions. The Q_Max score module 2108 calculates a Q_Max score based on the Q_Subset score (e.g., calculates a maximum score for a partition based on the Q_Subset score) for the subsets. The Q_Partition score module 2110 calculates a Q_Partition score for two or more partitions of the forest utilizing at least the Q_Subset Score for the subsets.

In various embodiments, the Q_Subset score module 2106 calculates Q_Subset scores (e.g., one for each subset of a partition). A function Q is defined on subsets of the space S and scores the properties which are to be grouped together in the autogrouping process. For instance, in some embodiments, the Q_Subset score is a modularity score on a graph (so S are the nodes in the graph). The partition selection module 2112 may examine the data structure for a partition of the graph S with maximum modularity score(s).

Modularity is one measure of the structure of networks or graphs that is appreciated by those skilled in the art. The modularity score may be used to measure strength of division of a network of nodes (e.g., modules, groups, clusters, or communities). Modularity may be used in optimization methods for detecting community structure in networks. In one example, modularity is the fraction of edges of nodes in a graph that fall within a given group minus the expected such fraction if edges were distributed at random. It will be appreciated that there are many different methods for calculating modularity.

In one example, randomization of edges preserves a degree of each vertex. Assume a graph with n nodes and m links (edges) such that the graph can be partitioned into two communities using a membership variable s. If a node v belongs to community 1, Sv=1, or if v belongs to community 2, Sv=−1. An adjacency matrix for an undirected network may be represented by A, where Avw=0 indicates there are no edges (no interaction) between nodes v and w. Avw=1 indicates there are Avw=1 indicates there is an edge between the two.

Modularity Q may be defined as the fraction of edges that fall within group 1 or 2, minus the expected number of edges within groups 1 and 2 for a random graph with the same node degree distribution as the network.

In this example, an expected number of edges is determined using configuration models. The configuration model is a randomized realization of a particular network. Given a network with n nodes, where each node v has a node degree kv, the configuration model cuts each edge into two halves, and then each half edge is rewired randomly with any other half edge in the network.

For this example, assume that the total number of half edges is $l_n$ $$l_n = \sum_v k_v = 2m$$

Two randomly nodes v and w with node degrees $k_v$ and $k_w$ respectively are selected and half edges rewired then the expectation of full edges between v and w is equal to (Full edges between v and w)/(total number of rewiring possibilities). The expected [Number of full edges between v and w]=$(k_v*k_w)/l_n=(k_v k_w)/2m$.

As a result, the actual number of edges between v and w minus expected number of edges between them is $A_{vw}-(k_v k_w)/2m$.

$$Q = \frac{1}{2m}\sum_{vw}\left[A_{vw} - \frac{k_v * k_w}{2m}\right]\frac{s_v s_w + 1}{2}$$

The equation above holds for partitioning into two communities only. Hierarchical partitioning (i.e. partitioning into two communities, then the two sub-communities further partitioned into two smaller sub communities only to maximize Q) is a possible approach to identify multiple communities in a network. The above equation can be generalized for partitioning a network into c communities.

$$Q = \sum_{vw}\left[\frac{A_{vw}}{2m} - \frac{k_v * k_w}{(2m)(2m)}\right]\delta(c_v, c_w) = \sum_{i=1}^{c}(e_{ii} - a_i^2)$$

$e_{ij}$ is the fraction of edges with one end vertices in community i and the other in community j:

$$e_{ij} = \sum_{vw}\frac{A_{vw}}{2m}1_{v\in c_i}1_{v\in c_j}$$

$a_i$ is the fraction of ends of edges that are attached to vertices in community i:

$$a_i = \frac{k_i}{2m} = \sum_j e_{ij}$$

The second scoring function, the Q_Partition score, may be an extension of the first scoring function Q to be defined on partitions of the space S. If the scoring function Q is defined on subsets of S, it can be extended to a partition function Q_Partition in various ways. One of the simplest ways to extend function Q to partitions is by defining Q_Partition (P) as the sum over p in P of Q(p) (e.g., for a partition P, Q_Partition (P)=sum_{subsets p in P} Q(p)).

In some embodiments, Q_Partition must have the following property: Let P be an arbitrary partition of a subset of S, let p belong to P, and let q be a partition of p. P(q) is defined to be the partition of obtained by replacing p in P with the elements of q. Then, in this example, Q_Partition must have the following property for all P, p, q as described above:

$$QP(P(q))>=QP(P) \text{ if and only if } QP(q)>=Q(\{p\}) \quad (1)$$

In some embodiments, function Q does not need to come from a set function in this case. Functions Q_Partition which satisfy property (1) are, by definition, stable partition functions. A class of such functions is described as follows.

Let Q be any real-valued function defined on the set of non-empty subsets of S. Let A(p,q) be any function defined on pairs of non-empty subsets such that p is a subset of q. If:

$$A(p,p)==1 \text{ and } A(p,q)*A(q,r)=A(p,r), \text{ for all legal } p,q,r \quad (2)$$

then we may extend the set function Q( ) to all partitions P by:

$$QP(P)=\text{sum}A(p,U(P))Q(p) \quad (3)$$

p in P

Note that all real numbers k, $A(p,q)==(|p|/|q|)^{\hat{}}k$ satisfies this property. Moreover, k==0 implies A(p,q)==1.

(1) holds for Q defined in (3). If QP and QP' are stable partition functions, then so is x*QP+y*QP' for x, y>=0. We also refer to stable partition functions on S as "partition scoring functions" for F.

For any scoring function of the form (3), a monotonically increasing function f may be chosen from the real numbers to itself and replace Q by Q'( )=f(Q( ). In particular, if f( ) is 'sufficiently invertible' (e.g., A( ) and Q( ) are >=0 and f( ) is invertible on the non-negative reals). QP(P) may be defined by:

$$QP'(P)=f\text{-inverse}(\text{sum}A(p,U(P))f(Q(p))) \quad (3')$$

p in P

Since f(QP(P)) satisfies (1) and f( ) is monotonically increasing, the QP' in (3') also satisfies (1) and extends Q( ) on subsets of S. Concretely, if A==1 and Q( )=0 on sets, QP(P) may be defined to be the Euclidean norm of Q( ) on the individual elements of P, and still get a scoring function. Also can use the exponential function for f( ) without requiring Q to be non-negative.

In various embodiments, there may be extreme values under comparisons, using either <= or >=, for a function Q defined on partitions of subsets of S. Since Q may be replaced by −Q if the comparison is <=, it may be assumed without loss of generality that maximal values for Q (i.e., >=) are of interest. Specifically, a method for finding the F-subordinate partition on which Q is maximal, provided Q satisfies a simple property, is disclosed herein.

Given a scoring function Q_Partition on F, we can define a scoring function Q_max ( ) to be Q(p) if p is a leaf, and max(Q(p),Qmax(C(p))) if not. One consequence of this definition and requirement (1) on Q_Partition is that the maximal partition of a subset p (that is, the partition V of p for which Qmax(V) is maximal) is either p or the union of the maximal partitions of each element of C(p) (ties may be broken by taking the subset p instead the children).

In various embodiments, the autogrouping method uses a hierarchical clustering process on S to compute F (i.e., to construct the forest F) and if Q_Partition is a scoring function on the roots R of F, we can find the Q_Max maximal partition of S subordinate to F. Joining a scoring function Q( ) with hierarchical clustering may provide a principled method for choosing among the partitions for the "Q-maximal partition."

The partition generation module 2104 may begin with the original space S and may form a forest F described above. In some embodiments, the generation module 2104 takes a partition P and returns a new partition P' which is coarser than P. Note that Clumper({S})={S}. Any partition P such that generation module 2104 Clumper(P)=P is called clumper-terminal, and repeated applications must eventually reach a clumper-terminal partition. The sequence Singletons(S), Clumper(Singletons(S)), Clumper(Clumper(Singletons(S))), etc., may terminate in a finite number of steps, and the union of all these partitions forms an atomic forest F whose roots are the elements in a C-terminal partition R, which are the roots of F.

One example process utilizing the scoring functions and generating partitions is as follows in the following pseudocode:

```
P = INITIAL(S) // some initial partition - often Singletons( ), but it can
be any partition
F = Tree(P) // node for every subset, remember connections, and have
max slot
            // to hold partition of the node's set which has maximal
            score
for (x in S) { {x}.max = {x} }
BEGIN
    P' = clumper(P)
    if P==P'
    then
        quit
    else
        UPDATE_Qmax(P',P)
END
UPDATE_Qmax(P',P)
    for (p in P') {
        if (!(p in P)) {
            Subset pSubset = AddSubset(p,F);
            if (Q_Subset(p) >= QP(C(p)))
                pSubset.maxPartition = p
                pSubset.Qmax = Q(p)
            else
                pSubset.Qmax = QP(C(p))
                pSubset.maxPartition = MAX_UNION(C(p))
        }
    }
MAX_UNION({Ni})
    return the union of Ni.max
```

When this process terminates, the elements of the roots R of F may contain their maximal partitions, the union of which is the best partition in F of S.

The partition selection module 2112 may find a partition subordinate to the forest F that maximizes at least one scoring function. For example, the partition selection module 2112 may select a partition subordinate to the forest F that maximizes the scoring function QP.

In various embodiments, each subset of a partition (as discussed herein) may be associated with its own scores. For example, each subset of a partition may be associated with a different Q_Max score. The partition selection module 2112 may select subsets of unique elements from any number of different partitions of the forest F using the Q_Max score to generate and select a partition.

For example, looking to FIG. 19D, the partition selection module 2112 may select subset {A, B, C} from one partition and subsets {D, E}, {F}, AND {G} from another partition based on a scoring function. The selected subsets may then form (e.g., generate) a new selected partition P1 (e.g., a partition including subsets {A, B, C}, {D, E}, {F}, AND {G}). The selected partition P1 may be termed an output partition. In this example, the partition selection module 2112 may select the subset {A, B, C} from the first partition utilizing the Q_Max score. In a further example, each subset of all partitions that include any of elements A, B, or C, may be associated with a separate Q_Max score. The maximum Q_Max score of all the sets that include any of the elements of A, B, or C is the subset {A, B, C}. As a result, the partition selection module 2112 selects that subset {A, B, C} in this example.

Similarly, each subset of all partitions that include any of elements D, E, F, or G, may be associated with a separate Q_Max score. The maximum Q_Max scores of all the sets that include any of the elements of D, E, F, or G are the subsets {D, E}, {F}, and {G} (i.e., the Q_Max scores associated with subsets {D, E, F, G}, {D, E, F}, and {G} are not the maximum when compared to the Q_Max scores of subsets {D, E}, {F}, and {G}). As a result, the partition selection module 2112 selects subsets {D, E}, {F}, and {G} in this example.

One example of a scoring function mentioned herein includes a modularity score for weighted graphs on a node set S. In some embodiments, the modularity score of a subset of a graph proportion of edges within a subset, the e's, and the a's which are the proportion of edges which cross the boundaries of the subset. The final score may be: $e-a^2$. In various embodiments, the partition selection module 2112 selects and/or generates a partition by maximizing this score. The modularity partition scorer, QP, may be the sum of the modularity scores on the subsets within that partition.

Another example of a scoring function is a variant of entropy for a set S which has an associated classification: that is, a function cls: $S \rightarrow \{1, 2, \ldots, k\}$ (i.e. you have a set and everything has some finite label.) For s subset of S, we define $p\_i(s)=|\{x \text{ in } s : cls(x)==i\}|/|s|$, provided $|s|!=( )$. Then $Q(s)=\text{sum}\_\{\text{classes i}\} (p\_i(s)*\log(p\_i(s)))$. The extension of the entropy scorer Q to a partition scorer, QP is given by the extension property (3) where $A(p,q)=|p|/|q|$. In other words, for a partition P, $QP(P)=\text{sum}\_\{p \text{ in } P\} (Q(p)*|p|/|U(P)|)$. Normally one wants to minimize the entropy and the subset scorer here is the negative of the traditional entropy score by maximizing the scoring function.

The data control module 2114 is configured to provide the selected and/or generated partition from the partition selection module 2112. In various embodiments, the data control module 2114 generates a report indicating the selected and/or generated partition from the partition selection module 2112. The report may include, for example, data sets, partitions, subsets, elements, data set identifiers, partition identifiers, subset identifiers, element identifiers, and/or the like. In some embodiments, the report may include a graph (e.g., see FIG. 19) with an indication of selected nodes whose member(s) include data of the selected and/or generated partition from the partition selection module 2112.

Figure 22:
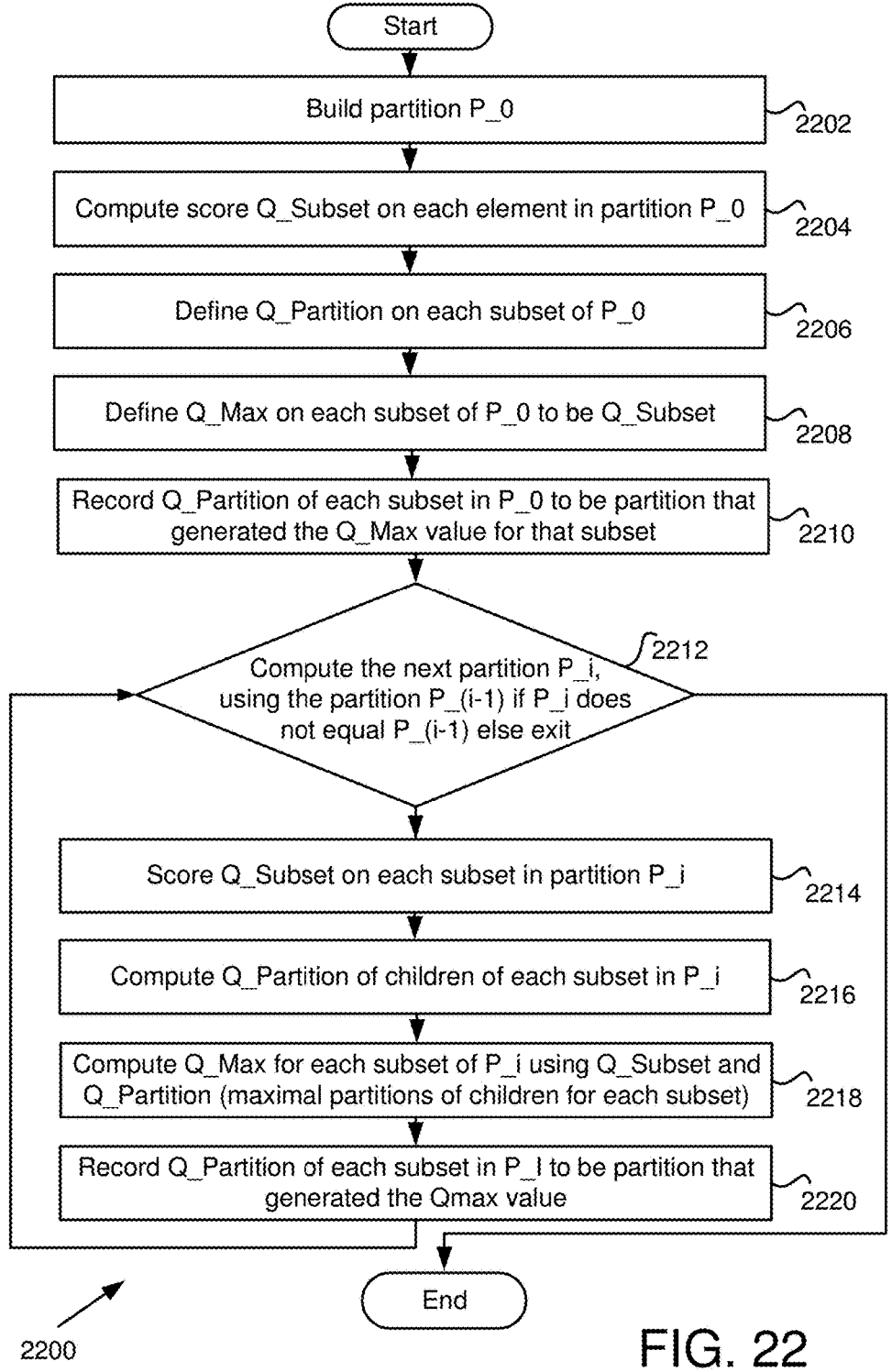
FIG. 22 is an example flowchart for autogrouping in some embodiments.

FIG. 22 is an example flowchart for autogrouping in some embodiments. In this example, the autogroup module 2002 receives a set S={A, B, C, D, E, F, G} and performs autogrouping to identify a selected partition of a forest based on S. Elements of set S may be, for example, nodes of a graph wherein the graph may be visualized (e.g., a visualization as discussed herein) or not visualized. The graph may be a topological data analysis graph of nodes and edges as described herein. In some embodiments, the graph may be any network graph that includes nodes, neighborhoods, groupings, communities, and/or data points.

Non-limiting examples describing at least some of the steps in FIG. 22 will be described using the graph depicted in FIG. 23. The embodiment of the Q_Partition in this example is simply the sum over the subsets of the partition P of the Q_Subset scores on each subset. For example, if P={{A, B, C}, {D}, {E, F}, {G}}, then Q_Partition(P)= Q_Subset({A, B, C})+Q_Subset({D})+Q_Subset({E, F})+ Q_Subset({G}).

In step 2202, the data structure module 2102 receives the set S and the partition generation module 2104 generates an initial partition which are the singletons of the set S={A, B, C, D, E, F, G}, namely, P_0={{A}, {B}, {C}, {D}, {E}, {F}, {G}}. This is illustrated in FIG. 23 as the bottom row (2302) of the depicted forest.

In step 2204, the Q_subset score module 2106 computes the Q_Subset score on each subset of the partition P_0. In this example, the Q_subset score module 2106 scores each singleton subset with a value of 0.5. This score is shown in FIG. 23 for each subset of partition 2302 as Q_Sub=0.5. The scoring function in this example, may be a modularity scoring function discussed herein.

In step 2206, the Q_partition score module 2110 computes the maximal partition of each subset a of P_0 from the children of the subset a in the constructed forest. Since the subsets a in P_0 have no children in the forest, the maximal partition of the children of the subset a is itself. Namely, for each subset a in P_0, MaximalPartitionChildren(a)=a.

In this example, the Q_partition score module 2110 computes the maximal partition of each subset as itself. This is shown in FIG. 23 for each subset of partition 2302 as MaxP={A} for subset {A}, MaxP={C} for subset {C}, MaxP={D} for subset {D}, MaxP={E} for subset {E}, MaxP={F} for subset {F}, and MaxP={G} for subset {G}.

In step 2208, the Q_max score module 2108 computes Q_Max on each subset of P_0. Recall that since the subsets in P_0 do not have any children, for each subset a in P_0, $Q\_Max(a) = \max(Q\_Subset(a), Q\_Partition(MaximalPartitionChildren(a)))$ $= \max(Q\_Subset(a), Q\_Partition(a))$ $= \max(Q\_Subset(a), Q\_Subset(a)) = Q\_Subset(a)$ $= 0.5$ In this example, the Q_max score module 2108 scores each subset with a value of 0.5. This Q_Max score is shown in FIG. 23 for each subset of partition 2302 as Q_Max=0.5.

In step 2210, we optionally record the maximal partition of each subset a in P_0 to be partition of the subset a that generated the Q_Max for that subset. Thus we record the MaximalPartition(a)=a in this initial partition.

Figure 23:
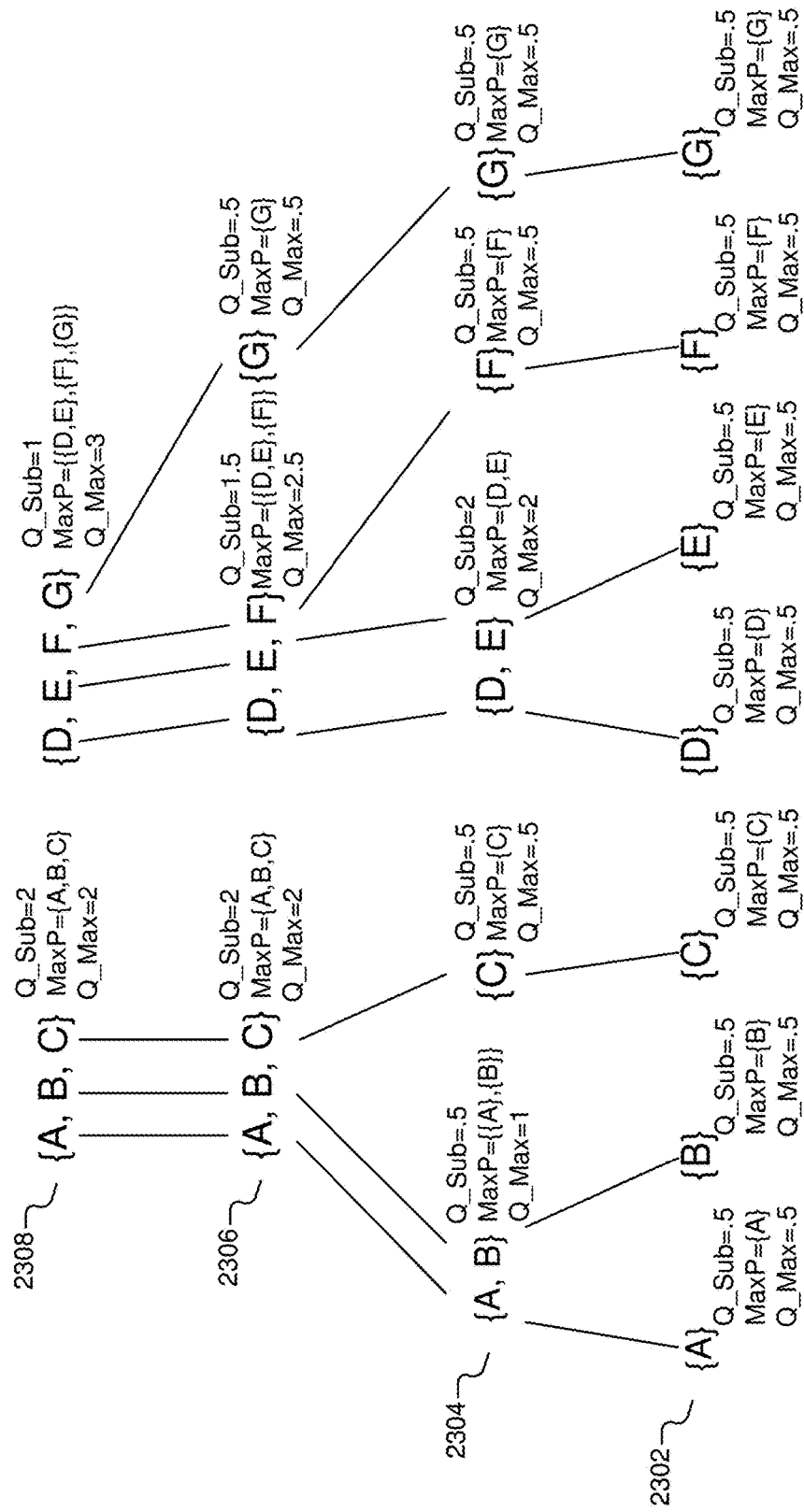
FIG. 23 depicts an example of determining a partition based on scoring in some embodiments.

In step 2212, the data structure module 2102 computes the next partition P_1 (the row labeled 2304 in FIG. 23). Namely, in this example, the data structure module 2102 groups subsets {A} and {B} into the subset {A, B} and subsets {D} and {E} into subset {D, E}. The data structure module 2102 preserved the subsets {C}, {F}, and {G} from the partition P_0 in the partition P_1.

It will be appreciated that the next partition P_1 may group subsets of previous partition(s) (e.g., partition 2304) in any number of ways. For example, the data structure module 2102 may group a predetermined number of subsets together at random and/or may group two or more subsets together based on the elements (e.g., based on the underlying data that the elements represent). In one example, the data structure module 2102 may group elements together using a distance metric and/or any other functions to define relationships in the underlying data and/or within a similarity space (e.g., reference space).

In various embodiments, the data structure module 2102 may determine whether the system ends and/or whether a new partition is to be computed. It will be appreciated that the data structure module 2102 may perform the determination based on any number of ways. In some embodiments, the data structure module 2102 determines if the next generated partition is equal to the previous partition. If the two partitions are equal (e.g., have the same subsets), the method may terminate, otherwise the method may continue to step 2214.

In some embodiments, the data structure module 2102 terminates the method after a predetermined number of partitions are generated, if a predetermined number of roots are found, and/or the like. In various embodiments, the data structure module 2102 may terminate the method if a predetermined number of subsets are present in a computed partition. In another example, the data structure module 2102 may terminate the method after a predetermined period of time, a predetermined period of memory usage, or based on any threshold (e.g., the threshold being calculated based on the amount of data received).

In step 2214, the Q_subset score module 2106 computes the Q_Subset score on each subset of the partition P_1. In this example, the Q_subset score module 2106 computes Q_Subset({A, B})=0.5 and Q_Subset({D, E})=2. In one example, the Q_subset score module 2106 calculates a modularity score for elements A and B for Subset {A, B} and a modularity score for elements D and E for Subset {D, E}. As discussed herein, the modularity score may be based on the edges of nodes A and B for Q_Subset({A, B}) modularity score and based on the edges of nodes D and E for Q_Subset({D, E}) modularity score.

As was discussed in the paragraph above describing step 2204, Q_Subset of each singleton subset is 0.5 (e.g., the previous Q_Subset score for singleton subsets in step 2304 remains unchanged from step 2302). These scores are associated with each subset and are visualized in the FIG. 23 as Q_Sub in 2304.

In step 2216, the Q_partition score module 2110 then computes the maximal partition at the children of each subset of P_1. The maximal partition of the children of the subsets {C}, {F}, and {G} are again the original singleton subset. The maximal partition of the children {A, B} is the set including the maximal partitions of the children of {A, B}, namely {{A}, {B}} as depicted in partition 2304 in FIG. 23. Similarly the maximal partition of the children of {D, E} is the set {{D}, {E}} as also depicted in partition 2304 in FIG. 23.

In step 2218, the Q_max score module 2108 computes the Q_Max on each subset of P_1. Recall Q_Max(a)=max (Q_Subset(a), Q_Partition(MaximalPartitionChildren(a)). For the subset {A, B}:

$Q\_Max(\{A,B\}) = \max(Q\_Subset(\{A,B\}), Q\_Partition(\{\{A\},\{B\}\}))$ $= \max(0.5, Q\_Subset(\{A\}) + Q\_Subset(\{B\}))$ $= \max(0.5, 1)$ $= 1$ For the subset {D, E}:

$Q\_Max(\{D,E\}) = \max(Q\_Subset(\{D,E\}), Q\_Partition(\{\{D\},\{E\}\}))$ $= \max(2, Q\_Subset(\{D\}) + Q\_Subset(\{E\}))$ $= \max(2, 1)$ $= 2.$ As displayed in partition 2304 of FIG. 23, Q_Max of {A, B} is 1 and Q_Max of {D, E} is 2. The Q_Max of singletons {C}, {F}, and {G} in partition 2304 remain consistent with the respective subsets in partition 2302. Namely, the Q_Max of each of {C}, {F}, and {G} is 0.5.

In step 2220, we optionally record the maximal partition of each subset a in P_1 that resulted in the Q_Max score. As seen above and in FIG. 23, MaxPartition({A, B})={{A}, {B}} and MaxPartition({D, E})={D, E}.

Step 2212 is repeated. The data structure module 2102 computes the next partition P_2, depicted in FIG. 23 as row (partition) 2306. In various embodiments, the data structure module 2102 may determine whether the system ends and/or whether a new partition is to be computed. It will be appreciated that the data structure module 2102 may perform the determination based on any number of ways.

In step 2214, the Q_subset score module 2106 computes the Q_Subset score on each subset of the partition P_2. In this example, the Q_subset score module 2106 computes Q_Subset({A, B, C})=2 and Q_Subset({D, E, F})=1.5. Again, Q_Subset({G})=0.5. These scores are recorded with each subset and are visualized in the FIG. 23 in partition 2306.

In step 2216, the Q_partition score module 2110 computes the maximal partition at the children of each subset of P_2. The maximal partition of the children{G} is the subset {G}. The maximal partition of the children {A, B, C} is the set consisting of the maximal partitions of the children of {A, B, C}, namely {MaxPartition({A, B}), MaxPartition({C})={{A}, {B}, {C}}. Similarly the maximal partition of the children of {D, E, F} is the set {MaxPartition({D, E}), MaxPartition({F})}={{D, E}, {F}}.

This is shown in FIG. 23 for each subset of partition 2306 as MaxP={A, B, C} for subset {A, B, C}, MaxP={{D, E}, {F}} for subset {D, E, F}, and MaxP{G} for subset {G}.

In step 2218, the Q_max score module 2108 computes the Q_Max on each subset of P_2. Recall Q_Max(a)=max (Q_Subset(a), Q_Partition(MaximalPartitionChildren(a)). For the subset {A, B, C}:

$$Q\_Max(\{A,B,C\})=\max(Q\_Subset(\{A,B,C\}), Q\_Partition(\{\{A\},\{B\},\{C\}\}))$$

$$=\max(2, Q\_Subset(\{A\})+Q\_Subset(\{B\})+Q\_Subset(\{C\}))$$

$$=\max(2,1.5)$$

$$=2$$

For the subset {D, E, F}:

$$Q\_Max(\{D,E,F\})=\max(Q\_Subset(\{D,E,F\}), Q\_Partition(\{\{D,E\},\{F\}\}))$$

$$=\max(1.5, Q\_Subset(\{D,E\})+Q\_Subset(\{F\}))$$

$$=\max(1.5,2.5)$$

$$=2.5$$

As displayed in partition 2306 of FIG. 23, Q_Max of {A, B, C} is 2 and Q_Max of {D, E, F} is 2.5 The Q_Max of singleton{G} in partition 2306 remains consistent with the respective subset in partition 2304. Namely, the Q_Max {G} is 0.5.

In step 2220, we optionally record the maximal partition of each subset a in P_2 that resulted in the Q_Max score. As seen above, MaxPartition({A, B, C})={{A, B, C}} and MaxPartition({D, E, F})={{D, E}, {F}}.

Step 2212 is repeated. The data structure module 2102 computes the next partition P_3, depicted in FIG. 23 as row (partition) 2308. The data structure module 2102 may determine whether the system ends and/or whether a new partition is to be computed.

In step 2214, the Q_subset score module 2106 computes the Q_Subset score on each subset of the partition P_3. In this example, the Q_subset score module 2106 computes Q_Subset({A, B, C})=2 and Q_Subset({D, E, F, G})=1. These scores are recorded with each subset and are visualized in FIG. 23 in partition 2308.

In step 2216, the Q_partition score module 2110 computes the maximal partition at the children of each subset of P_3. The maximal partition of the children {A, B, C} is the set consisting of the maximal partitions of the children of {A, B, C}, namely {MaxPartition({A, B, C})}={{A, B, C}. Similarly the maximal partition of the children of {D, E, F, G} is the set {MaxPartition({D, E, F}), MaxPartition({G})}={{D, E}, {F}, {G}}.

This is shown in FIG. 23 for each subset of partition 2308 as MaxP={A, B, C} for subset {A, B, C} and MaxP={{D, E}, {F}, {G}} for subset {D, E, F, G}.

In step 2218, the Q_max score module 2108 computes the Q_Max on each subset of P_3. Recall Q_Max(a)=max (Q_Subset(a), Q_Partition(MaximalPartitionChildren(a)). For the subset {A, B, C}:

$$Q\_Max(\{A,B,C\})=\max(Q\_Subset(\{A,B,C\}), Q\_Partition(\{A,B,C\}))$$

$$=\max(2, Q\_Subset(\{A,B,C\}))$$

$$=2$$

For the subset {D, E, F, G}:

$$Q\_Max(\{D,E,F,G\})=\max(Q\_Subset(\{D,E,F,G\}), Q\_Partition(\{\{D,E\},\{F\},\{G\}\}))$$

$$=\max(1, Q\_Subset(\{D,E\})+Q\_Subset(\{F\}+Q\_Subset(\{G\}))$$

$$=\max(1,3)$$

$$=3$$

As displayed in partition 2308 of FIG. 23, Q_Max of {A, B, C} is 2 and Q_Max of {D, E, F, G} is 3.

In step 2220, we optionally record the maximal partition of each subset a in P_3 that resulted in the Q_Max score. As seen above, MaxPartition({A, B, C})={{A, B, C}} and MaxPartition({D, E, F, G})={{D, E}, {F}, {G}}.

Although not depicted in method 2200, the method may continue. For example, the partition selection module 2112 may identify and/or generate a preferred partition from that maximizes one or more scoring functions. In this example, the preferred partition is the MaxPartition. As discussed immediately above, the maximal partition of each subset in P_3 is MaxPartition({A, B, C})={{A, B, C}} and MaxPartition({D, E, F, G})={{D, E}, {F}, {G}}. The partition selection module 2112 may identify and/or generate the autogrouped partition {{A, B, C}, {{D, E}, {F}, {G}}.

The data control module 2114 may provide the identified and/or generated autogrouped partition in a report and/or identify the autogrouped partition in data or a graph.

Figure 24:
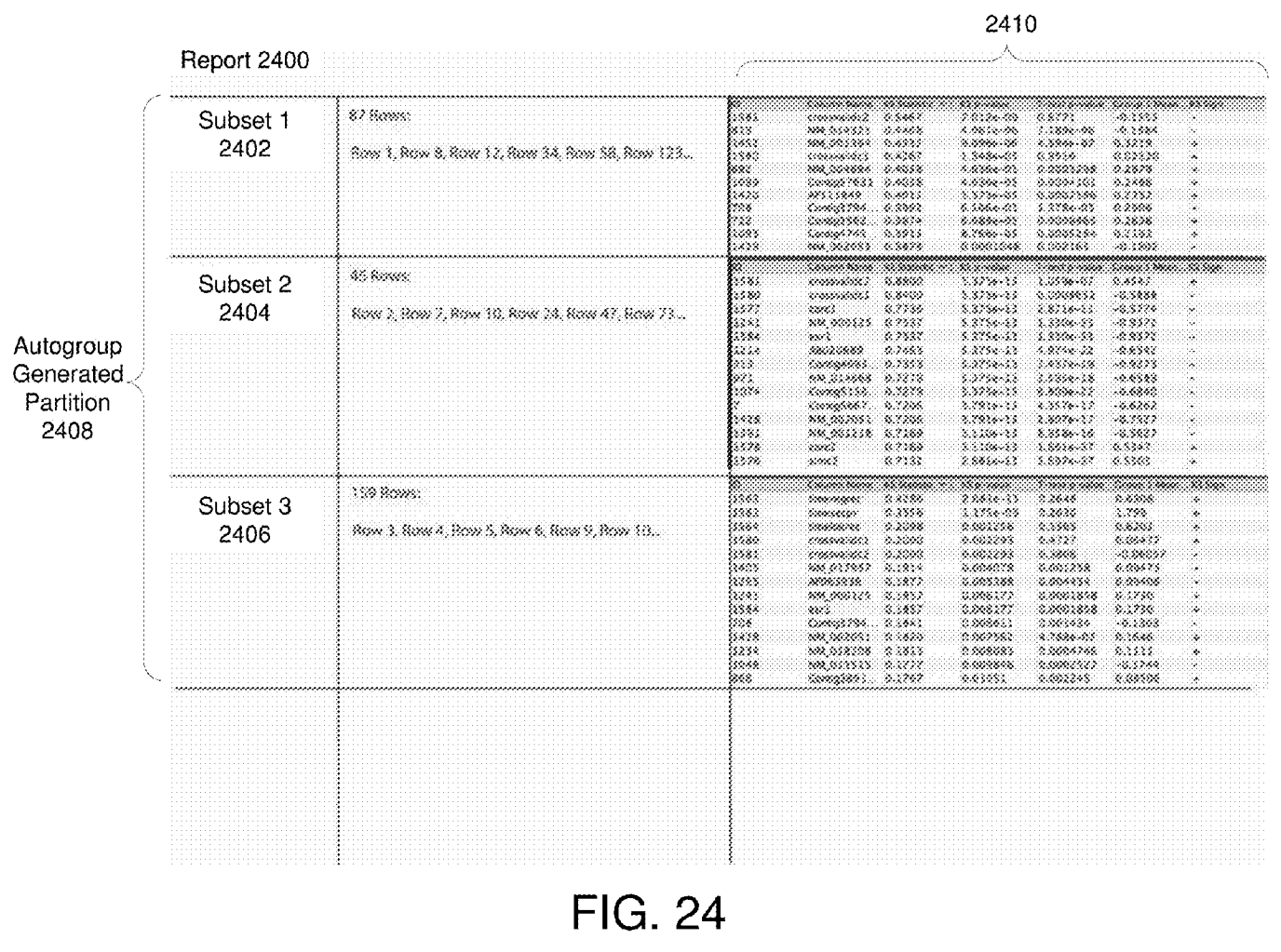

FIG. 24 is an example report 2400 of an autogrouped graph of data points that depicts the grouped data in some embodiments. Subsets 2402, 2404, and 2406 are subsets of data points that, together, make a partition (i.e., the autogrouped generated partition 2408). In various embodiments, data may be received and nodes generated utilizing embodiments described herein (e.g., see description regarding FIG. 4 or 8). The nodes that represent at least some of the received data may be autogrouped into a number of subsets 2402, 2404, and 2406 of an autogroup generated partition 2408. The report 2400 may depict the subsets including the rows of the underlying data associated and/or within each subset as well as all or some of the underlying data 2410 for that subset.

For example, the autogroup module 2002 may generate a report that shows each subset of datapoints for an autogroup generated partition. The rows, columns, or other data identifiers may be associated with each subset. Further, all or some of the data associated with each subset may be displayed (e.g., including any independent variables such as data identifiers, for example, patient identifiers).

The report may allow groups of nodes (e.g., nodes that are part of a subset of the output partition) to be identified. The identified groups of nodes may be identified in a visualization by coloring the nodes in a group a similar color, shape of nodes, a graphical element associated with nodes in a group (e.g., a box around nodes in a group), and/or in any number of ways. In some embodiments, the identified groups of nodes allow a user to create queries, analyze, and/or view data associated with nodes in a group for insights.

In some embodiments, autogrouping may be utilized on a weighted graph. In this example, the set that will be autogrouping is the set of nodes of a weighted graph G. The idea is to automatically partition the graph into groups of nodes that are strongly-connected in the graph. An unweighted graph may be transformed into a weighted graph if there is a function f on the nodes of the graph. The weight for an edge (a,b) between two nodes a and b in the graph G may be defined to be the difference between the function values: wt(a,b)=|f(a)−f(b)|. In another embodiment, this graph may be a visualization generated from a data set and the function on the nodes may be given by a color scheme on the nodes.

In one example, the input graph G may be generated from connecting points to their nearest neighbors, where the metric space is a set of 2200 points from 5 Gaussian samples in the Euclidean plane. The graph may be colored by the Gaussian density. The graph is made into a weighted graph by weighting each edge in G by the difference in the Gaussian density function at the edge's endpoints.

Figure 25:
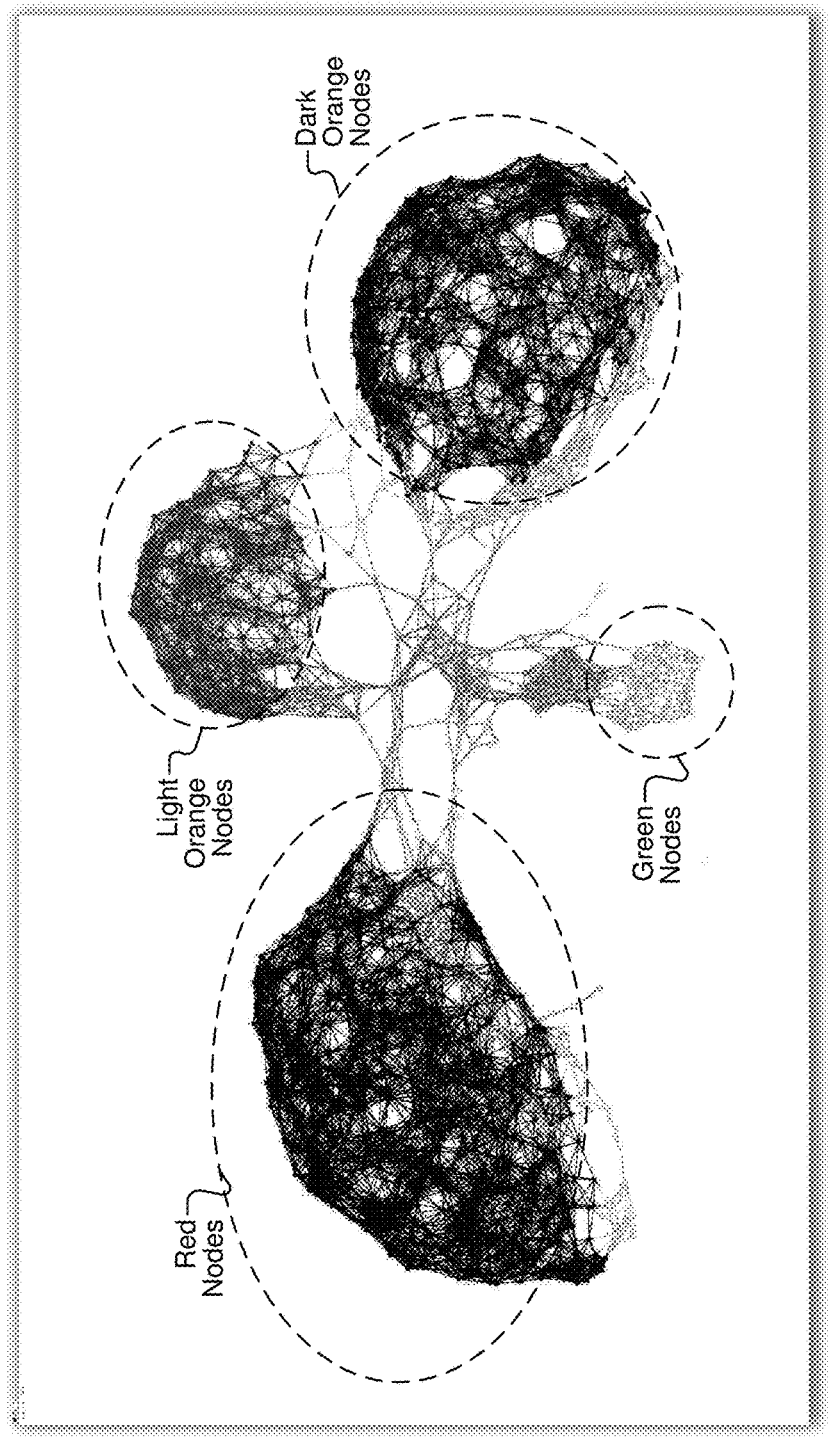
FIG. 25 is an example visualization generated based on an input graph, each edge being weighted by a difference of a density function at the edge endpoints.

The method is applied uses the scoring mechanisms described herein regarding weighted graphs and the modularity scorer applied to the weighted graph G. The resulting maximal partition may be "color coded" (utilizing grey-scale) in FIG. 25.

Figure 26:
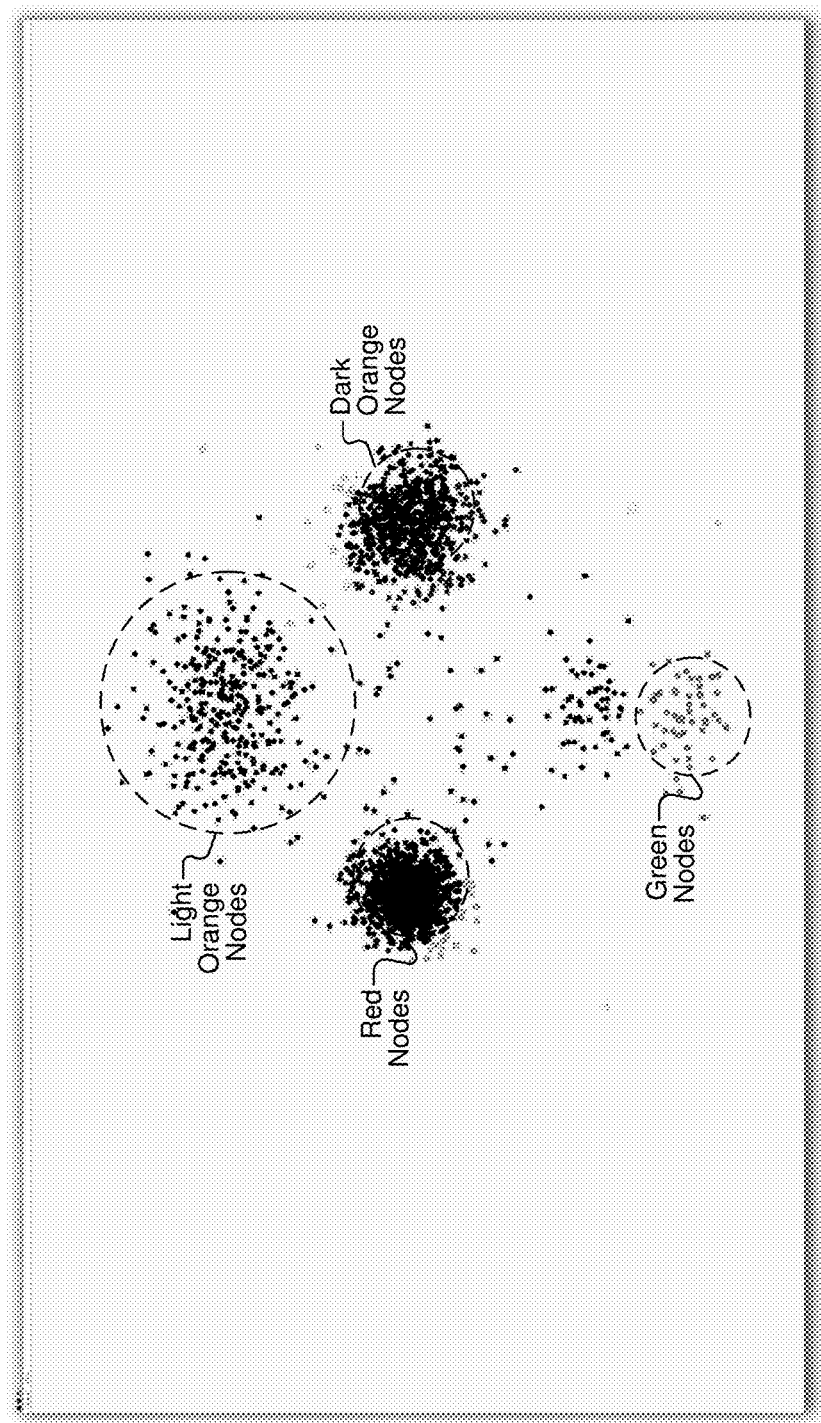
FIG. 26 is another example visualization generated using autogrouped partitions of a graph into regions that are strongly connected and have similar function values.

To elucidate the groups, we look at the corresponding points and assignments in a scatter plot of the points in the Euclidean plane in FIG. 26. As the graph G comes from the geometry in this data set, subtle geometric features are preserved in this decomposition. In other words, in this example, autogrouping partitioned the graph into regions of the graph that are strongly connected and have similar function (specifically density) values. This is helpful as the data points within each group are now very similar to each other drawing statistical conclusions from each subset is much more likely to be statistically significant.

In one application of this embodiment, the original data may be a data set that is input into the graph construction (e.g., as discussed regarding FIG. 8), which produces a graph (the graph may be in memory or a visualization). The visualization may be colored by the average value of a function of interest on the data points as discussed herein. One such coloring might be the outcome of interest for the data set such as survival of patients, power output in an electric generator, etc. The coloring is used to convert the graph (e.g., in memory or visualization) into a weighted graph that may be then autogrouped using one or more of the autogrouping embodiments described herein. Various autogrouping algorithm partitions the graph into subsets that are highly connected and have similar color values.

The groups may be used to create a new color scheme for the graph for use in a visualization. They may also be used for automatic statistical analysis and report generation. Moreover, this process may be used to start with the dataset, generate a graph (but not necessarily generate a visualization) (e.g., generate all or part of the graph in memory), and then report to the user the subsets of the final autogrouped maximal partition together with statistical calculations on those subsets.

As discussed herein, recall that once a filter is computed, data points may be mapped to a reference space and an open cover is generated in that reference space (see discussion regarding FIG. 8). The elements in the open cover may be iterated over, together with clustering, to generate the nodes in the resulting visualization. In one example described herein, the open cover may take intervals in the reference space (or cross-products of intervals in the case of more than one filter). The following embodiment is a data-driven alternative to generating the open cover in the reference space.

The set S in this embodiment are the projections of the original data points into the reference space (e.g., a function such as a gausian density function is applied on the received data points to project to the reference space). The autogroup module 2002 may operate on a weighted graph built from this projection of the data into the reference space. For example, for a fixed positive integer k, construct a graph G on the set S by connecting each point a in S to every point b in S if b is one of a's k-nearest neighbors and a is one of b's k-nearest neighbors (i.e. they are symmetric k-nearest neighbors of each other). In some testing, k=20 produces good results. The edges of the graph may be weighted by the distance between the edge's endpoints in the embedded reference space distance. This autogrouping embodiment may utilize a hierarchical single-linkage clusterer that uses distance between points in the reference space. The scorer modules (e.g., modules 2106, 2108, and/or 2110 in FIG. 21) may utilize a modularity score built off of the weighted neighborhood graph G.

The result of this embodiment may be a partition P of the projection of the data points in the reference space. Now for a fixed positive integer j, we can expand each subset a of P by adding all the j-nearest neighbors in the reference space of the elements in the subset a. The new, expanded subsets may no longer be a partition as some points may now exist in multiple subsets but this new collection of subsets forms the open cover of the reference space (see discussion regarding FIG. 8) in the graph construction.

In various embodiments, autogrouping may be used for clustering. For example, in the embodiments described with regard to FIG. 8, after a cover is generated either in the reference space or in the original space, data is clustered on each of the subsets in the open cover to identify nodes (e.g., see steps 808-812). Autogrouping clustering may be an adaptive alternative to single linkage clustering with a fixed distance cut-off.

For example, the set S is a set data together with a metric which defines a distance between any two points in the set S. In the discussion regarding FIG. 8, these points may have come from the open cover in the reference space. In the current example, the partition generation module 2104 (see FIG. 21) and one or more of the score modules (e.g., the Q_Subset score module 2106, the Q_Max score module 2108, and/or the Q_Partition score module 2110) operate on a weighted neighborhood graph built from the data. For a fixed positive integer k, a graph G may be constructed on the set S by connecting each point "a" in S to every point "b" in S if "b" is one of "a's" k-nearest neighbors and "a" is one of "b's" k-nearest neighbors under the given metric (i.e. they are symmetric k-nearest neighbors of each other). In some instances, k=20 produces good results. The edges of this graph may be weighted by the distance between the edge's endpoints. The partition generation module 2104 for this autogrouping example is a hierarchical single-linkage clusterer that uses the distance between points determined by the given metric. The one or more of the score modules (e.g., the Q_Subset score module 2106, the Q_Max score module 2108, and/or the Q_Partition score module 2110) uses the modularity score built off of the weighted neighborhood graph G. The resulting clustering would likely have clusters formed at a variety of distance cut-offs instead of a single fixed distance cut-off for the set S.

In another example, the elements of the set S might have additional information such as an associated classification, that is, for example, a function cls: $S \to \{1, 2, \ldots, k\}$ (i.e. there is a set and everything has some finite label.) The one or more of the score modules (e.g., the Q_Subset score module 2106, the Q_Max score module 2108, and/or the Q_Partition score module 2110) may score entropy (e.g., one or more of the score modules may be an entropy scorer).

One example of an entropy scorer $Q(a)=\text{sum}\_\{\text{classes } i\} (p\_i(a)*\log(p\_i(a)))$ where $p\_i(a)=|\{x \text{ in } a : \text{cls}(x)==i\}|/|a|$, provided $|a|!=0$. The extension of the entropy scorer Q to a partition scorer, QP is given by the extension property (3) where $A(p,q)=|p|/|q|$. In other words, for a partition P, $QP(P)=\text{sum}\_\{p \text{ in } P\} (Q(p)*|p|/|U(P)|)$. The combination of the partition generation module 2104 and one or more of the score modules (e.g., the Q_Subset score module 2106, the Q_Max score module 2108, and/or the Q_Partition score module 2110) may produce the maximal partition (i.e. clustering) of the elements of the set S that emphasizes clusters that are very close in distance and have the lowest entropy in class type in the subsets of the partition. In other words, this example embodiment may locate clusters that have the largest proportion of each single class type possible under the constraint of the distance metric.

In some embodiments, autogrouping may be used for open cover generation without a reference space. For example, in the embodiments described with regard to FIG. 8, a filter may be generated, points may be mapped to the reference space, and an open cover may be generated in that reference space (e.g., see steps 802-808). The elements in the open cover may be iterated over, together with clustering, to identify nodes. In some embodiments, the open cover may be constructed in the reference space. Various embodiments include a data-driven alternative to generating the open cover of the original data without the need to have a filter or a reference space.

In one example, the set S is the original data together with a metric which defines a distance between any two points in the set S. Both the partition generation module 2104 and the one or more of the score modules (e.g., the Q_Subset score module 2106, the Q_Max score module 2108, and/or the Q_Partition score module 2110) may operate on a weighted neighborhood graph built from the data. Specifically, for a fixed positive integer k, a graph G on the set S is constructed by connecting each point "a" in S to every point "b" in S if "b" is one of "a's" k-nearest neighbors and "a" is one of "b's" k-nearest neighbors under the given metric (i.e. they are symmetric k-nearest neighbors of each other). In some instances, k=20 produces good results. The edges of this graph may be weighted by the distance between the edge's endpoints. The partition generation module 2104 for this embodiment is a hierarchical single-linkage clusterer that uses the distance between points determined by the given metric. One or more of the score modules (e.g., the Q_Subset score module 2106, the Q_Max score module 2108, and/or the Q_Partition score module 2110) may use the modularity score built off of the weighted neighborhood graph G.

The result in this example is a partition P of the data points in the original space. For a fixed positive integer "j", we can expand each subset "a" of P by adding all the j-nearest neighbors of the elements in the subset "a". The new, expanded subsets may no longer be a partition as some points may now exist in multiple subsets but this new collection of subsets may form the open cover of the space for step 808 as described in FIG. 8.

It will be appreciated that many graphs may be generated for the same data. For example, TDA may be utilized with different filters, metrics, resolutions, or any combination to generate different graphs (and different visualizations) using the same large data set. Each graph may provide different insights based on the data's shape, character, or both. Different filters, metrics, resolutions, or combinations may generate different graphs that include different groupings of nodes. It may be advantageous for a data scientist to generate at least one graph that includes or depicts groupings of nodes that share a similar characteristic (e.g., outcome). These graphs with this type of groupings (e.g., if the groupings are coherent relative to other nodes in the same graph, relative to other nodes in other graphs, or both) may suggest insights or relationships within the data that were not previously available through query methods.

In some embodiments, different graphs may be generated on the same data using TDA methods described herein. Each different graph may be generated based on different filters, metrics, resolutions, or any combination. All or some nodes within each graph may be grouped based on a shared characteristic such as outcome. For example, if the outcome is survival, then nodes may be grouped based on those that survived and those that did not survive. In some embodiments, nodes are only grouped if they share the same outcome (e.g., they share the same shared characteristic), there is a sufficient number of nodes in the group, there is a sufficient number of connections between nodes between groups, or any combination. Each graph may be scored based on the groupings within that particular group. Each graph may then be ordered based on score and one or more of the graphs may be identified or provided to a user based on the ordered score (e.g., visualizations of the top three graphs based on best score is displayed or otherwise provided to the user).

It will be appreciated that this system of automatic outcome analysis may allow a data scientist to have data assessed through a variety of different filters, metrics, resolutions, or any combination to find a preferred graph without manual selection of each filter, metric, and resolution. Further, the data scientist may not be required to manually inspect each visualization of each graph to identify one or more graphs that have the best grouping of nodes based on outcome.

In various embodiments, systems and methods described herein may assist in identifying one or more graphs that best localizes an outcome or shared characteristic (e.g., of one or more columns in the data set). For example, a graph that best localizes an outcome may include or depict regions of the graph that have categories of or similar values from the outcome concentrated together). In some embodiments, systems and methods described herein may generate scores to identify metrics that are "continuous" with respect to the outcome column, identify lenses that have distributions of the outcome categories that are "localized," and choose lens parameters that are localized and separate outcome categories (or similar outcome values) without having too many singletons.

Figure 27:
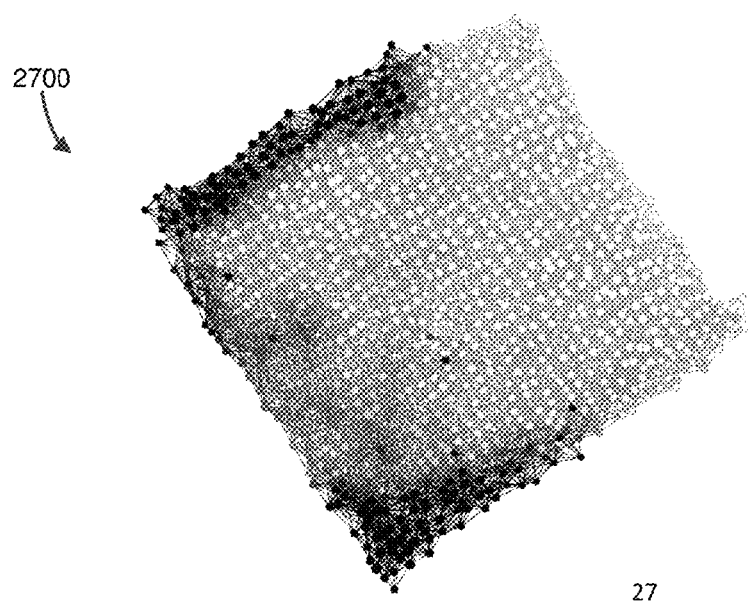
FIG. 27 depicts a visualization of a graph that illustrates outcomes that are not significantly localized.

FIG. 27 depicts a visualization 2700 of a graph that illustrates outcomes that are not significantly localized. The visualization 2700 is colored in greyscale based on outcome. The nodes of the visualization 2700 appear generally connected and black nodes appear to collect on three sides of the visualization 2700.

Figure 28:
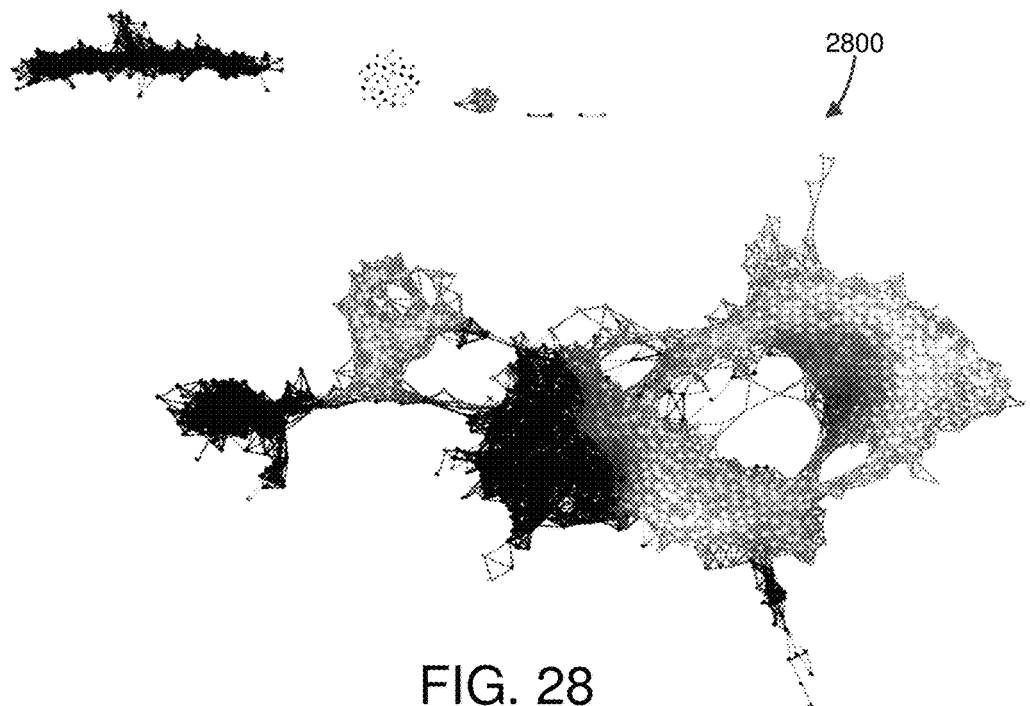
FIG. 28 depicts a visualization of a graph that illustrates outcomes that are more localized than FIG. 27.

FIG. 28 depicts a visualization 2800 of a graph that illustrates outcomes that are more localized than FIG. 27. FIGS. 27 and 28 may depict different visualizations of the same data (e.g., TDA, as discussed herein, is performed on the same data but different filters, metrics, resolutions, or combinations were used to generate different graphs and visualizations) Like FIG. 27, the visualization 2800 is colored in greyscale based on outcome. It will be appreciated that nodes that share similar outcome and are similarly colored are more densely packed and more interconnected than those depicted in FIG. 27. A data scientist may perceive additional insights, identify interrelationships in the data, or both using FIG. 28 rather than FIG. 27.

Figure 29:
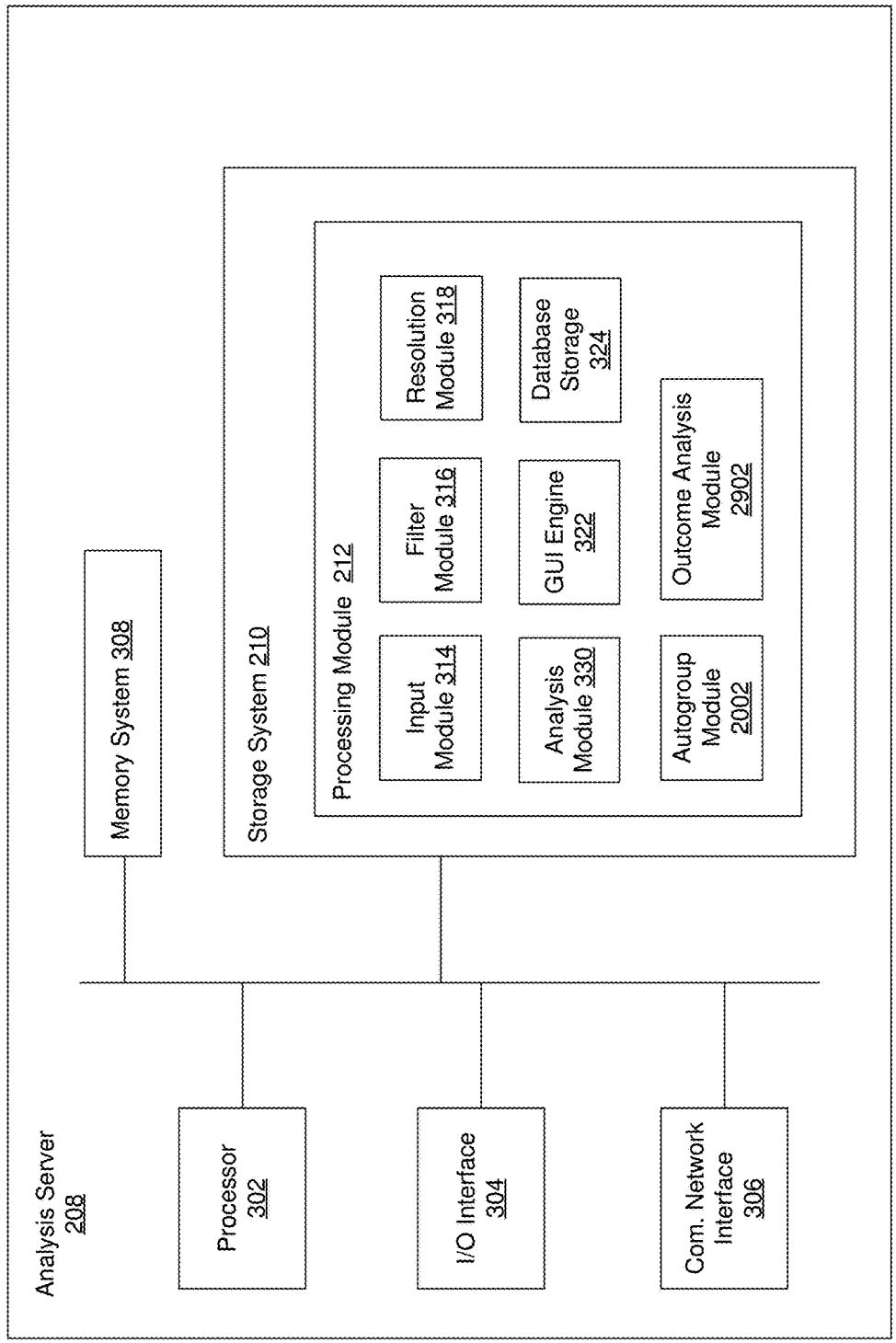
FIG. 29 is a block diagram of an exemplary analysis server including an autogroup module and an outcome analysis module.

FIG. 29 is a block diagram of an exemplary analysis server 208 including an autogroup module 2002 and an outcome analysis module 2902. The exemplary analysis server 208 depicted in FIG. 20 may be similar to the exemplary analysis server 208 depicted in FIGS. 2 and 20. In exemplary embodiments, the analysis server 208 comprises a processor 302, input/output (I/O) interface 304, a communication network interface 306, a memory system 308, and a storage system 310.

The storage system 310 comprises a plurality of modules utilized by embodiments of the present invention. A module may be hardware (e.g., an ASIC), software (e.g., including instructions executable by a processor), or a combination of both. In one embodiment, the storage system 310 comprises a processing module 312 which comprises an input module 314, a filter module 316, a resolution module 318, an analysis module 320, a visualization engine 322, a database storage 324, and an autogroup module 2002. Alternative embodiments of the analysis server 208 and/or the storage system 310 may comprise more, less, or functionally equivalent components and modules.

The input module 314 may be configured to receive commands and preferences from the user device 202a. In various examples, the input module 314 receives selections from the user which will be used to perform the analysis. The output of the analysis may be an interactive visualization.

The input module 314 may provide the user a variety of interface windows allowing the user to select and access a database, choose fields associated with the database, choose a metric, choose one or more filters, and identify resolution parameters for the analysis. In one example, the input module 314 receives a database identifier and accesses a large multidimensional database. The input module 314 may scan the database and provide the user with an interface window allowing the user to identify an ID field. An ID field is an identifier for each data point. In one example, the identifier is unique. The same column name may be present in the table from which filters are selected. After the ID field is selected, the input module 314 may then provide the user with another interface window to allow the user to choose one or more data fields from a table of the database.

Although interactive windows may be described herein, it will be appreciated that any window, graphical user interface, and/or command line may be used to receive or prompt a user or user device 202a for information.

The filter module 316 may subsequently provide the user with an interface window to allow the user to select a metric to be used in analysis of the data within the chosen data fields. The filter module 316 may also allow the user to select and/or define one or more filters.

The resolution module 318 may allow the user to select a resolution, including filter parameters. In one example, the user enters a number of intervals and a percentage overlap for a filter.

The analysis module 320 may perform data analysis based on the database and the information provided by the user. In various embodiments, the analysis module 320 performs an algebraic topological analysis to identify structures and relationships within data and clusters of data. It will be appreciated that the analysis module 320 may use parallel algorithms or use generalizations of various statistical techniques (e.g., generalizing the bootstrap to zig-zag methods) to increase the size of data sets that can be processed. The analysis is further discussed in FIG. 8. It will be appreciated that the analysis module 320 is not limited to algebraic topological analysis but may perform any analysis.

The visualization engine 322 generates an interactive visualization including the output from the analysis module 320. The interactive visualization allows the user to see all or part of the analysis graphically. The interactive visualization also allows the user to interact with the visualization. For example, the user may select portions of a graph from within the visualization to see and/or interact with the underlying data and/or underlying analysis. The user may then change the parameters of the analysis (e.g., change the metric, filter(s), or resolution(s)) which allows the user to visually identify relationships in the data that may be otherwise undetectable using prior means. The interactive visualization is further described in FIGS. 9-11.

The database storage 324 is configured to store all or part of the database that is being accessed. In some embodiments, the database storage 324 may store saved portions of the database. Further, the database storage 324 may be used to store user preferences, parameters, and analysis output thereby allowing the user to perform many different functions on the database without losing previous work.

The autogroup module 2002 is configured to autogroup data points of a data set or nodes in a graph. As discussed herein, the groupings may be approximations of possible maxima of a given scoring function that scores possible partitions of the original data object (e.g., a collection of data points or a collection of nodes of a graph). The autogroup module 2002 may, in some embodiments, perform autogrouping of nodes of a graph (whether a visualization is generated or not). In various embodiments, the autogroup module 2002 may perform autogrouping for reference space open cover generation. The autogroup module 2002 may autogroup any number of data points, sets of data points, representations, and/or the like. The autogroup module 2002 is further discussed in FIG. 21.

The outcome analysis module 2902 is configured to select metric-lens combinations, select resolutions, generate graphs using the selected metric-lens(es) combinations and resolutions, group nodes by distribution of outcomes of member data points to score each graph, and select one or more graphs based on score (e.g., based on similar or same outcomes or distribution of outcomes). The outcome analysis module 2902 may generate visualizations of the selected graphs. The outcome analysis module 2902 is further described with regard to FIG. 30.

It will be appreciated that that all or part of the processing module 212 may be at the user device 202a or the database storage server 206. In some embodiments, all or some of the functionality of the processing module 312 may be performed by the user device 202a.

Figure 30:
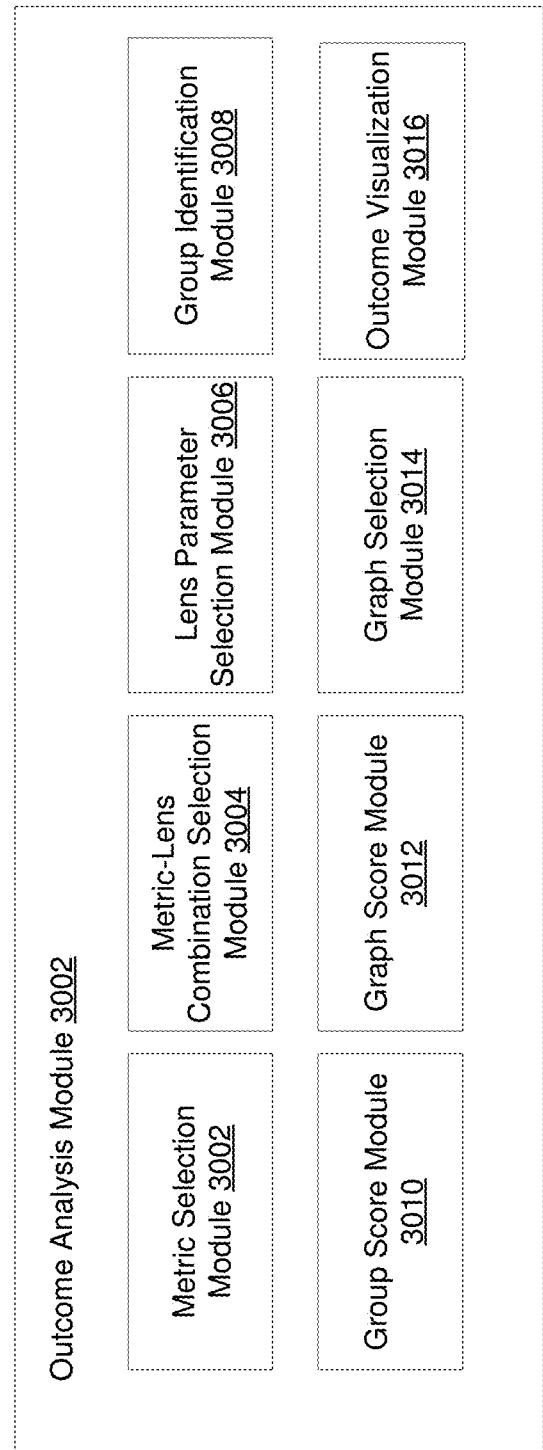
FIG. 30 depicts an example outcome analysis module in some embodiments.

FIG. 30 depicts an example outcome analysis module 3002 in some embodiments. The outcome analysis module 3002 may comprise a metric selection module 3002, a metric-lens combination selection module 3004, a lens parameter selection module 3006, group identification module 3008, group score module 3010, a graph score module 3012, a graph selection module 3014, and an outcome visualization module 3016. The metric selection module 3002 may select one or more metrics for testing from a set of metrics. In some embodiments, a user may provide the metric selection module 3002 with one or more metrics to test. The metric selection module 3002 may test a metric in a number of ways. In one example, the metric selection module 3002 may receive a data set and, for each data point in the data set, determine one or more closest neighboring data points using the metric to be tested. For each point in the data set, the metric selection module 3002 may improve (e.g., increase) a metric score if the one or more closest neighboring data points to that data point share a similar or same shared characteristic(s) (e.g., similar or shared outcome). In this way, the metric selection module 3002 may generate a metric score for the graph. The metric selection module 3002 may similarly generate a metric score for each metric using the same data set. The metric selection module 3002 may select one or more metrics and generate a subset of metrics including the one or more selected metrics using the metric scores (e.g., based on highest data scores). The process is further described herein.

The metric-lens combination selection module 3004 may select one or more lens(es) to combine with one or more metric(s) of the subset of metrics. In various embodiments, the metric-lens combination selection module 3004 may select lenses from a set of lenses or receive one or more lenses to test from a user. For each metric-lens(es) combination, the metric-lens combination selection module 3004 may compute a reference map of the lens space using the data from the originally received data set and compute a category entropy of each subspace of each reference map. The metric-lens combination selection module 3004 may compute a metric-lens score based on a sum of category entropies of a particular graph. The metric-lens combination selection module 3004 may select one or more metric-lens(es) combinations based on the metric-lens score. The process is further described herein.

The lens parameter selection module 3006 may select lens parameters (e.g., resolution, gain, or both). The choice of resolution may depend on the number of points in the space and the number of lenses. The process is further described with regard to FIG. 38.

The group identification module 3008 identifies groups within a graph (e.g., a topological graph) generated using at least one of the subset of metric-lens combination and at least one selected resolution. The group identification module 3008 may identify one or more groups that share the same or similar outcomes (or distribution of outcomes) using autogrouping as described herein.

The group score module 3010 may generate a group score for each group identified by the group identification module 3008. The group score may be based in part on entropy of the group. The graph score module 3012 generates a graph score based on the entropy of each group within that graph. A graph selection module 3014 may select one or more graphs to provide or identify for the user based, at least in part, on the graph score. The visualization module 3016 may generate one or more visualizations of graphs selected by the graph selection module 3014. These processes are further described herein.

Figure 31:
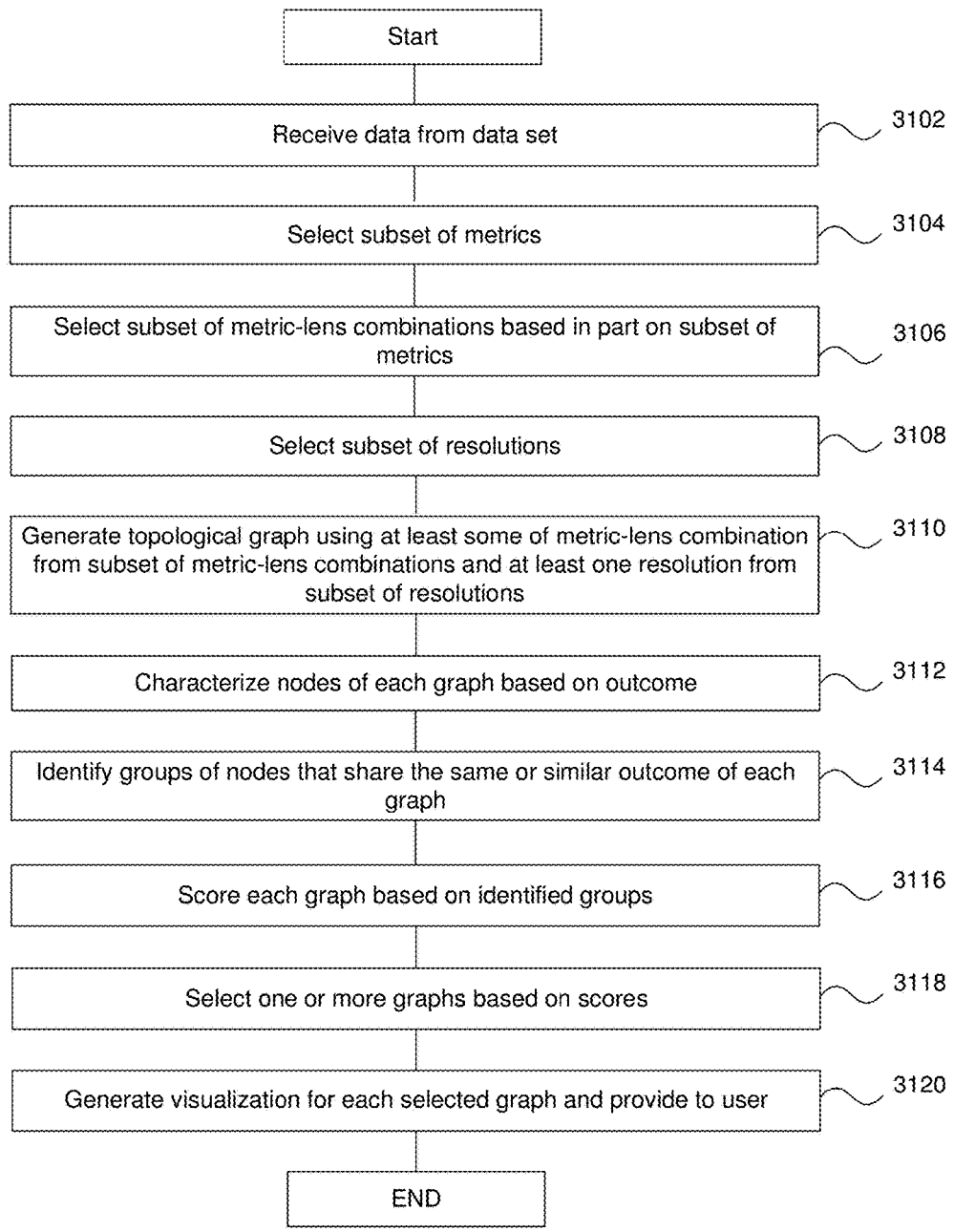
FIG. 31 is a flowchart for outcome auto analysis in some embodiments.

FIG. 31 is a flowchart for outcome auto analysis in some embodiments. In step 3102, the input module 314 may receive data including or from a large data set. Systems and methods described herein may be utilized in big data analysis. Big data is a term that refers to data sets that are large and/or complex such that traditional data processing of the prior art may be inadequate or limited. Massive data sets may include hundreds of thousands, millions, or even billions (or more) data points and/or any number of characteristics per data point. There may be significant hardware, service, and/or financial limitations that must be considered when attempting to analyze large data sets (e.g., up to an including massive data sets as described above). In some embodiments, the data, data set, or both may be large (e.g., massive) data sets.

In various embodiments, the data received in step 3102 may include one or more shared characteristics in columns related to each row or data point. In one example, the one or more shared characteristics may include one or more outcomes. The outcomes may, in some embodiments, be categorical. If the data is medical data, the shared characteristics may include, for example, patient outcomes after treatment(s), services, or the like. Shared characteristics, such as outcomes, may be continuous or discrete. A discrete outcome may individually separate and distinct (e.g., the data may be divided in part on those who survived and those who died). Alternately, the outcomes may be measured as part of a continuum. In some embodiments, the metric selection module 3002 may perform discretization of continuous features of outcomes from one or more outcome columns of the data to generate outcome categories that are discrete.

In various embodiments, the method described herein may search through existing metrics and lenses to produce one or more graphs that separate the outcome groups. The separations may not necessarily be based on geometry. One existing example method includes steps for choosing or selecting one or more metrics, choose or select one or more lenses, and choose or select one or more scale parameters. Those metrics that are chosen or selected may make the outcome (e.g., shared characteristic(s)) column(s) "continuous" with respect to the metric. Those lenses (e.g., metric-lens(es) combination(s)) that are chosen or selected may assist in localizing outcome values. Those scale parameters that are chosen or selected may both localize and separate different outcome values without making too many singeltons (e.g., nodes of a graph of visualization with a single data point as a member or few data points as a member). These processes are further described below.

The data may be related to any science, profession, service, or the like (e.g. the data may be medical data, financial data, scientific data, energy data, or the like).

In step 3104, the metric selection module 3002 selects a subset of metrics. The subset may include any number of metrics from a set of metrics or pseudo-metrics (e.g., does not satisfy the triangle inequality) from a set of metrics. Metrics that are selected may be used with received data to generate "continuous" results with respect to the shared characteristics (e.g., outcome column(s)). For example, points that are similar in the metric may have similar or the same outcome characteristics (e.g., outcome categories).

In various embodiments, the metric selection module 3002 builds neighborhoods for each point. For each point, the metric selection module 3002 may count the number of points whose nearest neighbor has the same shared characteristic category as the particular point to generate a metric score for each metric. Different metric scores may be compared to select those metrics that are "continuous" with respect to the shared characteristics. The process is further described with regard to FIG. 32.

In step 3106, the metric-lens combination selection module 3002 selects a subset of metric-lens(es) combinations based in part on the subset of metrics. In various embodiments, metric-lens(es) combinations may be selected to test (e.g., any number of metric-lens(es) combinations may be tested). The metric-lens combination selection module 3002 may select the metric-lens(es) combinations that localize outcome values (e.g., relative to other metric-lens(es) combinations. The process is further described with regard to FIG. 35.

In step 3108, the lens parameter selection module 3006 may select a resolution. In various embodiments, the lens parameter selection module 3006 chooses resolution and gain. The choice of resolution may depend on the number of points in the space and the number of lenses. The process is further described with regard to FIG. 38.

In step 3110, the processing module 212 generates a topological graph using at least some of the metric-lens(es) combinations from the subset of metric-lens combinations and at least one of the resolutions from subset of resolutions. The process is further described with regard to FIG. 38.

In step 3112, the group identification module 3008 characterizes nodes of each group based on outcome(s) (e.g., shared characteristic(s)). In various embodiments, the group identification module 3008 colors or otherwise denotes each node of the topological graph based on outcome(s) of member points of that node or distribution of outcome(s) of member points of that node. The process is further described with regard to FIG. 38.

In step 3114, the group identification module 3008, the autogroup module 2002, or both identify groups of nodes that share the same or similar outcome of each graph. This process may utilize autogrouping described herein to determine edge weight between nodes, identify a partition that includes groupings of nodes based on distribution of outcome(s) of data points, or both. The process is further described with regard to FIG. 38.

In step 3116, the group score module 3010 scores each graph based on identified groups. In various embodiments, the group score module 3010 may score each group in a graph based on entropy of groups, number of data points, number of nodes in a group, number of outcome categories (e.g., discrete outcome groups of the outcomes identified using the originally received data), or any combination. The graph score module 3012 may generate a graph score for each graph based on the group scores of that graph. These processes are further described with regard to FIG. 38.

In step 3118, the graph selection module 3014 may select one or more graphs based on the graph scores. The graph selection module 3014 may select a graph in any number of ways. For example, the graph selection module 3014 may select one or more graphs based on the highest scores, may select the top graph based on score, may select all graphs with graph scores above a predetermined threshold, may select a predetermined number of graphs in order of the highest score, or may not select any graph below a predetermined threshold. The process is further described with regard to FIG. 38.

In step 3120, the graph visualization module 3016 generates visualizations for each selected graph and provides the visualizations to a user. The graph visualization module 3016 may provide the visualizations in any order including, for example, beginning with a visualization of the graph with the highest graph score. In some embodiments, for each graph, the graph visualization module 3016 displays information related to generating the particular graph, including for example metric information indicating the metric used, metric-lens information indicating the lens(es) used, resolution information indicating the resolution and gain used, graph score, or any combination. The process is further described with regard to FIG. 38.

Figure 32:
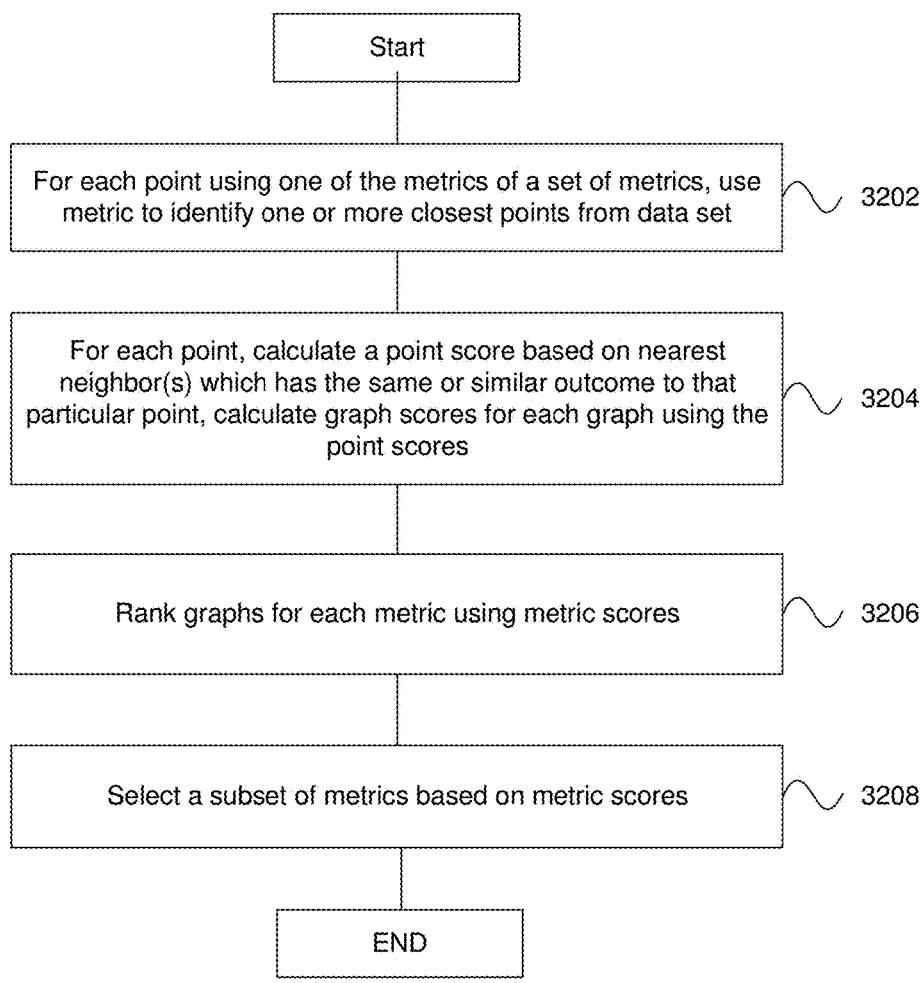
FIG. 32 is a flowchart for selection of a subset of metrics in some embodiments.

FIG. 32 is a flowchart for selection of a subset of metrics in some embodiments. In various embodiments, the metric selection module 3002 may receive or retrieve a set of metrics. The metrics may be of any type. Example metrics include, but are not limited to Variance Normalized Euclidean ("VNE"), Euclidean, Manhattan, Chebyshev, Interquartile Range Normalized Euclidean, Angle, Cosine, Pearson Correlation, Absolute Correlation, or the like. The set of metrics may be a subset of another set of metrics. For example, metrics may be initially chosen based on the type of data received from the original data set. Metrics may be initially chosen in any number of ways or alternately, a set of metrics may be tested as described with regard to FIG. 32 regardless of the underlying data.

In step 3202, for each metric, the metric selection module 3002 uses that particular metric to identify one or more of the closest points for the points in the data set. The metric selection module 3002 may not build a graph. For example, assume metrics VNE, Euclidean, and Manhattan are to be tested using the method described regarding FIG. 32. For each point in the data set, the metric selection module 3002 may identify one or more closest points for each metric. For example, for each point in the data set, the metric selection module 3002 may identify the closest points within the data set using the first metric (e.g., VNE) to create a first metric dataset. The process may be repeated for the other metrics. For example, for each point in the data set, the metric selection module 3002 may identify the closest points within the data set using the second metric (e.g., Euclidean) to create a second metric dataset. As follows, for each point in the data set, the metric selection module 3002 may identify the closest points within the data set using the third (e.g., Manhattan) to create a third metric dataset.

In step 3204, for each point in each graph, the metric selection module 3002 calculates a point score for that graph based on the nearest neighbor to that point which as the same or similar outcome (e.g., same or similar shared characteristic) to that particular point. In some embodiments, for each point in the first graph, the metric selection module 3002 may find the nearest point. If the nearest point shares the same or similar outcome as the particular point, then the metric selection module 3002 may add a value to a point score or otherwise change the value of a point score. If the nearest point does not share the same or similar outcome to the particular point, the metric selection module 3002 may not add a value to a point score, may not change the value of the point score, or change the value of a point score to indicate the dissimilarity in the point score for the graph.

For example, after the metric selection module 3002 generates a graph using data and a first metric, the metric selection module 3002 may select a particular point in the graph. The metric selection module 3002 may then identify the closest point to the particular point in the graph and determine if the two points have the same or similar outcome. If they have the same outcome, the metric selection module 3002 may change the value of the point score for the graph. If they do not have the same outcome, the metric selection module 3002 may not change the value of the point score. The metric selection module 3002 will repeat this process for each point in the graph (e.g., determining that point's nearest neighboring point, determining if the two points have the same or similar outcome, and changing the value of the point score if they have similar values).

The metric selection module 3002 may repeat this process for each graph. It will be appreciated that each graph may be associated with a point score based on the point scores of points and neighboring points in that particular graph. It will be appreciated that the metric selection module 3002 may generate metric scores using nearest neighboring points and shared outcomes in any number of ways.

In some embodiments, for each point of a graph, the metric selection module 3002 may identify any number of nearest neighboring points. The metric selection module 3002 may generate or change the metric score based on the outcomes associated with the nearest neighboring points (e.g., an average outcome of the nearest neighboring points, a majority of the nearest neighboring points, or the like).

In step 3206, the metric selection module 3002 may calculate metric scores for each graph using the point scores. In some embodiments, the metric scores are calculated when a point score is changed, a point score is added to the metric score, or a point score is subtracted from the metric score in step 3204. The point score for any number of points may change the metric score in any number of ways. The point score may be the metric score.

In step 3208, the metric selection module 3002 may optionally rank or compare each graph for each metric using the metric scores. For example, each graph may be associated with a different metric score and the graphs may be ordered or ranked from highest metric score to lowest metric score.

In step 3210, the metric selection module 3002 selects one or more metrics using the metric scores. For example, the metric selection module 3002 may identify the graph associated with a metric as having the highest metric score and the metric selection module 3002 may select the associated metric as a member of the selected subset of metrics. The metric selection module 3002 may select a percentage of the metric scores indicating consistent more outcomes of neighboring points (e.g., the metric selection module 3002 may select metrics based on the top 20% of metric scores) or a predetermined number of metrics using the metric scores (e.g., the metric selection module 3002 selects four metrics associated with the top four graphs based on highest metric scores). It will be appreciated that the metric selection module 3002 may select metrics using the metric scores in any number of ways.

Figure 33A:
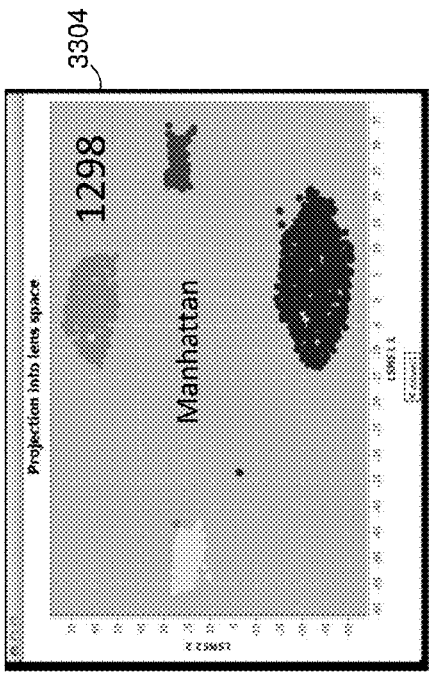
FIG. 33A depicts groupings of data points with fairly consistent outcomes.
Figure 33B:
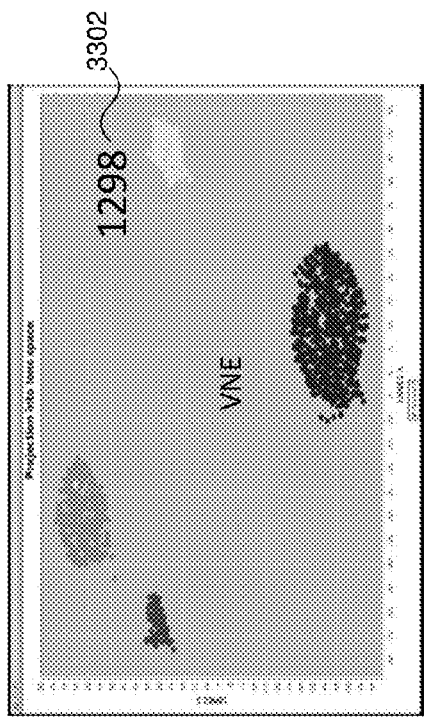
FIG. 33B depicts an example graph using a Manhattan metric. Like FIG. 33A.
Figure 33C:
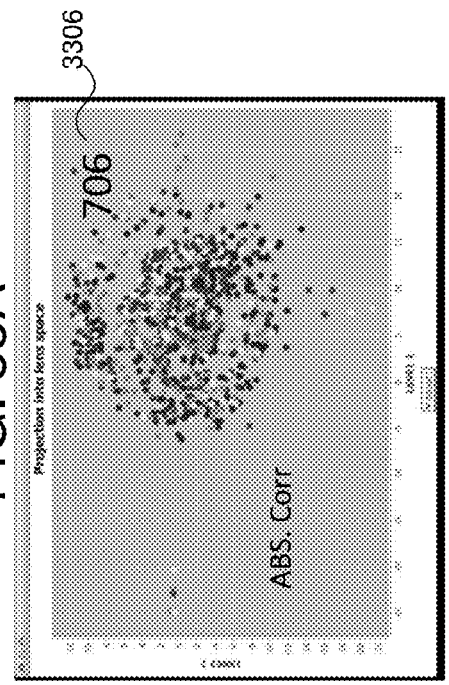
FIG. 33C depicts an example graph using an Absolute Correlation metric.

FIGS. 33A-33C depict example graphs including the same data points from Gaussian data and different metrics. Although only metrics for VNE, Manhattan, and Absolute Correlation are shown, it will be appreciated that any number of different metrics may be used to generate graphs to test the metrics. FIG. 33A depicts an example graph using a VNE metric. Each data point may be colored or otherwise associated with an outcome (e.g., from an outcome column of the data). FIG. 33A depicts groupings of data points with fairly consistent outcomes. This may represent a desirable graph. Metric score 3302 is high compared to the metric score 3306 of FIG. 33C. The metric score 3302 may be based on point scores for each point in the graph (e.g., each point in the graph contributing a point score to the metric score 3302 if the nearest neighbor to that point shares the same or similar outcome).

FIG. 33B depicts an example graph using a Manhattan metric. Like FIG. 33A, FIG. 33B depicts groupings of data points with fairly consistent outcomes. This may also represent a desirable graph. Metric score 3304 is the same as metric score 3302 of FIG. 33A but is also high compared to the metric score 3306 of FIG. 33C.

FIG. 33C depicts an example graph using an Absolute Correlation metric. FIG. 33C depicts one large group with different outcomes that are intermixed. The metric score 3306 is low compared to metric scores 3302 and 3304.

In some embodiments, based on the graphs FIG. 33A-C, the metric scores 3302, 3304, and 3306, or both, the metric selection module 3002 may select metrics VNE and Manhattan for the subset of metrics. The metric selection module 3002 may not select the Absolute Correlation for the subset of metrics because the points, colored or otherwise identified by outcome, are intermixed (e.g., relative to other graphs).

Figure 34A:
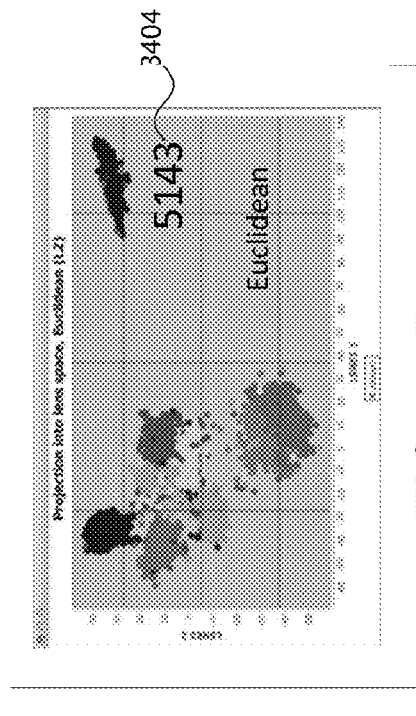
FIG. 34A depicts groupings of data points with fairly consistent outcomes although there are some relatively minor intermixed data.
Figure 34B:
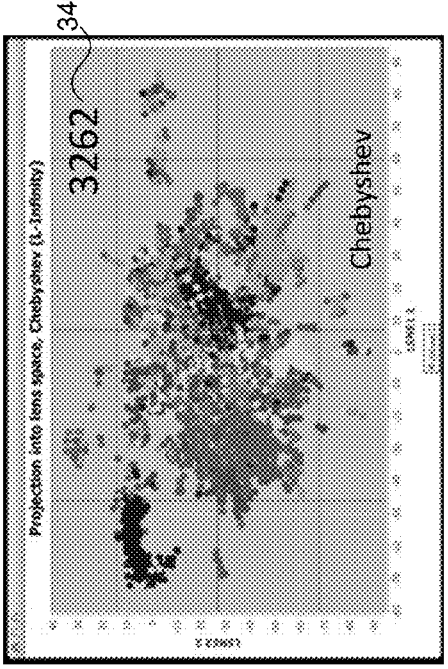
FIG. 34B depicts an example graph using a Euclidean metric.
Figure 34C:
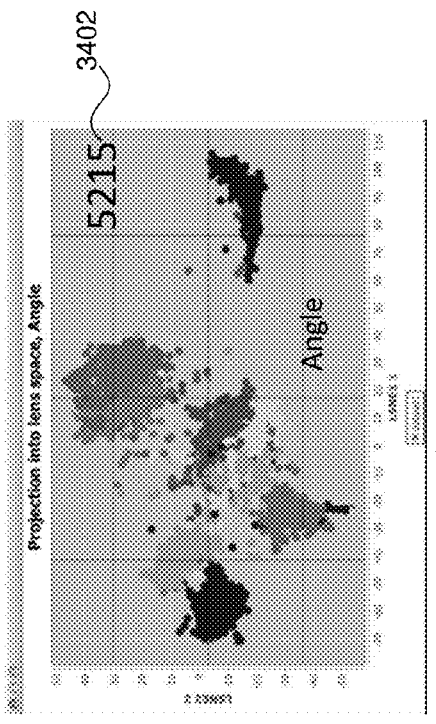
FIG. 34C depicts an example graph using a Norm. Correlation metric.

FIGS. 34A-34C depict example graphs including the same data points from MNIST data and different metrics. FIG. 34A depicts an example graph using an Angle metric. Each data point may be colored or otherwise associated with an outcome (e.g., from an outcome column of the data). FIG. 34A depicts groupings of data points with fairly consistent outcomes although there are some relatively minor intermixed data. This may represent a desirable graph. Metric score 3402 is high compared to the metric score 3406 of FIG. 34C and metric score 3408 of FIG. 34D. The metric score 3402 may be based on point scores for each point in the graph (e.g., each point in the graph contributing a point score to the metric score 3402 if the nearest neighbor to that point shares the same or similar outcome).

FIG. 34B depicts an example graph using a Euclidean metric. Like FIG. 34A, FIG. 34B depicts groupings of data points with fairly consistent outcomes with some intermixing. This may also represent a desirable graph. Metric score 3404 is similar albeit a little lower than metric score 3402 of FIG. 34A but is also high compared to the metric score 3406 of FIG. 34C and metric score 3408 of FIG. 34D.

FIG. 34C depicts an example graph using a Norm. Correlation metric. FIG. 34C depicts a generally large shape but with somewhat consistent groupings of nodes that share outcomes. There are more intermixed nodes with different outcomes when compared to FIGS. 34A and 34B, however the metric score 3406 is still reasonably close to metric score 3402 of FIG. 34A and metric score 3404 of FIG. 34B. The metric score 3406 is high compared to metric score 3408 of FIG. 34D.

Figure 34D:
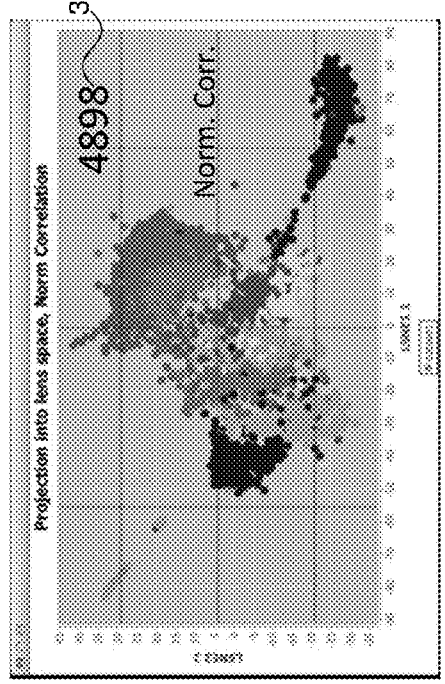
FIG. 34D depicts an example graph using an Chebyshev metric.

FIG. 34D depicts an example graph using a Chebyshev metric. FIG. 34D depicts a fairly large group with different outcomes that are more intermixed. The metric score 3408 is low compared to metric scores 3302 of FIG. 34A, metric score 3304 of FIG. 34B, and metric score 3306 of FIG. 34C.

In some embodiments, based on the graphs depicted in FIGS. 34A-34D, the metric scores 3402, 3404, 3406, and 3408, or both, the metric selection module 3002 may select metrics Angle, Euclidean, and potentially Norm. Correlation. In some embodiments, the metric selection module 3002 may be configured to only select the top 2 metrics or any limited number of metrics. In that case, the metric selection module 3002 may only select the Angle metric and the Euclidean metric. The metric selection module 3002 may not select the Chebyshev metric for the subset of metrics because the points, colored or otherwise identified by outcome, are intermixed (e.g., relative to other graphs).

Figure 35:
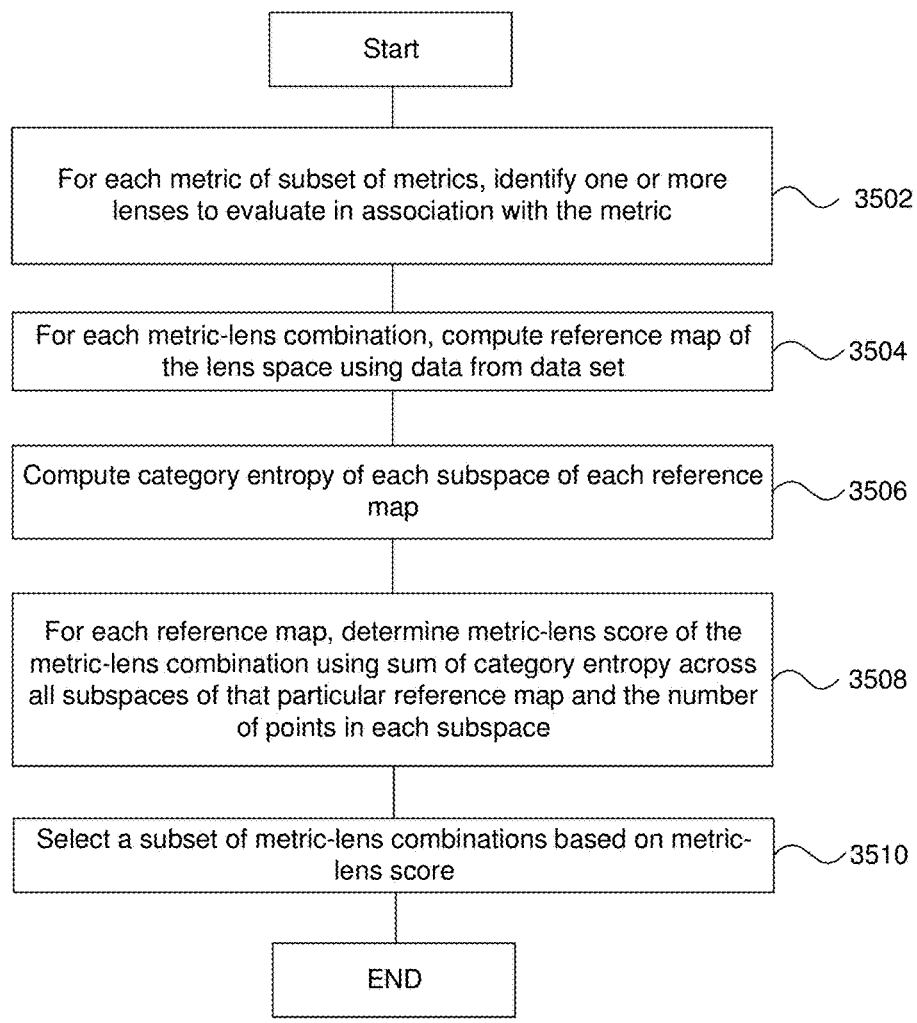
FIG. 35 is a flowchart of selection of a subset of metric-lens combinations in some embodiments.

FIG. 35 is a flowchart of selection of a subset of metric-lens combinations in some embodiments. In various embodiments, the metric-lens combination selection module 3004 identifies one or more potential lenses for each metric of the subset of metrics for testing. The metric-lens combination selection module 3004 may also test and score each metric in combination with one or more lenses to evaluate a metric-lens combination. It will be appreciated that the metric-lens combination selection module 3004 may select any different combination of metric and lens(es). For example, the metric-lens combination selection module 3004 may identify the same metric but with different lens combinations for testing.

In step 3502, for each metric of the subset of metrics, the metric-lens combination selection module 3004 identifies one or more lenses to evaluate in association with the metric. In various embodiments, the metric-lens combination selection module 3004 may identify any number of lenses that may be associated with a metric of the subset of metrics. It will be appreciated that some metric-lens combinations may not function or otherwise may not be desirable without further assessment. The metric-lens combination selection module 3004 may filter known nonfunctional or undesirable lenses before selecting metric-lens combinations. In some embodiments, the metric-lens combination selection module 3004 may combine known functional metric-lens combinations or potentially desirable metric-lens(es) combination for further evaluation. The metric-lens combination selection module 3004 may generate a set of metric-lens combinations.

In various embodiments, the metric-lens combination selection module 3004 may receive one or more lenses to combine with a metric and include in the subset of metric-lens combinations. For example, a user may input a preferred or desired lens to test with a metric of the subset of metrics. The metric-lens combination selection module 3004 may evaluate the provided lens in conjunction with one or more metrics or, alternately, the metric-lens combination selection module 3004 may include the provided lens in the subset of metric-lens combination.

In step 3504, for each metric-lens(es) combination, the metric-lens combination selection module 3004 computes a reference map of the lens space using data from the originally received data set (e.g., all or part of the data received in step 3102 of FIG. 31). The reference map is generated using both the metric and lens(es) of the metric-lens(es) combination. In various embodiments, the metric-lens combination selection module 3004 generates a separate reference map for each metric-lens(es) combination.

In step 3506, the metric-lens combination selection module 3004 computes category entropy for each subspace of each graph (e.g., each reference map). Category entropy may be, for example, entropy of outcome(s) (e.g., entropy of shared characteristic(s)). In various embodiments, the metric-lens combination selection module 3004 may divide a graph into subspaces. For example, the metric-lens combination selection module 3004 may divide the graph into subspaces of equal or variable size with each subspace being adjacent to other subspaces. In some embodiments, the metric-lens combination selection module 3004 may divide groupings of data points into separate subspaces. The metric-lens combination selection module 3004 may compute entropy for one or more subspaces based on shared characteristic(s) such as outcome(s) of the data points in the subspace(s).

In step 3508, the metric-lens combination selection module 3004 computes a metric-lens score of the metric-lens(es) combination by adding category entropy across all subspaces of a graph (e.g., a reference map). The metric-lens combination selection module 3004 may also compute the metric-lens score based, at least in part, on the number of points within each subspace. The metric-lens combination selection module 3004 may generate a metric-lens score for each reference map generated in step 3504. For example, for each graph, the metric-lens combination selection module 3004 may generate a metric-lens score based on the category entropy across any number of subspaces of that particular graph and based on the number of points within any number of subspaces. The metric-lens combination selection module 3004 may optionally rank (e.g., order) the graphs based on metric lens scores (e.g., from highest to lowest or in any other method).

In step 3510, the metric-lens combination selection module 3004 selects a subset of metric-lens(es) combinations based on the metric lens score. In various embodiments, the metric-lens combination selection module 3004 may be configured to choose a predetermined number of metric-lens(es) combinations, choose metric-lens(es) combinations with a metric-lens score that meet a certain criteria (e.g., choose metric-lens(es) combinations with a metric-lens score over a predetermined threshold), choose metric-lens(es) that are in a top predetermined percentage, or any other method.

Figure 36B:
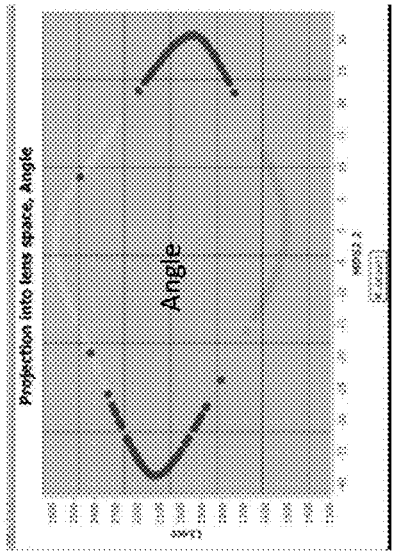
FIG. 36B depicts an example graph using an angle metric and MDS Coord. 2 lens.
Figure 36A:
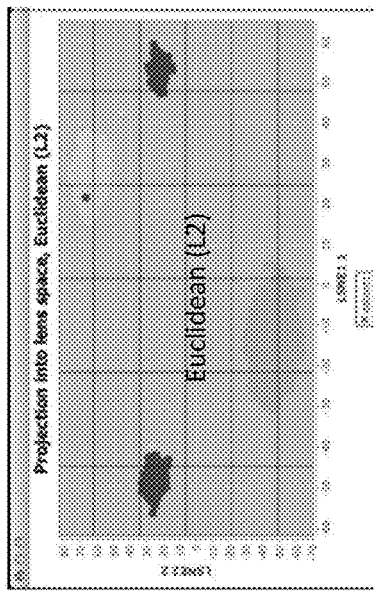
FIG. 36A depicts an example graph using a Euclidean (L2) metric with a neighborhood lens.
Figure 36C:
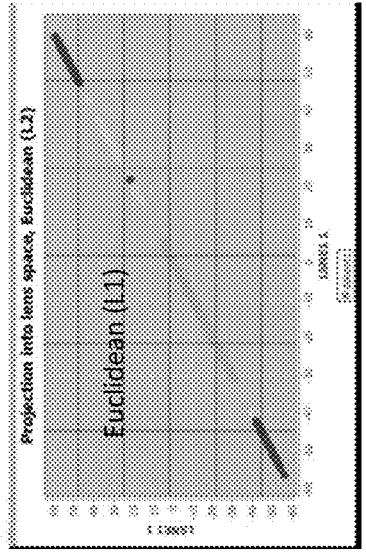
FIG. 36C depicts an example graph using a Euclidean (L1) using a neighborhood lens.

FIGS. 36A-36C depict example graphs including the same data points from Gaussian data and different metric-lens(es) combination. Although metrics for Euclidean (L2), Angle, and Manhattan (L1) are shown, it will be appreciated that any number of different metric-lens(es) combinations may be used to generate graphs to test the metric-lens(es) combinations. For example, Euclidean (L2) and neighborhood lens (e.g., neighborhood lens 1, neighborhood lens 2, or both) may be used. In another example, Chevyshev (L-Infinity) and neighborhood lens 1, neighborhood lens 2, multidimensional scaling (MDS) coordinates 1, MDS coordinates 2, metric Principal Component Analysis (PCA) coordinates 1, metric PCA coordinates 2, or any combination may be used. In a further example, variance normalized Euclidean metric and neighborhood lens (e.g., neighborhood lens 1, neighborhood lens 2, or both) may be used. Other examples include a cosine metric with PCA coord. 1, PCA coord. 2, L1 Centrality, Gaussian density, MDS coord. 1, MDS coord. 2, or any combination. Any other metric, lens(es), or combination may be used.

FIG. 36A depicts an example graph using a Euclidean (L2) metric with a neighborhood lens. Each data point may be colored or otherwise associated with an outcome (e.g., from an outcome column of the data). FIG. 36A depicts groupings of data points with fairly consistent outcomes with limited entropy. This may represent a desirable graph with a higher metric-lens score when compared to metric-lens scores associated with graphs of FIGS. 36B and 36C.

FIG. 36B depicts an example graph using an angle metric and MDS Coord. 2 lens. FIG. 36B has greater entropy for the graph (e.g., when entropy is added across subspaces of the graph), the entropy for the graph in FIG. 36B may be greater than the entropy for the graph of FIG. 36A.

FIG. 36C depicts an example graph using a Euclidean (L1) using a neighborhood lens. FIG. 36C depicts a line with that may have lower entropy when compared to the entropy of FIG. 36B.

In some embodiments, based on the graphs FIGS. 36A-36C, the metric-lens scores of the graphs, or both, the metric-lens combination selection module 3004 may select the Euclidean (L2) and neighborhood lens for the subset of metric-lens(es). The metric-lens combination selection module 3004 may select the Euclidean (L1) and neighborhood lens for the subset of metric-lens(es) as well. The metric-lens combination selection module 3004 may not select the Angle metric with the MDS Coor. 2 lens based on a comparison of the entropy of the graph to entropy of graphs depicted in FIGS. 36A and 36B.

Figure 37A:
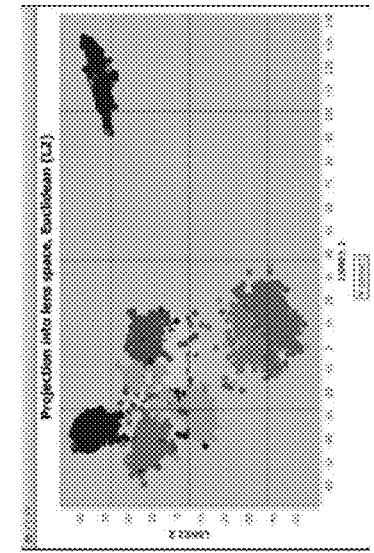
FIG. 37A depicts groupings of data points with some mixed outcomes.
Figure 37B:
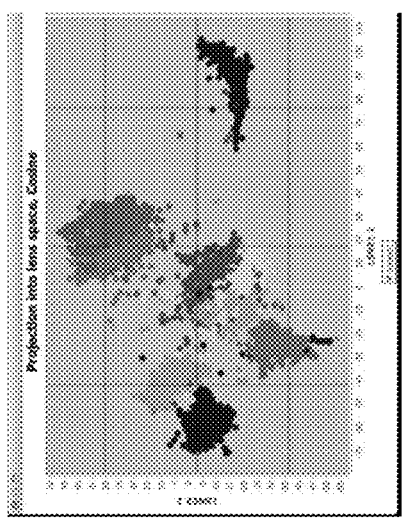
FIG. 37B depicts an example graph using a Euclidean metric and neighborhood lens.
Figure 37C:
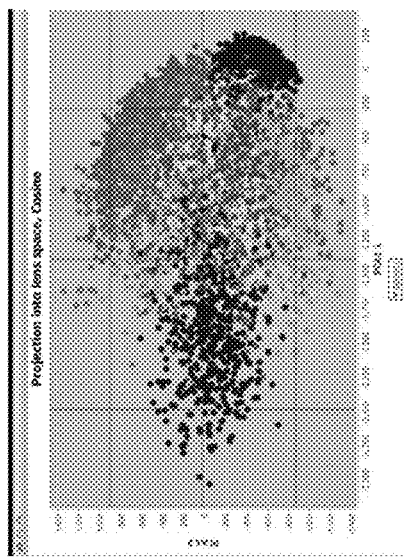
FIG. 37C depicts an example graph using a Cosine using a PCA lens.

FIGS. 37A-37C depict example graphs including the same data points from MNIST data and different metric-lens(es) combinations. FIG. 37A depicts an example graph using a Cosine metric and neighborhood lens. Each data point may be colored or otherwise associated with an outcome (e.g., from an outcome column of the data). FIG. 37A depicts groupings of data points with some mixed outcomes. The entropy associated with the graph in FIG. 37A, and therefore the metric-lens score associated with the graph, may be lower than the entropy and/or metric-lens scores of the graphs depicted in FIGS. 37B and 37C.

FIG. 37B depicts an example graph using a Euclidean metric and neighborhood lens. FIG. 37B is similar to that in FIG. 37A and may have similar or greater entropy for the graph (e.g., when entropy is added across subspaces of the graph) than the entropy for the graph of FIG. 37A.

FIG. 37C depicts an example graph using a Cosine using a PCA lens. FIG. 37C depicts a mixture of outcomes and a higher entropy when compared to the entropy of FIGS. 37A and 37B.

In some embodiments, based on the graphs FIG. 37A-C, the metric-lens scores of the graphs, or both, the metric-lens combination selection module 3004 may select the Cosine and neighborhood lens for the subset of metric-lens(es). The metric-lens combination selection module 3004 may select the Euclidean (L1) and neighborhood lens for the subset of metric-lens(es) as well. The metric-lens combination selection module 3004 may not select the Cosine with the PCA lens based on a comparison of the entropy of the graph to entropy of graphs depicted in FIGS. 37A and 37B.

Figure 38:
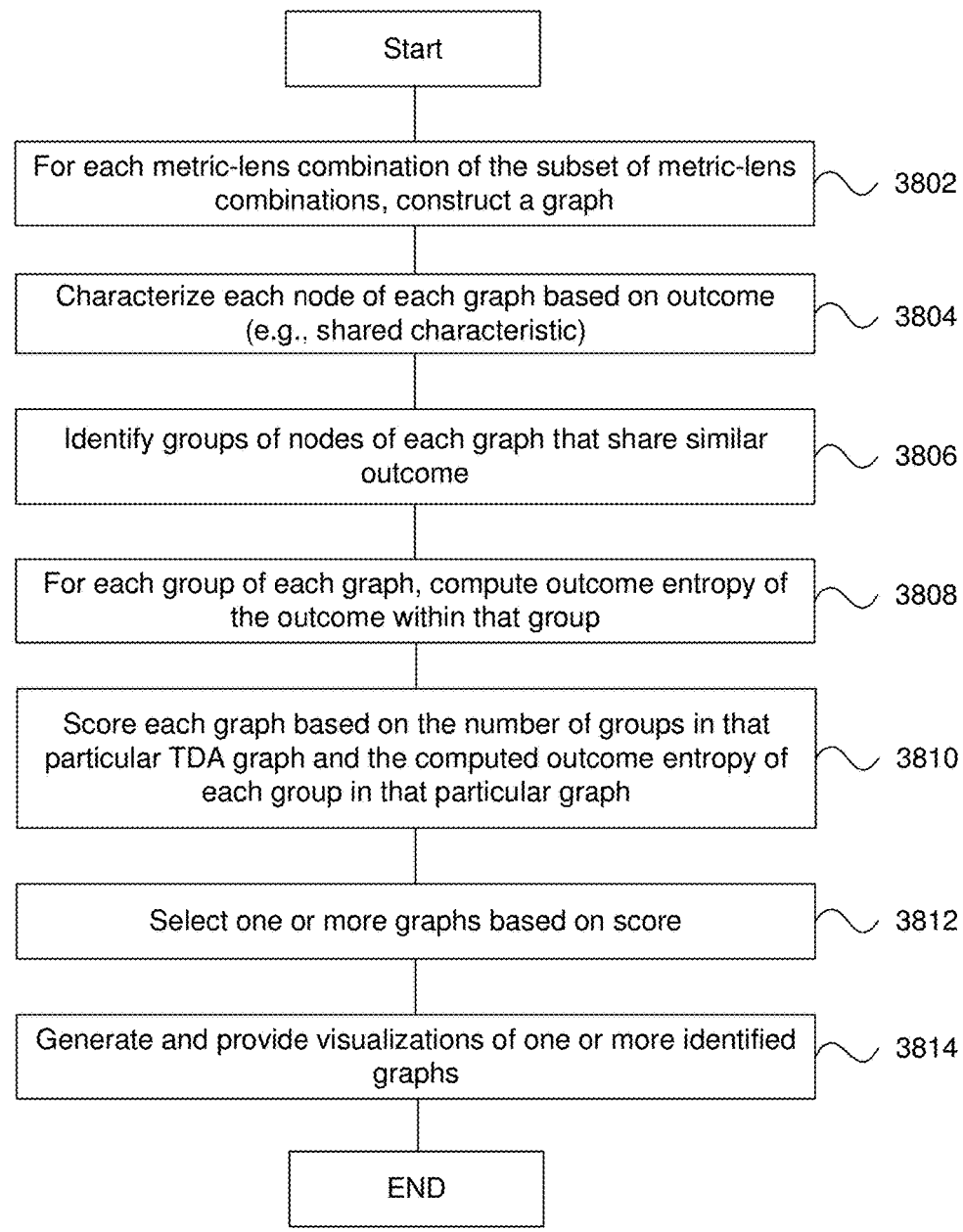
FIG. 38 is a flowchart for identifying one or more graphs based on a graph score using the metric-lens combinations of the subset of metric-lens combinations.

FIG. 38 is a flowchart for identifying one or more graphs based on a graph score using the metric-lens combinations of the subset of metric-lens combinations. In step 3802, for each metric-lens(es) combination of the subset of metric-lens combinations, the lens parameter selection module 3006 or the processing module 312 constructs a TDA graph. The graph may not be visualized in some embodiments. In various embodiments, the lens parameter selection module 3006 selects a subset of resolutions to be used for TDA generation.

The lens parameter selection module 3006 choice of resolution may depend on the number of points in the space (here denoted by N) and the number of lenses (here denoted by Ln in the metric-lens(es) combination). Since resolutions may be multiplicative with the lenses (that is, if there are two lenses with resolution 10, there may be 100 buckets), the per-lens resolutions may be adjusted by taking the Ln-th root in some embodiments.

In some embodiments, different lens parameters are given by this formulas:
For gain evaluate {2., 3., 4.}
For resolution, evaluate for each j in [0, NUM_RES−1] (where NUM_RES is the number of resolutions to be considered).

res=Math.pow((Math.pow(Math.max(gain*N/(Ln*100.0),10),Ln)+Math.pow((Math.sqrt(N)/4.0)*j,Ln)),1/(double)Ln)

This equation may be written as:

$$res = \left(\left[\max\left(\frac{gain*N}{L_n*100}, 10\right)\right]^{L_n} + \left(\frac{\sqrt{N}}{4}*j\right)^{L_n}\right)^{\frac{1}{L_n}}$$

The last resolution value (starting with 0) may be recalled and if res is not at least three greater than the last one resolution, the res may be skipped. In some embodiments, NUM_RES=20 is enough values to effectively investigate each metric-lens(es) combination. The number of parameter combinations for a metric-lens(es) combination may be denoted by PCML. For example, this may be 20*3*2 (uniformized and not). In some embodiments, the formula covers a range of possible gains. It will be appreciated that are many other possible ways of finding and selecting resolutions.

In constructing the TDA graph, as discussed regarding FIG. 3, the input module 314 may receive the original data receives data S. The input module 314 may generate reference space R using metric-lens(es) combination of the subset of metric-lens combinations. The analysis module 320 may generates a map ref( ) from S into R. The map ref( ) from S into R may be called the "reference map." In one example, a reference of map from S is to a reference metric space R. The map can be described by one or more lenses (i.e., real valued functions on S). The resolution module 218 generates a cover of R based on the resolution from the lens parameter selection module 3006. The cover of R may be a finite collection of open sets (in the metric of R) such that every point in R lies in at least one of these sets. In various examples, R is k-dimensional Euclidean space, where k is the number of filter functions. In this example, R is a box in k-dimensional Euclidean space given by the product of the intervals [min_k, max_k], where min_k is the minimum value of the k-th filter function on S, and max_k is the maximum value.

The analysis module 320 may cluster each S(d) based on the metric, filter, and the space S. In some embodiments, a dynamic single-linkage clustering algorithm may be used to partition S(d). It will be appreciated that any number of clustering algorithms may be used with embodiments discussed herein. For example, the clustering scheme may be k-means clustering for some k, single linkage clustering, average linkage clustering, or any method specified by the user.

The visualization engine 322 may identify nodes which are associated with a subset of the partition elements of all of the S(d) for generating an interactive visualization. For example, suppose that S={1, 2, 3, 4}, and the cover is C1, C2, C3. Then if ref_tags(1)={1, 2, 3} and ref_tags(2)={2, 3}, and ref_tags(3)={3}, and finally ref_tags(4)={1, 3}, then S(1) in this example is {1, 4}, S(2)={1,2}, and S(3)={1, 2, 3, 4}. If 1 and 2 are close enough to be clustered, and 3 and 4 are, but nothing else, then the clustering for S(1) may be {1} {3}, and for S(2) it may be {1,2}, and for S(3) it may be {1,2}, {3,4}. So the generated graph has, in this example, at most four nodes, given by the sets {1}, {4}, {1,2}, and {3,4} (note that {1,2} appears in two different clusterings). Of the sets of points that are used, two nodes intersect provided that the associated node sets have a non-empty intersection (although this could easily be modified to allow users to require that the intersection is "large enough" either in absolute or relative terms).

Nodes may be eliminated for any number of reasons. For example, a node may be eliminated as having too few points and/or not being connected to anything else. In some embodiments, the criteria for the elimination of nodes (if any) may be under user control or have application-specific requirements imposed on it. For example, if the points are consumers, for instance, clusters with too few people in area codes served by a company could be eliminated. If a cluster was found with "enough" customers, however, this might indicate that expansion into area codes of the other consumers in the cluster could be warranted.

The visualization engine 322 may join clusters to identify edges (e.g., connecting lines between nodes). Once the nodes are constructed, the intersections (e.g., edges) may be computed "all at once," by computing, for each point, the set of node sets (not ref_tags, this time). That is, for each s in S, node_id_set(s) may be computed, which is an int[ ]. In some embodiments, if the cover is well behaved, then this operation is linear in the size of the set S, and we then iterate over each pair in node_id_set(s). There may be an edge between two node_id's if they both belong to the same node_id_set( ) value, and the number of points in the intersection is precisely the number of different node_id_sets in which that pair is seen. This means that, except for the clustering step (which is often quadratic in the size of the sets S(d), but whose size may be controlled by the choice of cover), all of the other steps in the graph construction algorithm may be linear in the size of S, and may be computed quite efficiently.

In step 3804, the group identification module 3008 may identify groups of nodes of each TDA graph that share a similar outcome (e.g., share a shared characteristic). In some embodiments, the nodes may be colored or otherwise noted as belonging to or associated with one or more outcomes. As discussed herein, the outcomes may be identified in one or more columns in data S. Each node may be associated with one or more outcomes in any number of ways.

In some embodiments, if all data points belonging to a node share the same or similar outcome, the node may be colored or otherwise noted as belonging or being associated with that same or similar outcome. In some embodiments, the group identification module 3008 may determine that if there are a majority of data points of a node (e.g., or an average, median, or mean), then the node will be colored or otherwise noted as belonging or being associated with that same or similar outcome.

Groups of nodes include nodes that share the same or similar outcomes (or groups of similar distributions of outcomes). Groups of nodes that share the same or similar outcomes may be found in any number of ways. In some embodiments, the groups of nodes may be identified using autogrouping as discussed in FIG. 22.

In some embodiments, autogrouping may be utilized on a weighted graph. In this example, the set that will be autogrouped is the set of nodes of a weighted graph G. In some embodiments, the autogroup module 2002 partitions the graph into groups of nodes that are strongly-connected in the graph. An unweighted graph may be transformed into a weighted graph if there is a function f on the nodes of the graph. The weight for an edge (a,b) between two nodes a and b in the graph G may be defined to be the difference between the function values: wt(a,b)=|f(a)−f(b)|. In some embodiments, this graph may be a visualization generated from a data set and the function on the nodes may be given by a color scheme on the nodes. In one example, the autogroup module 2002 may determine the weight for any number of edges in a graph using the distribution of same or similar outcomes (e.g., shared characteristics) within each node. The autogrouping process of determining a partition that identifies groups of nodes that share similar outcomes of data point members is described with respect to FIG. 23 herein. The group identification module 3008 may provide the identified and/or generated autogrouped partition in a report and/or identify the autogrouped partition in data or a graph.

For each group of each TDA graph, the group score module 3010 computes the outcome entropy of the outcome within that group. In various embodiments, each graph may comprise any number of groups of nodes with shared similar or same outcomes. Each group may also be associated with an outcome entropy computed by the group score module 3010.

In step 3812, the graph score module 3012 scores each TDA graph based on the number of groups int hat particular TDA graph and the computed outcome entropy of each group in that particular TDA graph. In one example, the graph score module 3012 calculates the TDA graph score using the following:

$$\left(\sum_{groups\ g} entropy(g) * \#pts(g) + \frac{N}{50 * \#pts(g)}\right) *$$

$$\left\{ \text{if } \#groups < \#cat, \text{ then } \frac{\#cats}{\#groups}, \text{ else } 1 \right.$$

Groups g represent the number of groups in a particular TDA graph. Entropy (g) is the entropy for the group (g) in that particular TDA graph which is multiplied by the number of points in the group (g). The number of nodes divided by a constant (e.g., 50) multiplied by the number of points in the group is added. It will be appreciated that any constant may be used (e.g., between 10 and 90). The score may be multiplied by the number of outcome categories over the number of groups if the number of groups is less than the number of outcome categories (to penalize the TDA graph score) or multiply by one, otherwise. It will be appreciated that each graph may be associated with a TDA graph score.

In various embodiments, the graph selection module 3014 may optionally rank or order all or some of the graphs using the TDA graph score.

In some embodiments, the graph selection module 3014 may select one or more of the graphs, metrics, metric-lens(es) combinations, resolutions, or any combination using the TDA graph score. For example, the graph selection module 3014 may select a predetermined number of TDA graphs, select TDA graphs with a TDA graph score that meet a certain criteria (e.g., choose TDA graphs with a TDA graph score over a predetermined threshold), select TDA graphs that are in a top predetermined percentage, or any other method.

In various embodiments, the outcome visualization module 3016 may generate visualizations of one or more selected TDA graphs (e.g., graphs selected by the graph selection module 3014).

For example, the outcome visualization module 3016 may generate visualizations of one or more selected TDA graphs including visualizations of graphs depicted in FIGS. 39A-39D and FIGS. 40A-40D.

Figure 39A:
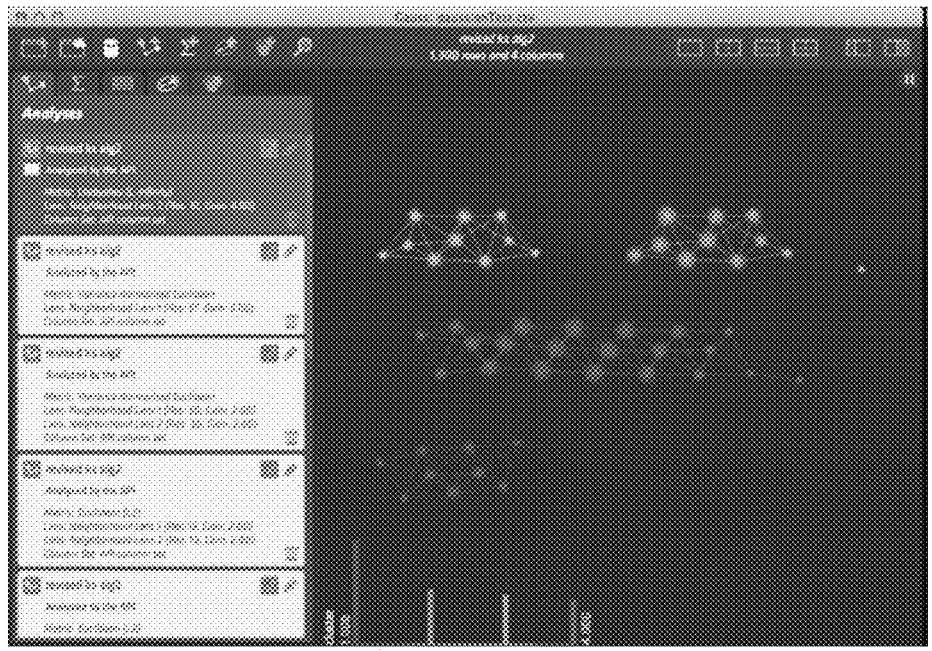
FIG. 39A depicts a visualization of a graph using a Chebyshev (L-Infinity) metric and a neighborhood lens 2 (resolution 61, gain of 4.0).
Figure 39B:
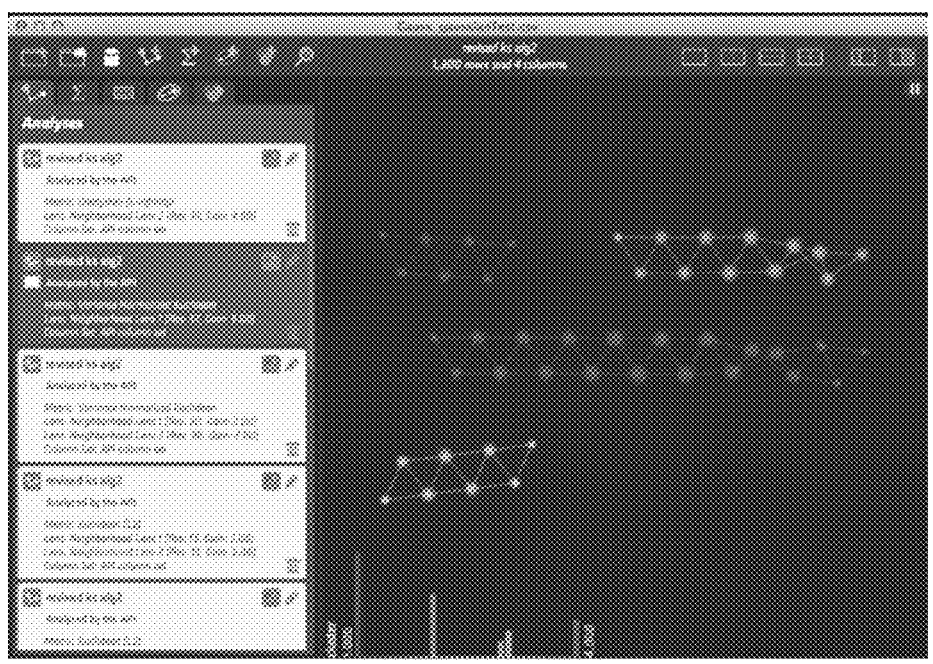
FIG. 39B depicts a visualization of a graph using a variance normalized Euclidean metric and a neighborhood lens 1 (resolution 57, gain of 3.0).
Figure 39C:
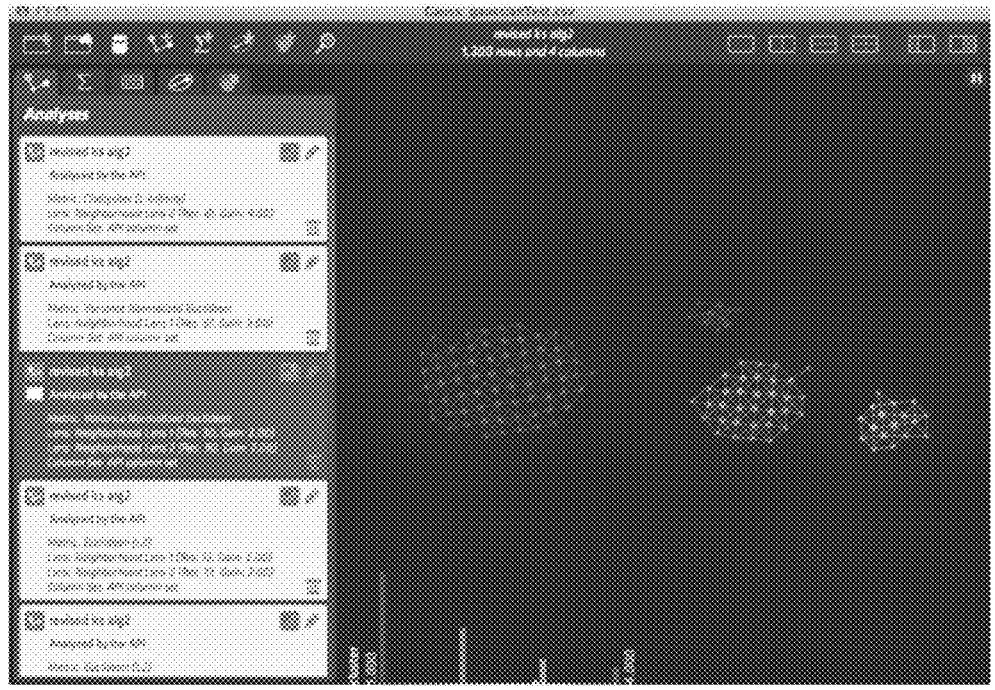
FIG. 39C depicts a visualization of a graph using a variance normalized Euclidean metric and a neighborhood lenses 1 and 2 (resolution 30, gain of 2.0).

FIGS. 39A-39D depict visualizations of selected TDA graphs of Gaussian data. FIG. 39A may depict a visualization of a graph that is most preferable when compared to others, FIG. 39B may depict a visualization of a graph that is the next most preferable when compared to FIGS. 39C and 39D. FIG. 39C may depict a visualization of a graph that is preferable over that of FIG. 39D, however all graphs may contain interesting information having been selected over other metrics, metric-lens(es) combinations, and TDA graphs.

FIG. 39A depicts a visualization of a graph using a Chebyshev (L-Infinity) metric and a neighborhood lens 2 (resolution 61, gain of 4.0). As can be shown, the groupings of nodes in the visualization are grouped by outcome and the groupings show consistent outcomes.

FIG. 39B depicts a visualization of a graph using a variance normalized Euclidean metric and a neighborhood lens 1 (resolution 57, gain of 3.0). This visualization is similar to FIG. 39A. The groupings of nodes in the visualization are grouped by outcome and the groupings show consistent outcomes.

FIG. 39C depicts a visualization of a graph using a variance normalized Euclidean metric and a neighborhood lenses 1 and 2 (resolution 30, gain of 2.0). The groupings of nodes in the visualization are grouped by outcome and the groupings shown consistent outcomes.

Figure 39D:
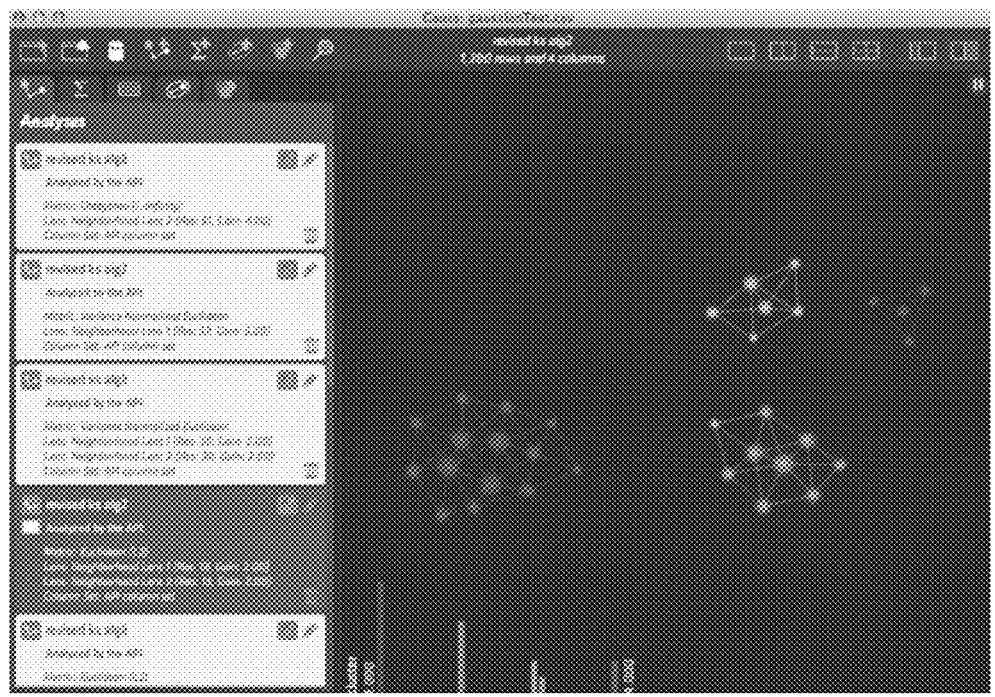
FIG. 39D depicts a visualization of a graph using a Euclidean (L2) metric and a neighborhood lenses 1 and 2 (resolution 13, gain of 2.0).

FIG. 39D depicts a visualization of a graph using a Euclidean (L2) metric and a neighborhood lenses 1 and 2 (resolution 13, gain of 2.0). The groupings of nodes in the visualization are grouped by outcome and the groupings also show consistent outcomes.

Figure 40A:
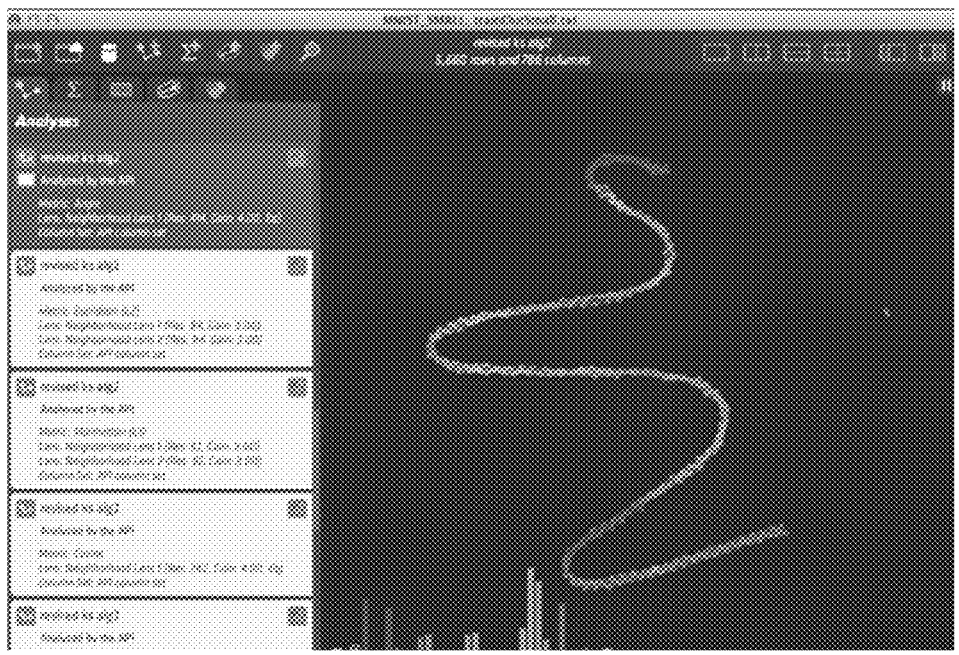
FIG. 40A depicts a visualization of a graph using an Angle metric and a neighborhood lens 1 (resolution 414, gain of 4.0).
Figure 40B:
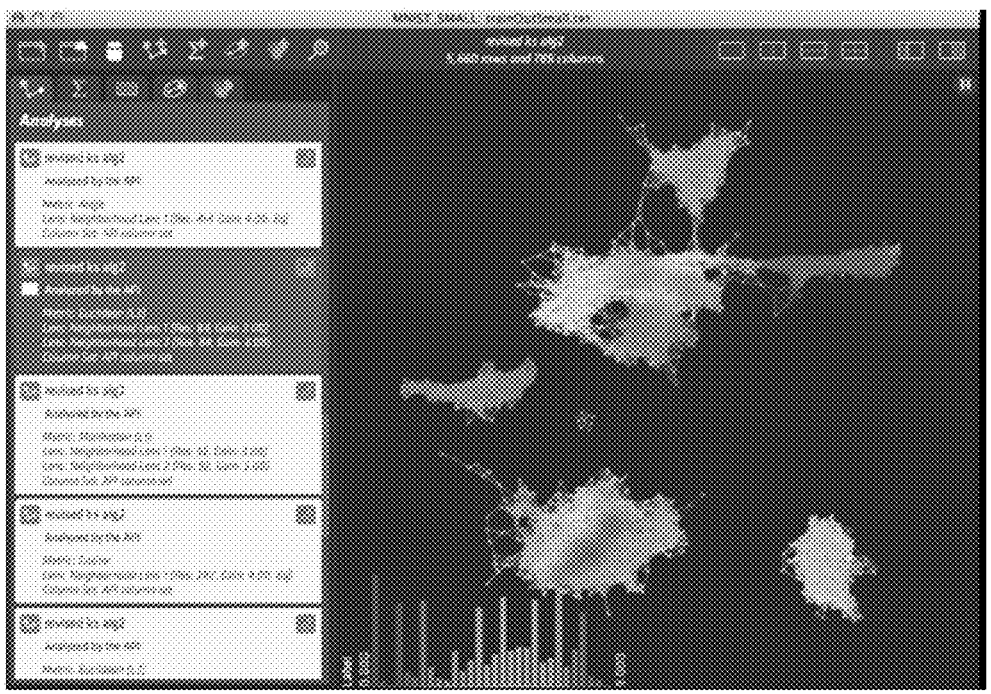
FIG. 40B depicts a visualization of a graph using a Euclidean (L2) metric and neighborhood lenses 1 and 2 (resolution 84, gain of 3.0).
Figure 40C:
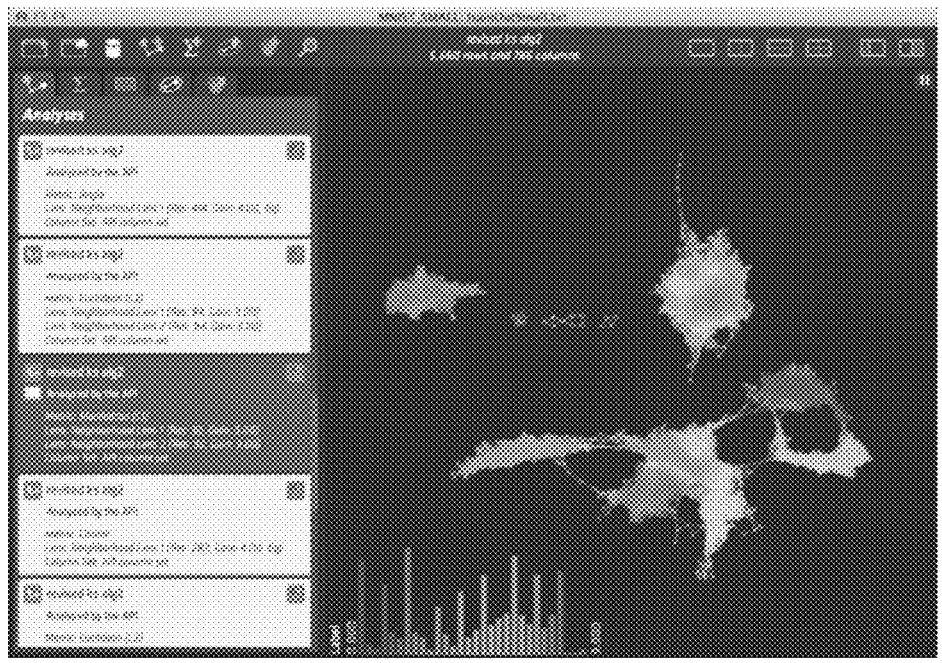
FIG. 40C depicts a visualization of a graph using a Manhattan (L1) metric and neighborhood lenses 1 and 2 (resolution 92, gain of 3.0).

FIGS. 40A-40D depict visualizations of selected TDA graphs of MNIST data. FIG. 40A may depict a visualization of a graph that is most preferable when compared to others, FIG. 40B may depict a visualization of a graph that is the next most preferable when compared to FIGS. 40C and 40D. FIG. 40C may depict a visualization of a graph that is preferable over that of FIG. 40D, however all graphs may contain interesting information having been selected over other metrics, metric-lens(es) combinations, and TDA graphs.

FIG. 40A depicts a visualization of a graph using an Angle metric and a neighborhood lens 1 (resolution 414, gain of 4.0). As can be shown, the groupings of nodes in the visualization are grouped by outcome and the groupings show consistent outcomes.

FIG. 40B depicts a visualization of a graph using a Euclidean (L2) metric and neighborhood lenses 1 and 2 (resolution 84, gain of 3.0). This visualization is not similar to FIG. 40A, however, the groupings of nodes in the visualization are grouped by outcome and the groupings show consistent outcomes.

FIG. 40C depicts a visualization of a graph using a Manhattan (L1) metric and neighborhood lenses 1 and 2 (resolution 92, gain of 3.0). The groupings of nodes in the visualization are grouped by outcome and the groupings shown consistent outcomes.

Figure 40D:
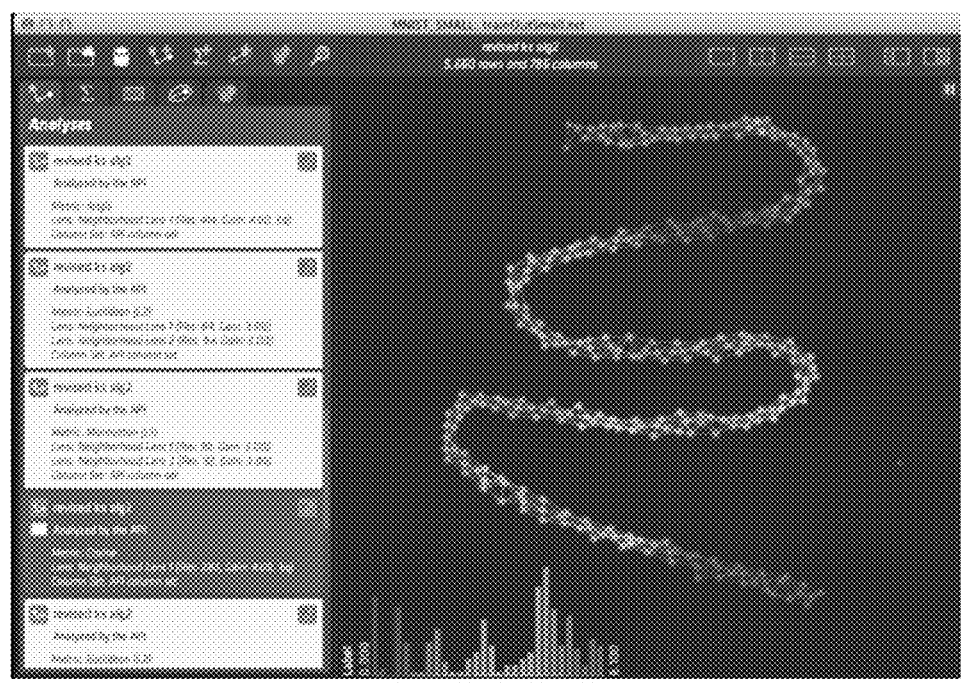
FIG. 40D depicts a visualization of a graph using a cosine metric and a neighborhood lens 1 (resolution 282, gain of 4.0).

FIG. 40D depicts a visualization of a graph using a cosine metric and a neighborhood lens 1 (resolution 282, gain of 4.0). The groupings of nodes in the visualization are grouped by outcome and the groupings also show consistent outcomes.

The above-described functions and components can be comprised of instructions that are stored on a storage medium (e.g., a computer readable storage medium). The instructions can be retrieved and executed by a processor. Some examples of instructions are software, program code, and firmware. Some examples of storage medium are memory devices, tape, disks, integrated circuits, and servers. The instructions are operational when executed by the processor (e.g., a data processing device) to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A non-transitory computer readable medium including executable instructions, the instructions being executable by a processor to perform a method, the method comprising:
receiving a data set;
for each metric of a set of metrics:
for each point in the data set, determining a point in the data set closest to that particular data point using that particular metric and changing a metric score if that particular data point and the point in the data set closest to that particular data point share a same or similar shared characteristic;
comparing metric scores associated with different metrics of the set of metrics;
selecting one or more metrics from the set of metrics based at least in part on the metric score to generate a subset of metrics;
for each metric of the subset of metrics, evaluating at least one metric-lens combination by calculating a metric-lens score based on entropy of shared characteristics across subspaces of a reference map generated by the metric-lens combination;
selecting one or more metric-lens combinations based at least in part on the metric-lens score to generate a subset of metric-lens combinations;
generating topological representations using the data set, each topological representation being generated using at least one metric-lens combination of the subset of metric-lens combinations, each topological representation including a plurality of nodes, each of the nodes having one or more data points from the data set as members, at least two nodes of the plurality of nodes being connected by an edge if the at least two nodes share at least one data point from the data set as members;
associating each node with at least one shared characteristic based, at least in part, on at least some of member data points of that particular node sharing the shared characteristic;
identifying groups within each topological representation that include a subset of nodes of the plurality of nodes that share the same or similar shared characteristics;
scoring each group within each topological representation based, at least in part, on entropy, to generate a group score for each group;

scoring each topological representation based on the group scores of each group of that particular topological representation to generate a graph score for each topological representation; and providing a visualization of at least one topological representation based on the graph scores.

2. The computer readable medium of claim 1 wherein the metric-lens combinations include at least one metric from the subset of metrics and two or more lenses.

3. The computer readable medium of claim 1 wherein the shared characteristic is a category of outcome from the data set.

4. The computer readable medium of claim 1 wherein the calculating the entropy of the shared characteristics across the subspaces of the reference map generated by the metric-lens combination comprises calculating the entropy of categories of outcomes of data points from the data set associated with at least one subspace of the reference map.

5. The computer readable medium of claim 1 further comprising determining a resolution for generation of one or more topological representations of the topological representations, the resolution being determined as follows:

$$res = \left( \left[ \max\left( \frac{gain * N}{L_n * 100}, 10 \right) \right]^{L_n} + \left( \frac{\sqrt{N}}{4} * j \right)^{L_n} \right)^{\frac{1}{L_n}}$$

wherein the resolution is determined for each j in [0, number of resolutions to be considered −1], $L_n$ is a number of metric-lens combinations, and N is a number of points in the resolution mapping.

6. The computer readable medium of claim 1 wherein the visualization is interactive.

7. The computer readable medium of claim 1 wherein providing the visualization includes providing at least one of metric information, metric-lens information, or the graph score.

8. The computer readable medium of claim 1 wherein providing the visualization includes providing a plurality of visualizations in order of the graph score for each of the provided visualizations.

9. The computer readable medium of claim 1 wherein generating the topological representations using the data set comprises generating a plurality of reference spaces using each metric-lens combination, mapping the data points of the data set into each reference space using a different metric-lens combination, and for each reference space: clustering data in a cover of the reference space based the data points of the data set, identifying nodes of the plurality of nodes based on the clustered data, and identifying edges between nodes.

10. The computer readable medium of claim 1 wherein the topological representation is not a visualization.

11. The computer readable medium of claim 1 wherein the graph score for each topological representation is calculated as follows:

$$\left( \sum_{groups\, g} \text{entropy}(g) * \#pts(g) + \frac{N}{50 * \#pts(g)} \right) *$$

$$\left\{ \text{if } \#groups < \#cat, \text{ then } \frac{\#cats}{\#groups}, \text{ else } 1 \right\}$$

wherein groups g is each g of a topological representation, entropy (g) is the entropy of that particular group, #pts(g) is the number of data points in that particular group, N is the number of nodes in the group, #groups is the number of groups in the particular topological representation and #cats is the number of categories of shared characteristics of the data set.

12. A method comprising:

receiving a data set;

for each metric of a set of metrics:
for each point in the data set, determining a point in the data set closest to that particular data point using that particular metric and changing a metric score if that particular data point and the point in the data set closest to that particular data point share a same or similar shared characteristic;

comparing metric scores associated with different metrics of the set of metrics;

selecting one or more metrics from the set of metrics based at least in part on the metric score to generate a subset of metrics;

for each metric of the subset of metrics, evaluating at least one metric-lens combination by calculating a metric-lens score based on entropy of shared characteristics across subspaces of a reference map generated by the metric-lens combination;

selecting one or more metric-lens combinations based at least in part on the metric-lens score to generate a subset of metric-lens combinations;

generating topological representations using the data set, each topological representation being generated using at least one metric-lens combination of the subset of metric-lens combinations, each topological representation including a plurality of nodes, each of the nodes having one or more data points from the data set as members, at least two nodes of the plurality of nodes being connected by an edge if the at least two nodes share at least one data point from the data set as members;

associating each node with at least one shared characteristic based, at least in part, on at least some of member data points of that particular node sharing the shared characteristic;

identifying groups within each topological representation that include a subset of nodes of the plurality of nodes that share the same or similar shared characteristics;

scoring each group within each topological representation based, at least in part, on entropy, to generate a group score for each group;

scoring each topological representation based on the group scores of each group of that particular topological representation to generate a graph score for each topological representation; and providing a visualization of at least one topological representation based on the graph scores.

13. The method of claim 12 wherein the metric-lens combinations include at least one metric from the subset of metrics and two or more lenses.

14. The method of claim 12 wherein the shared characteristic is a category of outcome from the data set.

15. The method of claim 12 wherein the calculating the entropy of the shared characteristics across the subspaces of the reference map generated by the metric-lens combination comprises calculating the entropy of categories of outcomes of data points from the data set associated with at least one subspace of the reference map.

16. The method of claim 12 further comprising determining a resolution for generation of one or more topological representations of the topological representations, the resolution being determined as follows:

$$res = \left( \left[ \max\left( \frac{gain * N}{L_n * 100}, 10 \right) \right]^{L_n} + \left( \frac{\sqrt{N}}{4} * j \right)^{L_n} \right)^{\frac{1}{L_n}}$$

wherein the resolution is determined for each j in [0, number of resolutions to be considered −1], Ln is a number of metric-lens combinations, and N is a number of points in the resolution mapping.

17. The method of claim 12 wherein the visualization is interactive.

18. The method of claim 12 wherein providing the visualization includes providing at least one of metric information, metric-lens information, or graph score.

19. The method of claim 12 wherein providing the visualization includes providing a plurality of visualizations in order of the graph score for each of the provided visualizations.

20. The method of claim 12 wherein generating the topological representations using the data set comprises generating a plurality of reference spaces using each metric-lens combination, mapping the data points of the data set into each reference space using a different metric-lens combination, and for each reference space: clustering data in a cover of the reference space based the data points of the data set, identifying nodes of the plurality of nodes based on the clustered data, and identifying edges between nodes.

21. The method of claim 12 wherein the topological representation is not a visualization.

22. The method of claim 12 wherein the graph score for each topological representation is calculated as follows:

$$\left( \sum_{groups\,g} entropy(g) * \#pts(g) + \frac{N}{50 * \#pts(g)} \right) *$$

$$\left\{ if\ \#groups < \#cat,\ then\ \frac{\#cats}{\#groups},\ else\ 1 \right\}$$

wherein groups g is each g of a topological representation, entropy (g) is the entropy of that particular group, #pts(g) is the number of data points in that particular group, N is the number of nodes in the group, #groups is the number of groups in the particular topological representation and #cats is the number of categories of shared characteristics of the data set.

23. A system comprising:
a processor;
a memory including instructions to configure the processor to:
receive a data set;
for each metric of a set of metrics:
for each point in the data set, determine a point in the data set closest to that particular data point using that particular metric and change a metric score if that particular data point and the point in the data set closest to that particular data point share a same or similar shared characteristic;
compare metric scores associated with different metrics of the set of metrics;
select one or more metrics from the set of metrics based at least in part on the metric score to generate a subset of metrics;
for each metric of the subset of metrics, evaluate at least one metric-lens combination by calculating a metric-lens score based on entropy of shared characteristics across subspaces of a reference map generated by the metric-lens combination;
select one or more metric-lens combinations based at least in part on the metric-lens score to generate a subset of metric-lens combinations;
generate topological representations using the data set, each topological representation being generated using at least one metric-lens combination of the subset of metric-lens combinations, each topological representation including a plurality of nodes, each of the nodes having one or more data points from the data set as members, at least two nodes of the plurality of nodes being connected by an edge if the at least two nodes share at least one data point from the data set as members;
associate each node with at least one shared characteristic based, at least in part, on at least some of member data points of that particular node sharing the shared characteristic;
identify groups within each topological representation that include a subset of nodes of the plurality of nodes that share the same or similar shared characteristics;
score each group within each topological representation based, at least in part, on entropy, to generate a group score for each group;
score each topological representation based on the group scores of each group of that particular topological representation to generate a graph score for each topological representation; and
provide a visualization of at least one topological representation based on the graph scores.

* * * * *